United States Patent [19]

Shoumura et al.

[11] Patent Number: 5,878,262
[45] Date of Patent: Mar. 2, 1999

[54] PROGRAM DEVELOPMENT SUPPORT SYSTEM

[75] Inventors: Tsutomu Shoumura; Hiroshi Suganuma; Tsutomu Funada; Seiji Ozawa; Takeshi Nii; Takashi Kido; Naofumi Mitsuhashi; Toshikazu Hirano, all of Yokohama, Japan

[73] Assignee: Hitachi Software Engineering Co., Ltd., Kanagawa, Japan

[21] Appl. No.: 790,297

[22] Filed: Jan. 31, 1997

[30] Foreign Application Priority Data

Jan. 31, 1996 [JP] Japan ................................ 8-35849

[51] Int. Cl.⁶ .............................. G06F 9/44; G06F 13/00
[52] U.S. Cl. ......................... 395/710; 395/701; 395/703; 395/708; 395/712; 395/500; 395/682; 395/685; 707/1; 707/103; 707/104; 707/203; 705/7
[58] Field of Search ..................................... 395/701, 703, 395/708, 710, 712, 500, 682, 685; 707/1, 103, 104, 203, 511; 705/7, 1

[56] References Cited

U.S. PATENT DOCUMENTS

| | | | |
|---|---|---|---|
| 5,261,100 | 11/1993 | Fujinami et al. | 395/703 |
| 5,421,015 | 5/1995 | Khoyi et al. | 395/650 |
| 5,459,866 | 10/1995 | Akiba et al. | 395/708 |
| 5,535,388 | 7/1996 | Takeda | 395/701 |
| 5,561,802 | 10/1996 | Orimo et al. | 395/704 |
| 5,603,018 | 2/1997 | Terada et al. | 395/561 |
| 5,715,461 | 2/1998 | Yoshitomi | 395/710 |

FOREIGN PATENT DOCUMENTS 2-181224 7/1990 Japan .

*Primary Examiner*—James P. Trammell
*Assistant Examiner*—Tuan Q. Dam
*Attorney, Agent, or Firm*—Fay, Sharpe, Beall, Fagan, Minnich & McKee

[57] ABSTRACT

Disclosed is a program development support system so adapted as to integrally manage a variety of information necessary for the development of a program by creating necessary links between information such as source programs to be employed for the development of the program, program parts, tools, specifications, handling persons and so on, by managing such information as resource information and by retaining attribute information of the links. The program development support system has a store means for storing program development information on the development of a program; a create means for creating attribute information on an attribute of the program development information and link information between each of the program development information; a management means for managing the program development information, the attribute information created by the create means and the link information created thereby each as one resource for the development of the program by providing the resource with a unique number; and a system-structuring element creating means for creating a system-structuring element from the resource by using the link information.

14 Claims, 57 Drawing Sheets

RESOURCE FILE STORING SECTION — 22

| ID | KIND | NAME | ATTRIBUTE INFORMATION | LINK DESTINATION | LINK SOURCE | STORING PLACE |
|---|---|---|---|---|---|---|
| 1 | MODULE | main.c | FLG ; ON<br>TIME ; 14:00 | have: 2 | | 1 0 0 |
| 2 | FUNCTION | main | FLG ; ON<br>TIME ; 14:00 | ref:11<br>gen: 4 | have: 1 | 2 0 0 |
| 3 | TOOL | tool_B | TIME ; 14:00 | gen: 4 | | 3 0 0 |
| 4 | SPECIFICATION | doc_A | TIME ; 13:00 | | gen: 2<br>gen: 3 | 4 0 0 |
| 5 | HANDLING PERSON'S NAME | TANAKA | | ref: 2 | | 5 0 0 |
| | | | | | | |

Fig. 2A          RESOURCE TABLE

UNDEFINED RESOURCE FILE STORING SECTION — 23

| ID | KIND | NAME | LINK DESTINATION | LINK SOURCE |
|---|---|---|---|---|
| 11 | FUNCTION | init | | ref: 2 |
| 12 | | | | |
| 13 | | | | |
| | | | | |

Fig. 2B          UNDEFINED RESOURCE TABLE

| I D | KIND | NAME | ATTRIBUTE INFORMATION | LINK DESTINATION | LINK SOURCE | STORING PLACE |
|---|---|---|---|---|---|---|
| 012 | HEADER FILE | main.h | ...... | have:345<br>have:456 | — | 110 |
| 345 | STRUCTURE | list | ...... | have:230<br>have:560 | have:012<br>type:456 | 120 |
| 230 | VARIABLE | a | ...... | — | have:345 | 130 |
| 560 | VARIABLE | b | ...... | — | have:345 | 140 |
| 456 | typedef | list_A | ...... | type:345 | type:379<br>type:892 | 150 |
| 987 | MODULE | func.c | ...... | have:667<br>have:379 | type:667 | 160 |
| 667 | FUNCTION | func | ...... | ref:892 | — | 170 |
| 379 | HEADER SECTION | head | ...... | have:892<br>type:456 | have:987 | 180 |
| 892 | VARIABLE | ka | ...... | type:456 | have:379<br>ref:892 | 190 |
| | | | | | | |

Fig. 12   RESOURCE TABLE

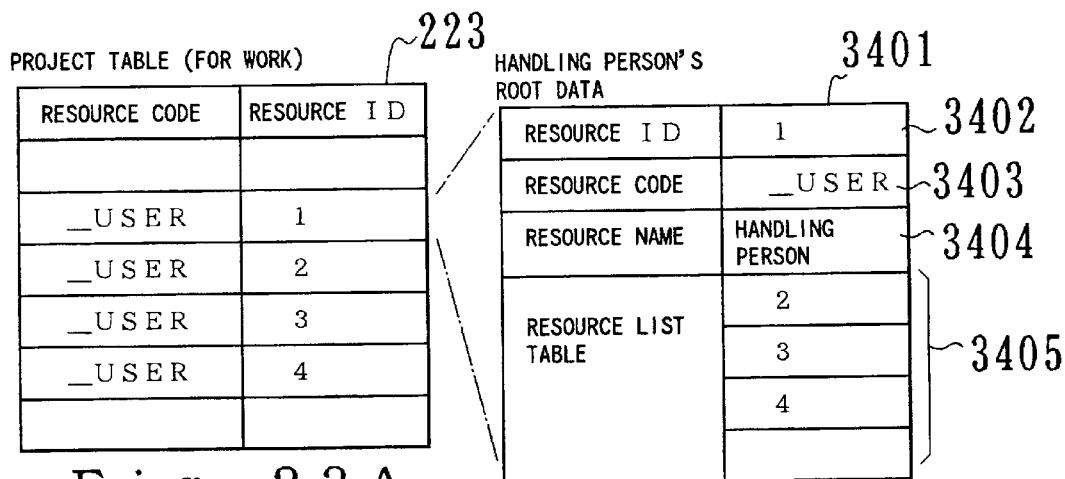

Fig. 23A

PROJECT TABLE (FOR WORK) ~223

| RESOURCE CODE | RESOURCE ID |
|---|---|
|  |  |
| _USER | 1 |
| _USER | 2 |
| _USER | 3 |
| _USER | 4 |
|  |  |

HANDLING PERSON'S ROOT DATA 3401

| RESOURCE ID | 1 | ~3402 |
| RESOURCE CODE | _USER | ~3403 |
| RESOURCE NAME | HANDLING PERSON | ~3404 |
| RESOURCE LIST TABLE | 2 | |
| | 3 | ~3405 |
| | 4 | |
| | | |

HANDLING PERSON'S RESOURCE RECORD ~3405

| RESOURCE ID | RESOURCE CODE | SYMBOL NAME | JAPANESE NAME | MANAGER |
|---|---|---|---|---|
| 2 | _USER | syo | SYOMURA | YES |
| 3 | _USER | kido | KIDO | NO |
| 4 | _USER | ohno | OHNO | NO |
|  |  |  |  |  |

| WORKING PLACE | DISPLAY RESOURCE TABLE |
|---|---|
| /opus_data/opusdei/work | 2 a |
| /opus_data/opusdei/work | 3 a |
| /opus_data/opusdei/work | 4 a |
|  |  |

~3412

| ID | RESOURCE CODE |
|---|---|
|  | _PRG | ~3413 |
| 2 a | _TBL |
|  |  |

Fig. 23B

|●  o b p |  |  | 361 |

SETTING & ALTERING HANDLING PERSON

| RESPONSIBLE PERSON | ENGLISH NAME | JAPANESE NAME | WORKING DIRECTRY |
|---|---|---|---|
|  | kido | KIDO | /opus_data/opusdei |
| ● | ohno | OHNO | /opus_data/opusdei |
|  | syo | SYOMURA | /opus_data/opusdei |
|  | tsuka | OHTSUKA | /opus_data/opusdei |

INPUT JAPANESR NAME : OHTSUKA

INPUT WORKING DIRECTORY : /opus_data/opusdei

[YES] [ADD] [DELETE] [CANCEL] [HELP]

PROJECT TABLE (FOR WORK) 223

| RESOURCE CODE | RESOURCE I D |
|---|---|
|  |  |
| __TOOL | 6 |
| __TOOL | 7 |
| __TOOL | 8 |
| __TOOL | 9 |
|  |  |

TOOL ROOT DATA 4101

| RESOURCE I D | 6 | 4102 |
| RESOURCE CODE | __TOOL | 4103 |
| RESOURCE NAME | TOOL | 4104 |
| RESOURCE LIST TABLE | 7 | |
|  | 8 | 4105 |
|  | 9 | |

Fig. 27B

TOOL RESOURCE RECORD  4106 4107 4108 4109

| RESOURCE I D | RESOURCE CODE | SYMBOL NAME | JAPANESE NAME |
|---|---|---|---|
| 7 | __TOOL | obs | PROGRAM DOCUMENT PRINT |
| 8 | __TOOL | obpmd | DOCUMENT CREATION |
| 9 | __TOOL | opc | PAD DIAGRAM CREATION |
|  |  |  |  |

4105

| RUNNING FUNCTION TABLE 4110 | OPTION TABLE 4111 | PATH TABLE 4112 |
|---|---|---|
| 7 a | 7 b | 7 c |
| 8 a | 8 b | 8 c |
| 9 a | 9 b | 9 c |

| ID | RESOURCE CODE | EXECUTION KIND |
|---|---|---|
| 7 a | __DOC | edit |

| ID | OPTION KIND | OPTION CODE | OPTION NAME |
|---|---|---|---|
| 7 b | view | _v | DATA DISPLAY |
|  | print | _p | DATA PRINT |

| ID | HOST NAME | STORING PLACE |
|---|---|---|
| 7 c | boo | /opus/R2.3/binv1/ops |
|  | cet | /opus/binv2/ops |

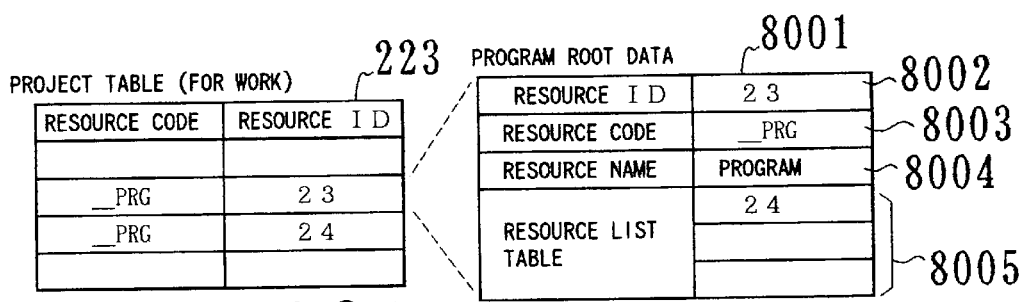

Fig. 38A

PROGRAM RESOURCE RECORD

| RESOURCE ID | RESOURCE CODE | SYMBOL NAME | JAPANESE NAME | RENEWAL DATE |
|---|---|---|---|---|
| 2 4 | _PRG | ops | PROGRAM DOCUMENT PRINT | 95/06/19 16:31 |
|  |  |  |  |  |
|  |  |  |  |  |

| FIXED DATE | COMMENT | COMPILE ENVIRONMENT | REFERENCE RESOURCE TABLE |
|---|---|---|---|
| 95/06/.. | PROJECT.. | 2 4 a | 2 4 b |
|  |  |  |  |

| ID | COMPILE INSTRUCTION | c c |
|---|---|---|
| 2 4 a | COMPILE FLAG | -I/usr/include/ABC -I/usr/include/XYZ |
|  | LOAD FLAG | -lXopus -lorm -lopf |
|  | SOURCE FETCH DIRECTORY | /opus/bp/src |
|  | INCLUDE FETCH DIRECTORY | /opus/bp/include |

| ID | REFERENCE DESTINATION | | REFERENCE SOURCE | |
|---|---|---|---|---|
|  | KIND | RESOURCE ID | KIND | RESOURCE ID |
| 2 4 b | ref | 4 |  |  |
|  | have | 2 6 |  |  |
|  | have | 2 8 |  |  |
|  | ref | 3 2 |  |  |
|  | ref | 3 3 |  |  |
|  |  |  |  |  |

Fig. 38B

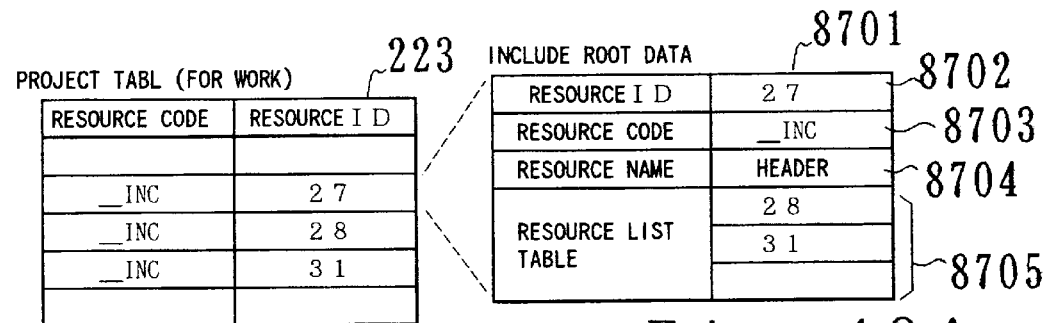
Fig. 43A
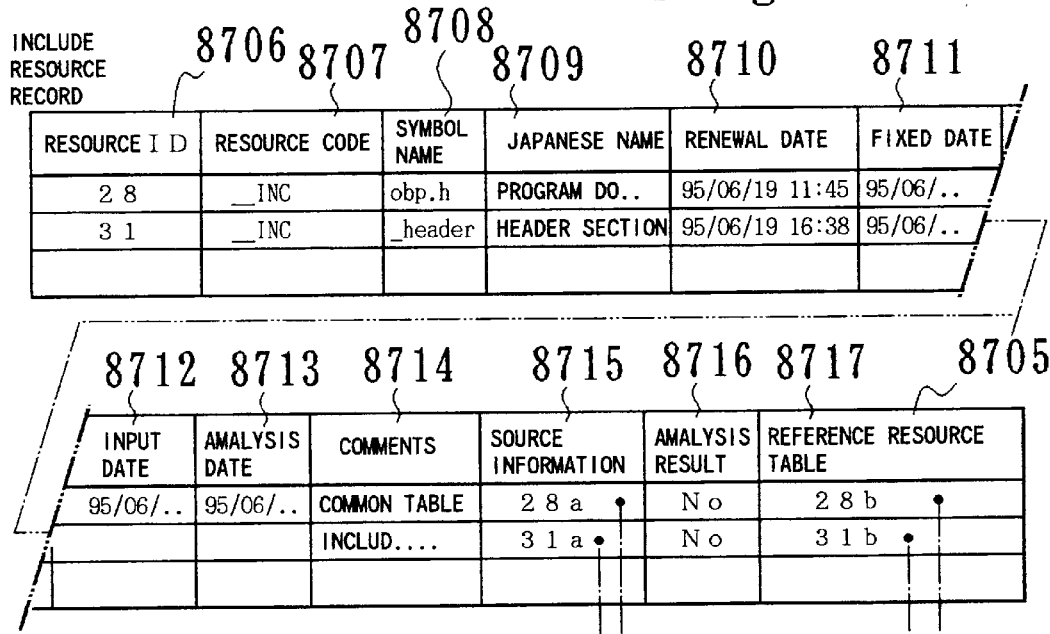
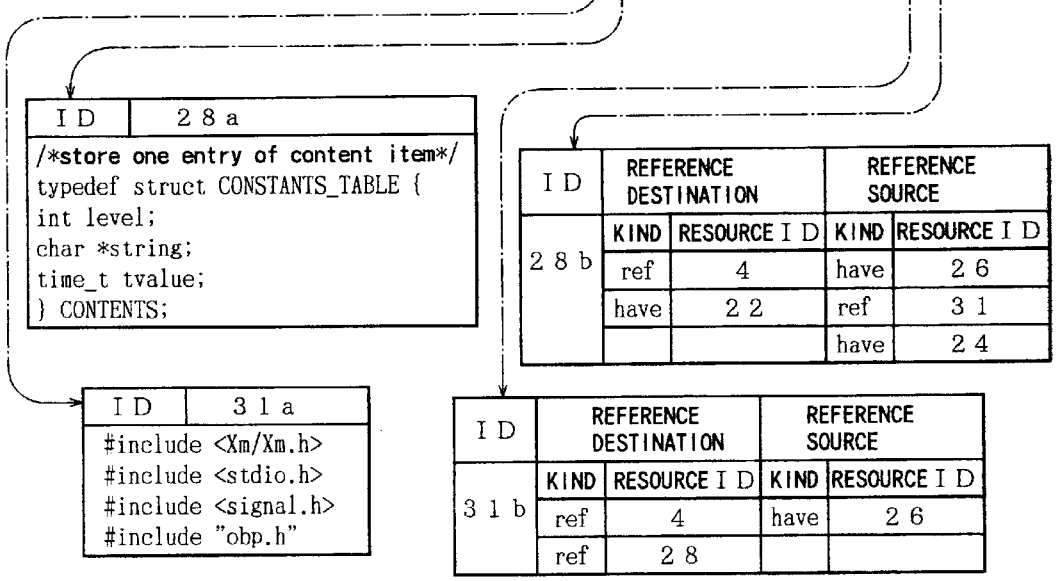
Fig. 43B

PROJECT TABLE (FOR WORK) ~223

| RESOURCE CODE | RESOURCE I D |
|---|---|
| __MOD | 2 5 |
| __MOD | 2 6 |
| __MOD | 3 6 |
| __MOD | 3 7 |
| | |

MODULE ROOT DATA 9001

| | | |
|---|---|---|
| RESOURCE I D | 2 5 | 9002 |
| RESOURCE CODE | __MOD | 9003 |
| RESOURCE NAME | MODULE | 9004 |
| RESOURCE LIST TABLE | 2 6 | |
| | 3 6 | |
| | 3 7 | 9005 |

Fig. 45A

MODULE RESOURCE RECORDE

| RESOURCE I D | RESOURCE CODE | SYMBOL NAME | JAPANESE NAME | RENEWAL DATE |
|---|---|---|---|---|
| 2 6 | __MOD | obp_main.c | MAIN CONTROL | 95/06/19 11:45 |
| 3 6 | __MOD | obp_print.c | PRINT CONTROL | 95/06/19 16:38 |
| 3 7 | __MOD | obp_display.c | DISPLAY CONTROL | 95/06/19 16:38 |
| | | | | |

9006 9007 9008 9009 9010

| FIXED DATE | INPUT DATE | STRUCTURE TABLE | REFERENCE RESOURCE TABLE |
|---|---|---|---|
| 95/06/.. | 95/06/.. | 2 6 a • | 2 6 b • |
| 95/06/.. | 95/06/.. | 3 6 a | 3 6 b |
| 95/06/.. | 95/06/.. | 3 7 a | 3 7 b |

9011 9012 9013 9014 ~9005

| I D | RESOURCE I D |
|---|---|
| 2 6 a | 3 1 |
| | 3 0 |

| I D | REFERENCE DESTINATION | | REFERENCE SOURCE | |
|---|---|---|---|---|
| | KIND | RESOURCE I D | KIND | RESOURCE I D |
| 2 6 b | ref | 4 | have | 2 4 |
| | have | 3 1 | | |
| | have | 3 0 | | |
| | have | 2 8 | | |

Fig. 45B

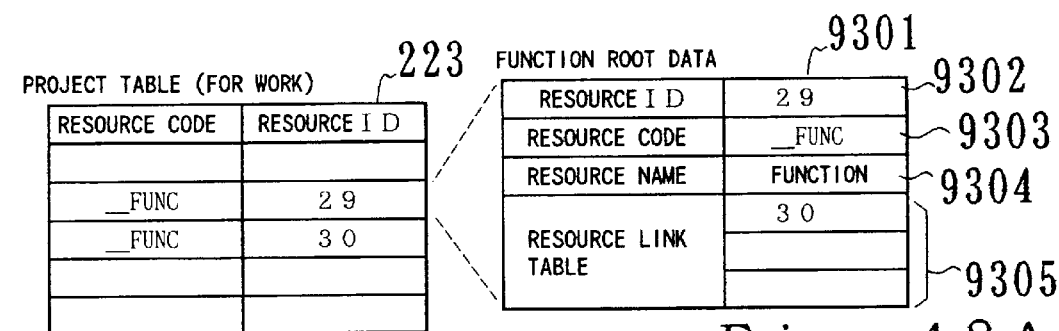
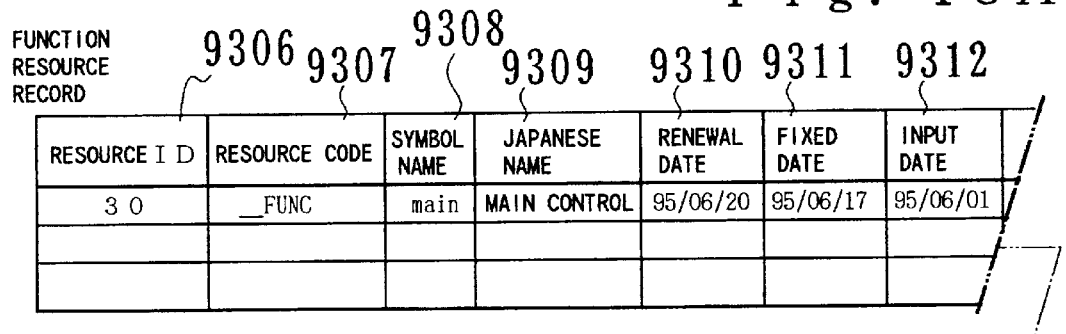
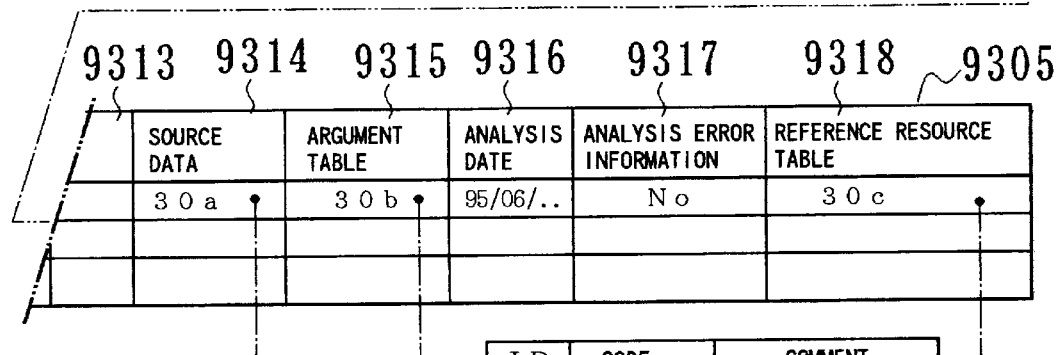
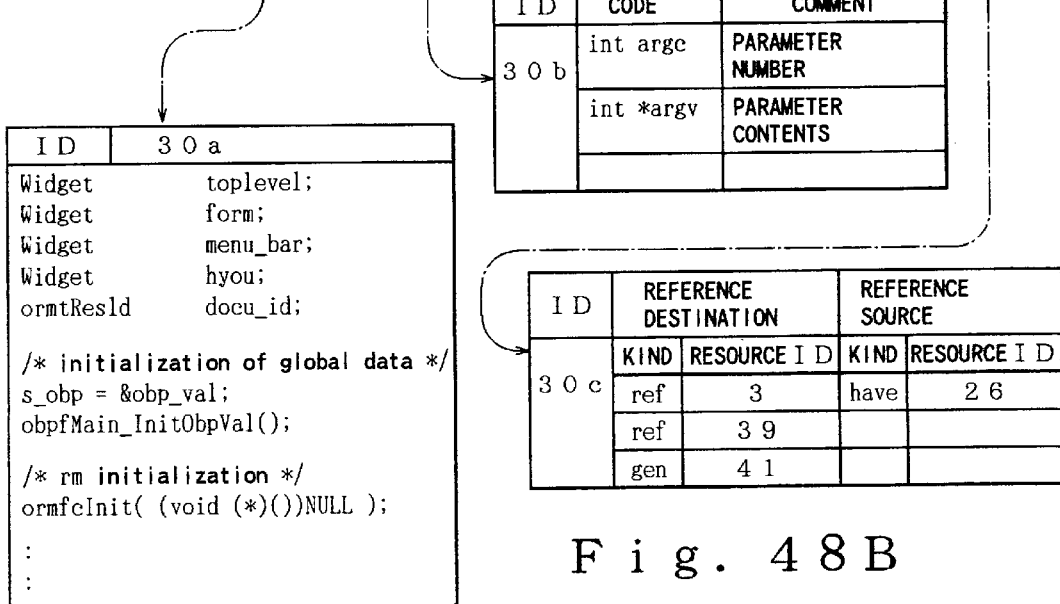
Fig. 48A
Fig. 48B

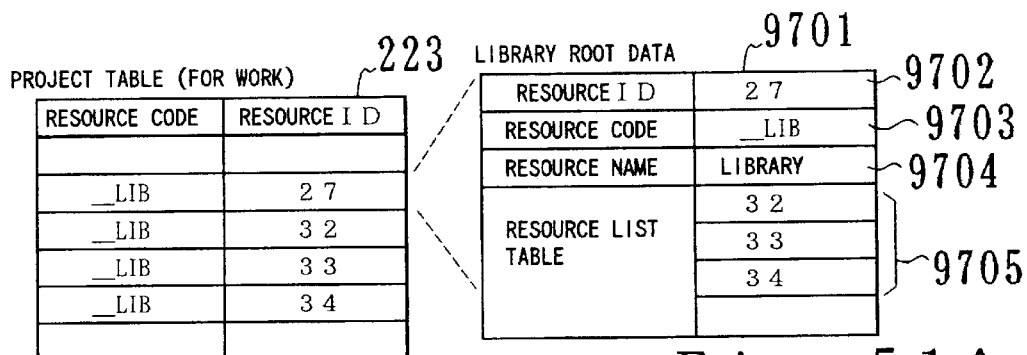
Fig. 51A
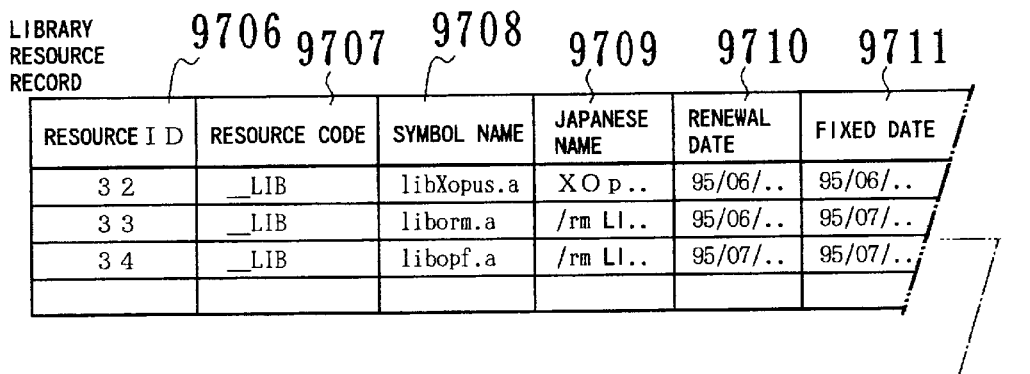
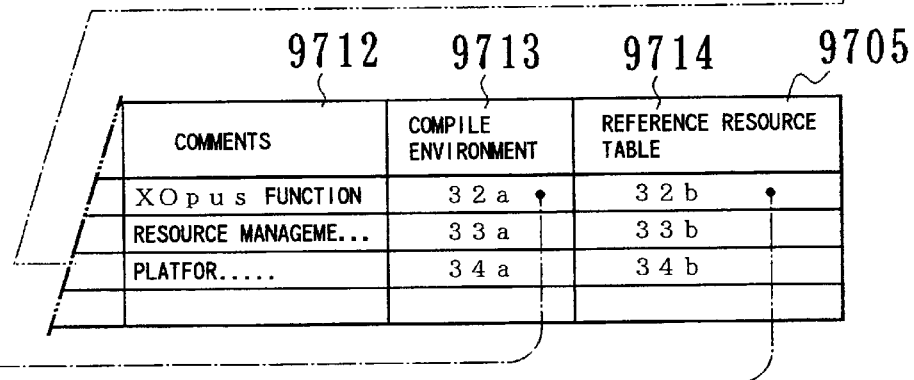
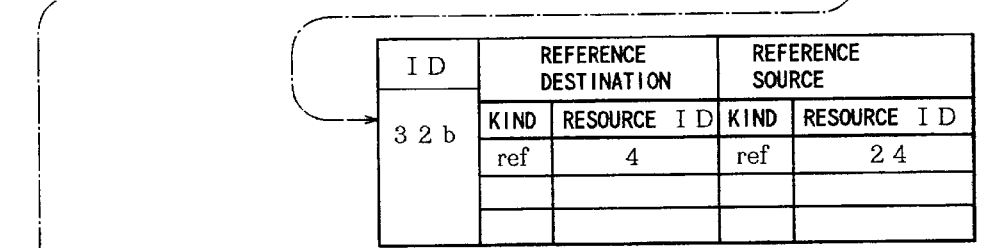
Fig. 51B

PROJECT RESOURCE TABLE 230

| RESOURCE ID | RESOURCE CODE | SYMBOL NAME | JAPANESE NAME | INHERENT DATA |
|---|---|---|---|---|
| 1 | __USER | __USER | HANDLING PERSON | |
| 2 | __USER | syo | SYOMURA | |
| 3 | __USER | kido | KIDO | |
| 4 | __USER | ohno | OHNO | |
| 5 | | | | |
| 6 | __TOOL | __TOOL | TOOL | |
| 7 | __TOOL | obp | PROGRAM DOCU... | |
| 8 | __TOOL | obpmd | DOCUMENT CREATION | |
| 9 | __TOOL | opc | PAD DIAGRAM CR. | |
| 10 | | | | |
| 11 | | | | |
| 12 | __DOC | __DOC | DESIGN DOCUMENT | |
| 13 | __DOC | FS | FUNCTION SPECIFIC. | |
| 14 | __TEXT | __TEXT | TEXT DATA | |
| 15 | __FIG | __FIG | DIAGRAM DATA | |
| 16 | __TEXT | housiki | IMPREMENTATION TY. | |
| 17 | __TEXT | datafile | DATA FILE.... | |
| 18 | | | | |
| 19 | __LIB | __LIB | LIBRARY | |
| 20 | __FIG | kidou_ga.. | START-UP SCREEN D. | |
| 21 | __TBL | __TBL | STRUCTURE | |
| 22 | __TBL | CONTENTS.. | CONTENT ITEM TABL. | |
| 23 | __PRG | __PRG | PROGRAM | |
| 24 | __PRG | obp | PROGRAM DOCU.... | |
| 25 | __MOD | __MOD | MODULE | |
| 26 | __MOD | obp_main.c | MAIN CONTROL | |
| 27 | __INC | __INC | HEADER | |
| 28 | __INC | obp.h | PROGRAM DOCU.... | |
| 29 | __FUNC | __FUNC | FUNCTION | |
| 30 | __FUNC | main | MAIN CONTROL | |
| 31 | __INC | _header | HEADER SECTION | |
| 32 | __LIB | libXopus.a | XOpusd.... | |
| 33 | __LIB | liborm.a | RESOURCE MANA.... | |
| 34 | __LIB | libopf.a | Opusde.... | |
| 35 | | | | |
| 36 | __MOD | obp_prin.. | DOCUMENT PRINT | |
| 37 | __MOD | obp_disp.. | DOCUMENT DISPLAY | |
| 38 | __DOC | SS | FUNCTION DESIGN... | |
| 40 | __PAD | __PAD | PAD DIAGRAM | |
| 41 | __PAD | main | MAIN CONTROL | |

Fig. 56A

UNDEFINED TABLE 232

| RESOURCE ID | RESOURCE CODE | SYMBOL NAME | JAPANESE NAME | INHERENT DATA |
|---|---|---|---|---|
| 39 | __FUNC | ormfclnit | RESOURCE MANA.... | |

Fig. 56B

PROGRAM DEVELOPMENT SUPPORT SYSTEM

BACKGROUND OF THE INVENTION

1. Field of the Invention

The present invention relates to a program development support system for integrally managing a variety of information (resource information) for use in creating programs, program documents and so on in developing computer programs.

2. Description of the Related Art

In developing computer programs, there may be employed a variety of information such as source programs, functional design packages, function specification, module structure drawings, table link figures, call link figures, and so on. Hitherto, each of these information has been managed as a file, fox example, by dividing an element structuring a source program into a module and a function unit, and associating a function specification corresponding to the function with the name of the specification of the function described in the file of the function. There is known a program development support system that can be managed in this way.

A software development system disclosed in Japanese Patent Publication (Kokai) No. 2-181,224 is known as a system for managing programs and specification information thereof by linking them to each other. The system of the type disclosed therein comprises extracting program information or specification information from a program entered in a given type and a module specification, storing it in a database and creating a source program and the specification information from the information stored therein.

In the prior art system, those information applicable to the development of programs are managed as files. Therefore, when individual programmers create function specifications and so on by utilizing program development tools such as editors and so on which the programmers can readily utilize, the specifications created by those tools are managed as files of formats that can be understood by the tools. When the specifications are managed as files in the manner as described hereinabove, the files created by those tools cannot be directly referred to by other tools unless the other tools be changed to recognize the formats of the files and read the formats thereof.

The information managed by the prior art system includes source programs and specifications. On the other hand, the information, such as tools to be employed by programmers, names of the programmers and so on, is not managed uniformly by linking them to the source programs and specifications.

Therefore, for example, when a specification is to be changed, there may occur the situation that the tool used for creating the specification cannot be identified and the specification may be changed by a different tool, thereby resulting in change of a format of the specification different from the original format before renewal. Further, as the prior art system does not manage the names of the programmers involved in the development of the program as data by linking it to a source program handled by the programmers, there may be the case that a person responsible for the development of the program feels it very difficult to manage or may not manage which programmers are in charge of which part of the program, particularly when the program is being developed by a large number of programmers or when programmers change often.

Further, hitherto, a unit for managing a source program is a module or function unit so that it is possible to identify a function that may be influenced when a certain function is changed. However, the problem may arise that no location of change is identified, for example, when a name of a variable is changed and a scope which may be influenced is to be located.

Furthermore, even if the prior art system links a source program to a specification, a function in a specification or the source program by a name of the function, no definition is made of which link has what kind of meaning, i.e. a kind of the link. Therefore, although it is possible to distinguish a function specification corresponding to a certain link and identify it, it is impossible to identify a processing to be made for the function specification linked when the function is renewed.

In the prior art system, further, when a source program is to be created, a user describes a specification of a function and creates the function from the described specification, combines the created function with a header, and stores data at each stage. Accordingly, if the user modifies the source program created in this manner, there are required to search for both the function acting as a create source of the source program and a description specification acting as a create source of the function and modify each of them.

In addition, the prior art system cannot register information of an undefined entity while holding a link to information of another entity. That the entity is undefined means that, when a function is taken as an example, it is called in another function while its contents are not defined. Therefore, a user is required to link the undefined resource to a defined and registered resource at the time when the entity of the undefined resource is defined.

When an entire software system is developed by several handling persons, the system is divided into small portions and they are assigned to each of the handling persons. When the development of the portions has been finished, they are gradually combined one by another, followed by confirmation as to whether the combined portions can be operated in a given way as the system is intended to work. However, such a conventional process suffers from the difficulty that, if the portions would be combined prior to the completion of development work by the handling persons, a test cannot be done for the purposes intended to be done, due to a failure by a handling person who yet finishes developing the portion of the system or a time is lost wastefully until the entire system has finally been developed.

SUMMARY OF THE INVENTION

It is an object of the present invention to provide a program development support apparatus for creating a link necessary among information such as source programs, tools, specifications for use in the development of a program, and developers, for managing each of the information as a resource, for holding the link, and for managing the information integrally.

In order to achieve the object, the present invention provides a program development support system for integrally managing information used for program development, which is characterized in comprising:

a database (21) for storing design information including source programs, specifications and tools, handling person information on a handling person participating in the program development, and specification information including drawings and tables representing the specification of the program;

registration processing means (20) for providing each information with a unique key, creating attribute information and link information between respective information, for each information, and storing the created information in said database; and processing control means (11) for performing a processing corresponding to an event, to information to be linked, by using said attribute information and said link information, when occurring the event on the each information (FIG. 1).

In a second aspect, the present invention provides a program development support system, further comprising program analysis means (13) for analyzing a known source program to divide it into units manageable by said database (FIG. 1 and FIG. 57)

In a third aspect, the present invention provides a program development support system, further comprising:

first store portion (22) for registering information whose entity is defined in said database; and second store portion (23) for registering information whose entity is undefined, but at least either whose link information or whose attribute information is defined; and said registration processing means (20) deciding whether or not the entity of the information to be registered in said database is defined, registering the information in the first store portion if the entity is defined, and registering the information in the second store portion if the entity is undefined (FIG. 1).

In the fourth aspect, the present invention provides a program development support system, further comprising:

link holding means (25d, 25e) for holding a link between information and other information when the entity of the former information registered in said first store portion is deleted in said registration processing means (20) (FIG. 1 and FIG. 2).

In the fifth aspect, the present invention provides a program development support system, further comprising:

definition transfer means for registering the information in said first store portion when the entity of the undefined information registered in said second store portion is defined (FIG. 1 and FIG. 2).

In the sixth aspect, the present invention provides a program development support system, in which:

said first store portion comprises opening information store portion (224) for storing information which can be referred by a member who is registered as a member of the program development project in the handling person information of said database, and non-opening information store portion (223) for storing information which can be referred by only a specified person in the program development project; and said registration processing means (221) registers the information to be registered in said database in either said opening information store portion or said non-opening information store portion (FIG. 17).

In the seventh aspect, the present invention provides a program development support system for integrally managing information used for program development, comprising:

a database (22) for managing source programs;

program analysis means (13) for analyzing a known source program to divide it into structuring-elements;

source program registration processing means (20) for providing each divided structuring-element of the divided source program with a unique key, creating attribute information and link information to be linked by other information for each structuring-element, and registering the created information in said database; and processing control means (11) for managing each structuring-element by using said key, the attribute information and the link information (FIG. 1 and FIG. 2).

In the program development support system having the characterizing aspects as described-hereinabove, a database (21) stores design information including source programs, specifications and tools, handling person information on a handling person participating in the program development, and specification information including drawings and tables representing the specification of the program. The registration processing means (20) provides each information with a unique key, creates attribute information and link information between respective information, for each information, and stores the created information in said database. The processing control means (11) performs a processing corresponding to an event, to information to be linked, by using said attribute information and said link information, when occurring the event on the each information.

Further, the present invention of the program development support system, further comprises the program analyze means (13). The program analyze means (13) analyzes a known source program to divide it into units manageable by said database.

Further, in the program development support system of the present invention, the first store portion (22) registers information whose entity is defined in said database; and the second store portion (23) registers information whose entity is undefined, but at least either whose link information or whose attribute information is defined. The registration processing means (20) decides whether or not the entity of the information to be registered in said database is defined, registers the information in the first store portion if the entity is defined, and registers the information in the second store portion if the entity is undefined.

Further in the program development support system of the present invention, a link between information and other information is held when the entity of the former information registered in said first store portion is deleted in said registration processing means (20). When the entity of the undefined information registered in said second store portion is defined in the registration processing means (20), the information is registered in the first store portion. The definition transfer processing is performed.

The first store portion comprises opening information store portion (224) for storing information which can be referred by a member who is registered as a member of the program development project in the handling person information of said database, and non-opening information store portion (223) for storing information which can be referred by only a specified person in the program development project. The registration processing means (221) registers the information to be registered in said database in either said opening information store portion or said non-opening information store portion.

With the arrangements as described hereinabove, the program development support system according to the present invention can register development information such as information on names of developers involved in the development of the programs, projects and so on, specification information such as module specifications and function specifications relating to specifications of programs and tools to be utilized for the development of the programs, and structuring elements in which the entities of the source programs created in the course of the development of the programs are defined with their structuring elements, together with their attribute information and their link information containing kinds and relations of links among the development information, tool information, specification information and source program parts. On the other hand, the parts off the source program parts with their entities undefined are registered in another area, together with a relation information containing kinds and relations of links to other information. These undefined parts are then transferred to an area in which the non-definition information is registered at the time when their entities are registered. Therefore, the users are not needed to be conscious of linking to other information even if undefined information is defined. Further, the users can readily find out undefined information even if the undefined information would have been created erroneously, because the information with its entity undefined can be left in an area.

Other objects, features and advantages of the program development support system according to the present invention will become apparent in the course of description of the specification which follows, with reference to the accompanying drawings

BRIEF DESCRIPTION OF THE DRAWINGS

FIGS. 2A and 2B are diagrams for describing a defined resource table and an undefined resource table, respectively.

FIG. 12 is a diagram showing a specific example of a resource table corresponding to the source program of FIG. 11.

FIGS. 23A and 23B are diagrams for describing contents of handling person resource records of the working table of a project table.

FIG. 24 is a diagram showing a window screen for setting and changing attributes of handling person in charge of the project.

FIGS. 27A and 27B are diagrams for describing a data type of a tool record registered in the working table of a project table.

FIGS. 38A and 38B are diagrams for describing a data type of a program resource record registered in the working table of the project able.

FIGS. 43A and 43B are diagrams for describing a data type of an include resource record registered in the working table of the project table.

FIGS. 45A and 45B are diagrams for describing a data type of a module resource record registered in the working table of the project table.

FIGS. 48A and 48B are diagrams for describing a data type of a function resource record registered in the working table of the project table.

FIGS. 51A and 51B are diagrams for describing a data type of a library resource list record registered in the working table of the project table.

FIGS. 56A and 56B are diagrams showing an example of specific contents of a project resource table and an undefined table.

DESCRIPTION OF THE PREFERRED EMBODIMENTS

Figure 1:
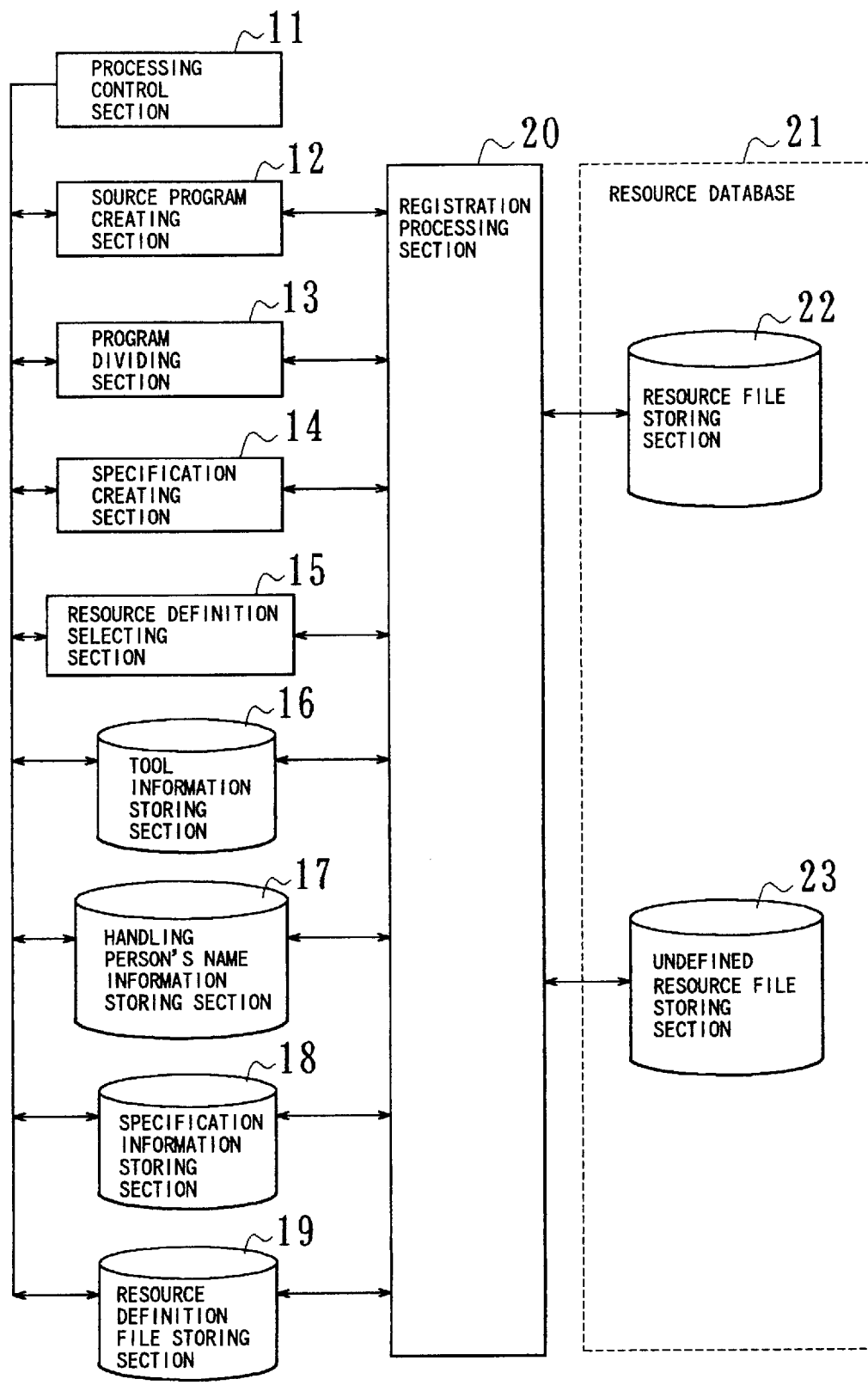
FIG. 1 is a block diagram showing a system configuration of an essential portion of a program development support system according to a embodiment of the present invention.

FIG. 1 is a block diagram showing the system configuration of an essential portion of the program development support system according to an embodiment of the present invention and FIGS. 2A and 2B are diagrams for describing the defined resource table and the undefined resource table.

In FIGS. 1 and 2, reference numeral 11 stands for a processing control section, reference numeral 12 for a source program creating section, reference numeral 13 for a program dividing section, reference numeral 14 for a specification creating section, reference numeral 15 for a resource definition selecting section, reference numeral 16 for a tool information storing section, reference numeral 17 for a handling person's name information storing section, reference numeral 18 for a specification information storing section, reference numeral 19 for a resource definition file storing section, reference numeral 20 for a register processing section, reference numeral 21 for a resource database, reference numeral 22 for a resource file (a defined resource file) storing section, reference numeral 23 for an undefined resource file storing section, reference numeral 24 for a resource table, and reference numeral 25 for an undefined resource table.

The processing control section 11 performs a system control for implementing a variety of processing in the program development support system and the source program creating section 12 implements processing for creating a source program. The program dividing section 13 divides the input source program into unit structuring program elements (resource information). The specification creating section 14 creates a specification and the resource definition selecting section 15 selects a definition of a resource information to be employed.

The tool information storing section 16 stores a tool information to be employed for the development of a program and the creation of a specification and the handling person's name information storing section 17 stores information on handling persons as information of developers participating in the development of the program. Further, the specification information storing section 18 stores information on specifications including drawings and documents relating to the specification of the program. In addition, the resource definition file storing section 19 stores a resource definition file with attributes of each information on programs, specifications, developers and tools as well as information on links thereto.

The register processing section 20 implements processing for registering in the resource database 21 a variety of resource information (hereinafter referred to sometimes as "resource") including a resource information (source program parts) created by the source program creating section 12 and the program dividing section 13, a resource information (program specifications, function specifications, etc.) created by the specification creating section 14, a tool resource information (various development tools such as editors, compilers, debuggers and so on) stored in the tool information storing section 16, a developer resource information (information on names of handling persons, histories of technical development by handling persons, and so on) stored in the handling person's name information storing section 17.

The resource database 21 comprises a resource file storing part 22 for storing a resource table (a defined resource table) and an undefined resource file storing section 23 for storing an undefined resource table corresponding thereto. As shown in FIG. 2, data of each of a resource table 24 and an undefined resource table 25 to be stored in each of these store sections are stored in a field of each of the tables and a program development information acting as a variety of resources is managed.

As shown in FIG. 2A, the resource table 24 comprises data of each of fields including an ID field 24a, a kind field 24b, a name field 24c, an attribute information field 24d, a link destination field 24e, a link source field 24f, and a storing place field 24g. As the data of each field, the data in a resource unit with elements of information involved in the development of the program are stored therein and managed as record with each of its record data provided with a relation. Further, there is provided the undefined resource table 25 having the structure of a data field of a format as shown in FIG. 2B, so as to correspond to the resource table 24 of the data structure as described hereinabove.

The ID field 24a of the resource table 24 stores unique ID numbers for identifying the record data for each of the resources to be managed herein as record data. In the kind field 24b, there are stored kinds of resource information (modules, functions, tools, specifications, creating persons and so on) of the records. In the name field 24c are stored data of names to be provided for the record data (resource information).

The attribute information field 24d stores attribute information of the record data of the resource information. As the attribute information referred to herein, there may be stored, for example, time information indicating the time when the resource information is renewed and flag information indicating whether a compilation has been implemented. The link destination field 24e stores the ID numbers of link destinations to be linked and the identifiers (have, ref, gen, etc.) of the link kinds. Further, likewise, the link source field 24f stores the ID numbers of link sources to be linked and the identifiers (have, ref, gen, etc.) of the link kinds. Furthermore, the storing place field 24g stores data of positions in which to store information of an entity of the resource information to be managed by the record involved.

More specifically, the resource table 24 referred to herein stores information of each of the attribute information (24a–24d) of the resource, information of the link destinations (24e) consisting of the link kinds and the IDs of the link destinations, information of the link sources (24f) consisting of the link kinds and the IDs of the link sources, and information on the storing places (24g) indicating the positions of placement of the entity of the resource. The information of each of the resources is managed on the basis of these information and subjected to an operation for providing a relation. The attribute information is defined by a resource definition file of the resource definition file storing section 19 for each resource. On the other hand, in the undefined resource table 25, there are registered resources which are not entirely defined for the time being and resources whose relation has been removed upon deletion of a portion thereof. As the undefined resource information referred to herein, like those stored in each of the field data of the resource table 24, the record data comprising field data of ID numbers, kinds, names, link destinations consisting of link kinds and IDs of the link destinations and link sources consisting of link kinds and IDs of the link sources is stored in the undefined resource table 25.

Now, a description will be made of the undefined resource table 25 with reference to FIG. 2B. As shown in FIG. 2B, the undefined resource table 25 is configured by a data structure having data fields having substantially the same data structure as the data fields of the resource table 24. The undefined resource table 25 stores unique ID numbers for identifying the undefined resource information to be managed as the record data referred to herein. In the kind field 25b, there are stored kinds of resource information (modules, functions, tools, specifications, creating persons and so on) of the record. In the name field 25c are stored data of names to be provided for the record data. The link destination field 25d stores the ID numbers of link destinations to be linked and the identifiers of the kinds of the links thereof. Further, likewise, the link source field 25e stores the ID numbers of link sources to be linked and the identifiers of the kinds of the links thereof. It is provided in this case, however, that as the undefined resource information to be registered in the undefined resource table 25 is information of the resources whose entity information is not defined, no field for storing data of attribute information and for storing data of storing places is provided.

Figure 3:
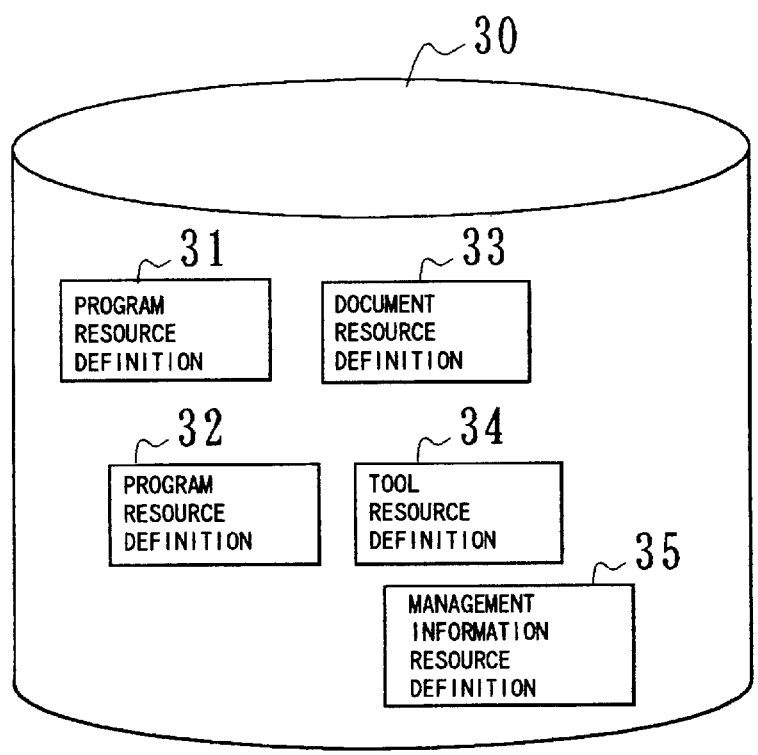
FIG. 3 is a diagram for describing the configuration of a resource definition file.

FIG. 3 is a diagram for describing the configuration of a resource definition file. A resource definition file 30 is stored in the resource definition file storing section 19 in the system configuration as shown in FIG. 1. As shown in FIG. 3, the resource definition file 30 comprises information of each of definitions including program resource definitions 31, specification resource definitions 32, document resource definitions 33, tool resource definitions 34 and management information resource definitions 35. By the definitions of these resource definition information, there are defined link relations extended to elements of the resource information and kinds of attributes of each of the resources.

Figure 4:
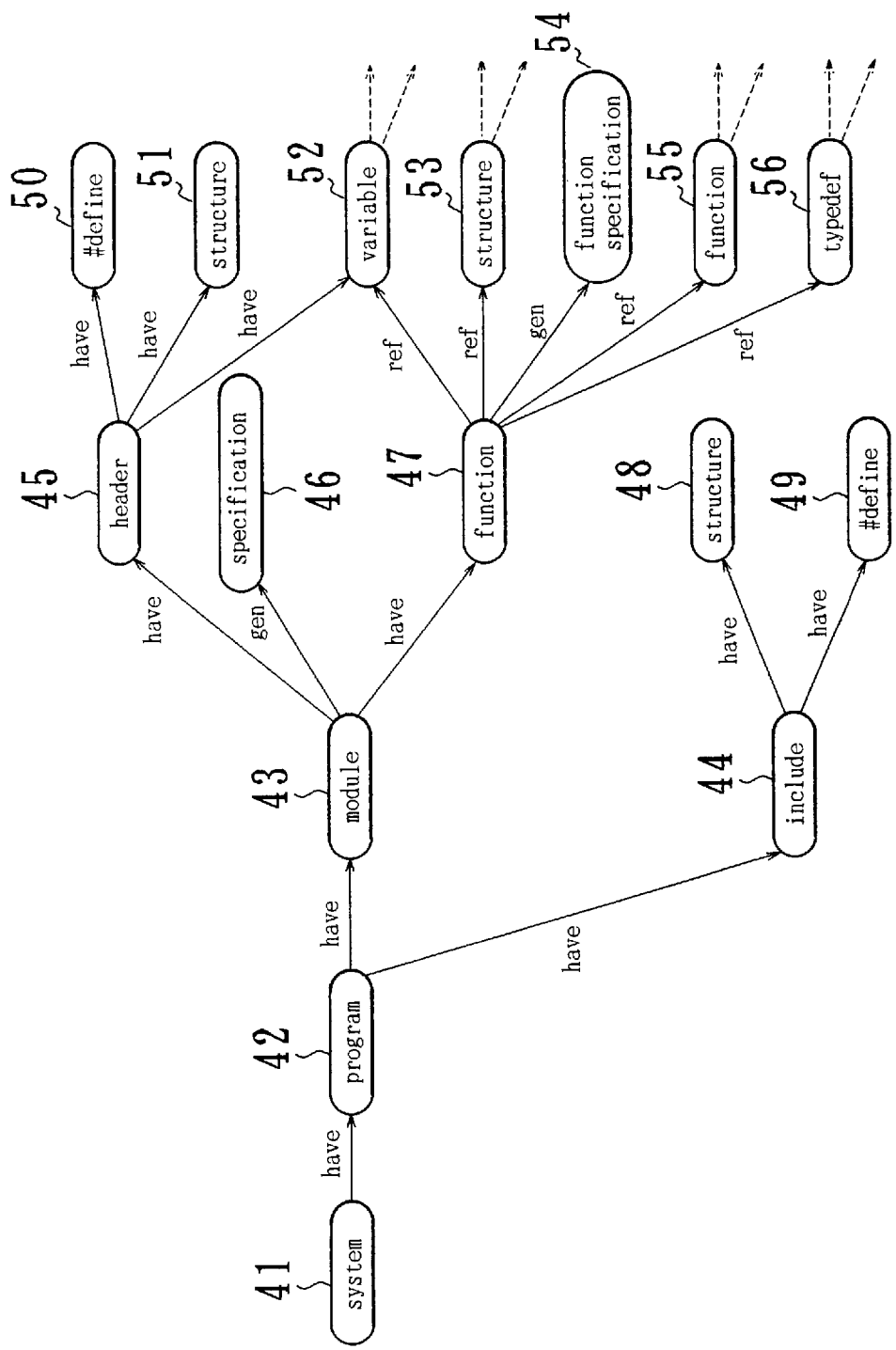
FIG. 4 is a diagram for describing an example of a link between elements of resource information to be defined as a program resource definition.

FIG. 4 is a diagram for describing an example of links between elements of the resource information to be defined as a program resource definition. In the program resource definitions, relations between structuring elements including each of modules in the program acting as an element of the program resource, functions and variables are defined as links by attribute codes indicating the kinds of the links. In FIG. 4, rounded squares representing names of elements of the program resources indicate the structuring elements of the respective program resources and arrows provided with labels between the elements represent the links provided with relation codes indicating the kinds of the links. For example, the kind of the link having a relation code "have" indicates the link that the left side from which the arrow is pointing contains the right side pointed by the arrow and the kind of the link having a relation code "ref" indicates the link that the left side makes a reference to the right side. The kind of the link having a link code "gen" indicates the link that the right side is created by using the left side.

Then, a description will be made of specific examples of the relations of the structuring elements of the program resource represented by the relation codes with reference to the example as shown in FIG. 4. In FIG. 4, a system element 41 is connected to a program element 42 by the link kind having the relation code "have". Likewise, the program element 42 is in turn connected to a module element 43 and an "include" element 44 each by the link kind having a relation code "have". This means that the system element 41 contains the program element 42 that in turn contains the module element 43 and the "include" element 44.

Further, a description will be made of the meaning between the elements connected to each other by the relation code of the link kind in substantially the same manner as described hereinabove. The module element 43 contains a header element 45 and a function element 47 (the link kind having the relation code "have"), while a specification element 46 is created from the module element 43 by the link kind having the relation code "gen". Likewise, the "include" element 44 contains a structure element 48 and a "#define" element 49 each with the link kind having the relation code "have". Furthermore, the header element 45 contains a "#define" element 50 and a variable element 52 with the link kind having the relation code "have" and makes a reference to a structure element 51 with the link kind having the relation code "ref". Likewise, it is meant that the function element 47 makes a reference to the variable element 52, a structure element 53, a function element 55 and a "typedef" element 56 with the link kind having the relation code "ref" while creating a function specification element 54 with the link kind being the relation code "gen".

Figure 5:
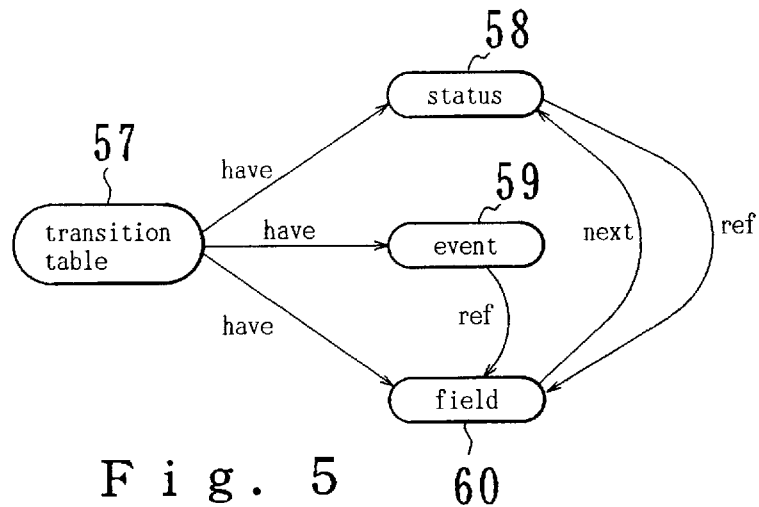
FIG. 5 is a diagram showing an example of the configuration of a specification resource definition indicated by a relation code of a kind of a link.

FIG. 5 is a diagram showing an example of the configuration of a specification resource definition indicated by a relation code of the kind of a link. As shown in FIG. 5, a specification resource definition 32 (FIG. 3) referred to herein indicates a portion of the link of the element structuring a transition table 57. The specification resource definition defines a link between structuring elements of diagrams representing a specification such as a PAD diagram or a call link diagram or structuring elements of tables and a link to elements of other resources. In order to represent the link referred to herein, squares with four corners rounded in which the names of the elements of the specification resources are represented indicate the structuring elements of the specification resources and the arrows labelled between the elements indicate links by relation codes indicating kinds of the links, like in FIG. 4 wherein the links of the structuring elements of the program resources are represented.

The relation codes referred to herein may include a relation code "have", a relation code "ref", and a relation code "next", and the relations between the elements are indicated by either of these relation codes. In this case, the relation code "next" means that the processing for the right side is to be implemented after the processing for the left side has been implemented. In other words, a relation of the order of processing is represented by the relation code with its link kind having "next". The other relation codes have the same meanings as described hereinabove.

More specifically, FIG. 5 indicates the relation of the specification resources in which an element 57 of a transition table contains a status element 58, an event element 59 and a field element 60 and the event element 59 in turn make a reference to the field element 60. Further, it indicates the relation thereof in a manner that the status element 58 in turn refers to the field element 60 and the status element 58 is to be processed after the processing of the field element 60.

Figure 6:
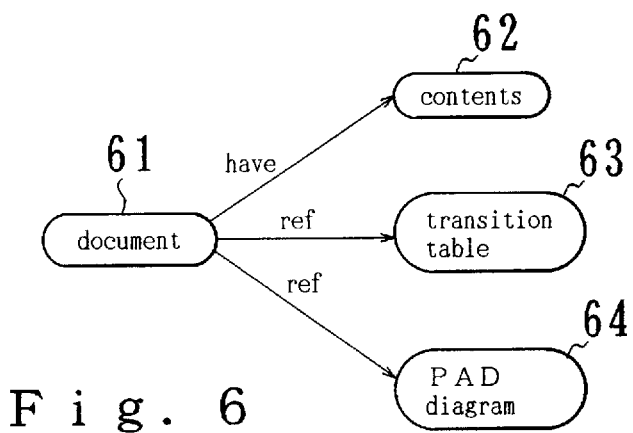
FIG. 6 is a diagram showing an example of the configuration of a document resource definition indicated by a relation code of a kind of a link.

FIG. 6 is a diagram showing an example of the configuration of a document resource definition indicated by a relation code of a link kind. As shown in FIG. 6, the document resource definition 33 (FIG. 3) defines a link between a document and structuring elements contained in the document, a link between structuring elements, and a link between the document and other resources. In this case, too, like in the previous cases, rounded squares with the names of the elements of the document resources represented therein indicate the structuring elements of the document resources and the arrows labelled between the elements indicate links by relation codes indicating their link kinds. The document resource definition as shown in FIG. 6 means that an element 61 of a document contains a content element 62 and the document element 61 makes a reference to an element 63 of a transition table and to an element 64 of a PAD diagram.

Figure 7:
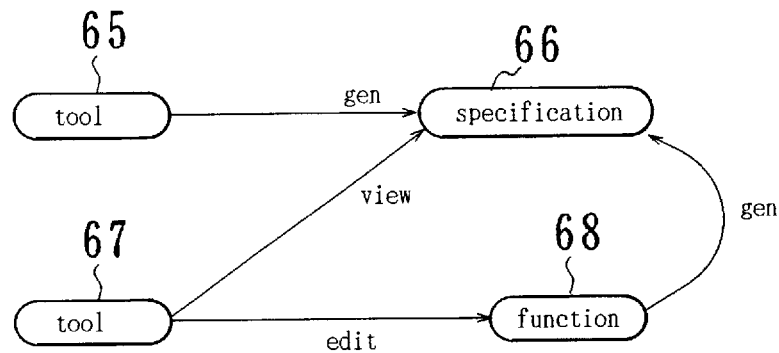
FIG. 7 is a diagram showing an example of the configuration of a tool resource definition indicated by a relation code of a kind of a link.

FIG. 7 is a diagram showing an example of the configuration of a tool resource definition indicated by a relation code of a link kind. As shown in FIG. 7, a tool resource 34 (FIG. 3) referred to herein defines a link between a tool resource and other resources. In the same manners as described hereinabove, rounded squares with the names of elements of the tool resources indicated therein represent the structuring elements of the tool resources and the arrows labelled between the elements represent links by the respective relation codes indicating the link kinds. The relations referred to herein are indicated each by the kind of the link with the relation code having "gen", the relation code having "edit", and the relation code having "view". The relation codes for the link kinds indicate the kinds of the links between the tool resources and the other resources.

More specifically, the relation code with its link kind being "gen" indicates a link that a tool creates a resource, the relation code with its link kind being "edit" indicates a link that a tool edits a resource, and further the relation code with its link kind being "view" indicates a link that a tool displays a resource. In other words, the definition of the tool resources as shown in FIG. 7 means that two tools comprise a first tool element 65 and a second tool element 67 and the first tool element 65 creates a specification element 66 while the second tool element 67 displays the specification element 66. Further, the tool element 67 edits a function element 68 while the function element 68 creates the specification element 66.

Figure 8:
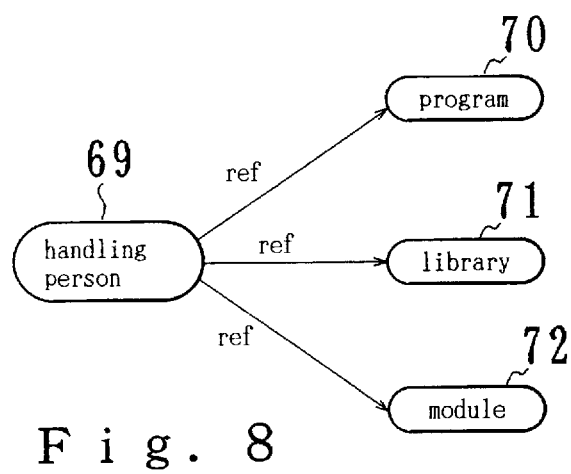
FIG. 8 is a diagram showing an example of the configuration of a management information resource definition indicated by a relation code of a kind of a link.

FIG. 8 is a diagram showing an example of the configuration of a management information resource definition indicated by a relation code of a link kind. As shown in FIG. 8, a management information resource definition 35 (FIG. 3) defines the relation of a link between a user (a person developing a program) and other resources. In other words, as described hereinabove, the links of the configuration of the management information resource are defined by the relation codes of the kinds of the links in such a manner that an element 69 of a handling person makes a reference each to a program element 70, a library element 71 and a module element 72.

Although not specifically shown in FIGS. 4 through 8 above, any attribute information to be usable for each resource can be defined in the definition of the resources. When a variable is taken as an example of program resources, the attribute information of the variable may include, for example, a store class, declare, a type of declare, an initial value, a name in Japanese and so on.

Figure 9:
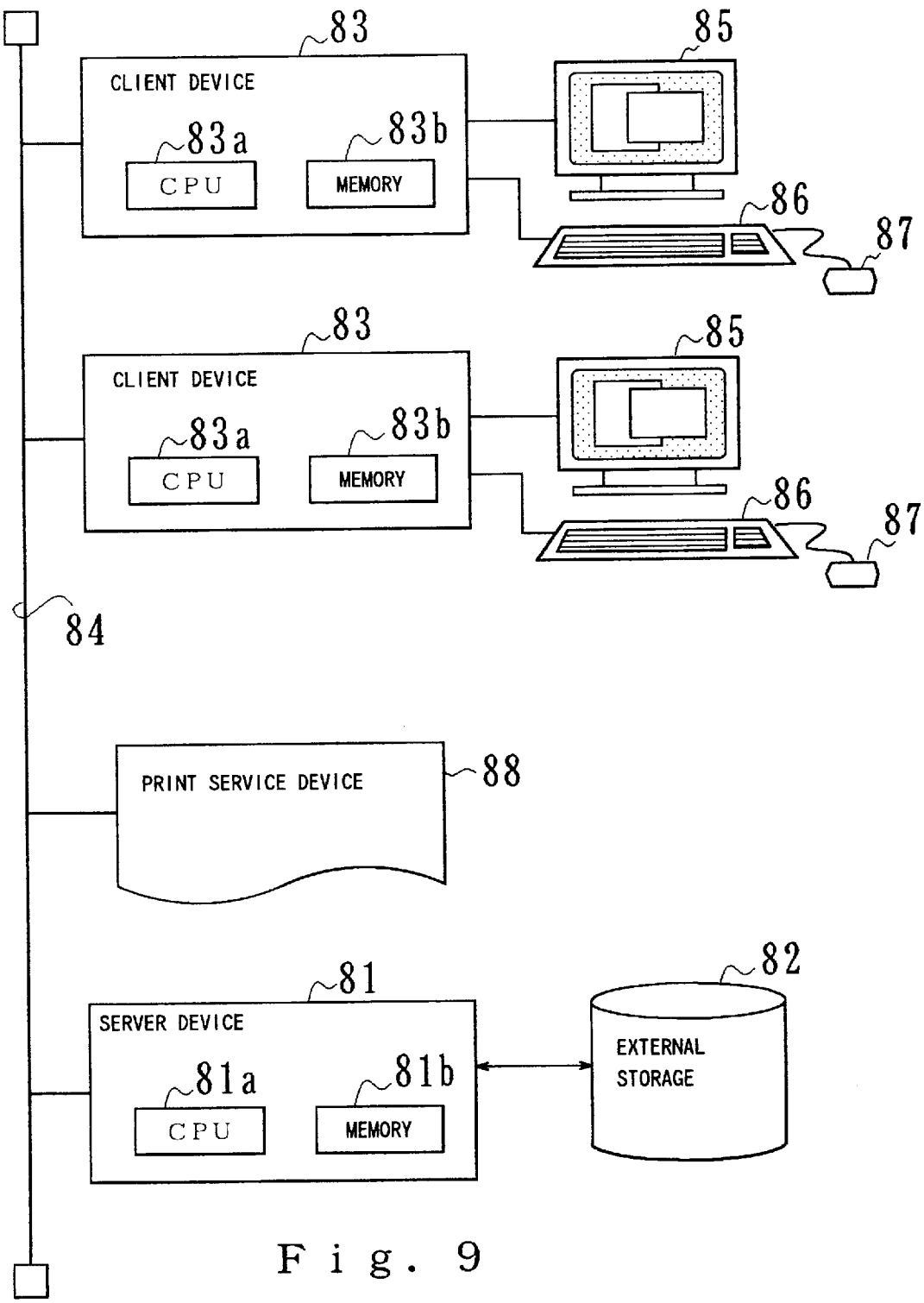
FIG. 9 is a diagram showing an example of the entire configuration of a hardware system for implementing an embodiment of the program development support system according to the preset invention.

FIG. 9 is a diagram showing an example of the entire configuration of a hardware system for implementing an embodiment of the program development support system according to the present invention. The hardware system referred to herein comprises a client-server device connected to each other via a network in such a way that data of one server device are shared with plural client devices and handling persons in charge of the development of a program can implement operations of input and output of the programs and data by using tools from their own terminal devices of the plural client devices, thereby enabling each of the handling persons to proceed with the development of the program.

As shown in FIG. 9, reference numeral 81 stands for a server device for implementing an entire system control, reference numeral 82 for an external storage for storing data relating to the development of a program, reference numeral 83 for a client device having a terminal function for operation by each of the users (persons in charge of the development of the programs), reference numeral 84 for a network, reference numeral 85 for a display of each of the client devices, reference numeral 86 for a keyboard, reference numeral 87 for a mouse as a pointing device, and reference numeral 88 for a print service device for allowing a printing at the request for printing via the network. The hardware system comprises a system in which the server device 81, the print service device 88 and the plural client devices 83 are connected to each other via the network 84.

The server device 81 is provided with a microprocessor (CPU) 81*a* for processing data and a memory 81*b* and connected to the external storage 82, thereby allowing a variety of service processing relating to the control over the entire system. In other words, the server device 81 provides a variety of services for processing at the request for processing from each of the client devices 93 via the network 84.

On the other hand, like the server device 81, each of the client devices 83 comprises a microprocessor (CPU) 83*a* for processing data and a memory 83*b* and connected to a display 85, a keyboard 86 and a mouse 87. The client devices 83 provide the function as a terminal unit for allowing the user to operate it for creating a program. In other words, the user operates the terminal function of the client device 83 to issue a request for processing to the server device 81 through the network 84, thereby proceeding with processing (program create support processing) under support for the services for the processing from the server device 81.

Then, a description will be made of a specific example of processing for storing source program information as a resource information in the resource table 24 (FIG. 2) and the undefined resource table 25 (FIG. 2) by specifically illustrating the contents of the data. The contents of the data (the source program information) for the resource information referred to herein include, for example, those created by a user (programmer) operating a display screen and operating an input and output of the program (a program creating operation) and the data by using tools such as editors and so on or those created by analyzing and decomposing existing source programs.

Figure 10:
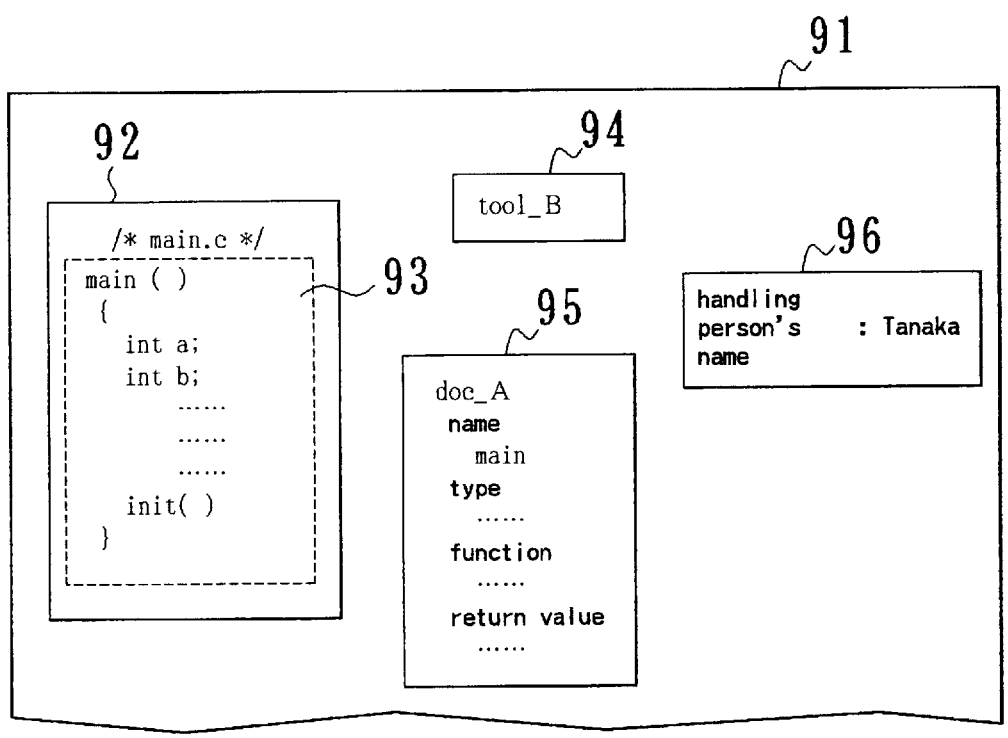
FIG. 10 is a diagram showing an aggregate of information acting as a source of source program information to be stored as resource information (resource unit) in a resource table and an undefined resource table.

FIG. 10 shows an aggregate of information acting as sources of program information to be stored as resource information (resource unit) in the resource table 24 and the undefined resource table 25. As shown in FIG. 10, reference numeral 91 stands for an entire structure of the information involved, reference numeral 92 for a program module of a program "main c", reference numeral 93 for a program element of a function "main" in the program module (hereinafter referred to as "function"), reference numeral 94 for resource information (tool names) of tools creating the program module, reference numeral 95 for a specification information, and reference numeral 96 for information of handling persons (names of handling persons).

As the information acting as the sources of the program information are supplied, the control processing section 1 (FIG. 1) starts the program dividing section 13 (FIG. 1) that in turn divides the program module 92 into units (resources) of the structuring elements of the program. In this case, the program module 92 is specifically divided into a comment and a function. Then, for the program module 92 with its entity defined and the function 93, the register processing section 20 creates their attribute information as well as their link destinations and link sources. These resources are then stored in the storing places of their entities and in the resource table 24 for each of them.

Further, the register processing section 20 analyzes the internal information of the function 93 and registers information, for example, relating to information "init" when it is detected that the function "init" is called within the inside. In other words, when it is detected that the function "init" is called in the processing process in the main body of the function "main" of the program element, the information relating to the function "init" is registered. It is to be noted herein that, for the function "init", its entity is not yet clarified, the function is registered in the undefined resource table 25.

It is to be noted herein that, as the entity information of the programs such as the program modules in storing the entity information thereof, any resource can be stored in a uniform format, regardless os whether such resource is defined by the user, whether it is created by a tool or whether it is created by a tool employed for creating it.

For the tool information 94, the specification information 95 and the handling person information 96, there are created the destinations and sources of the links between their attribute information and other resources from the tool information storing section 16, the specification information storing section 18 and the handling person information storing section 17, respectively, by the register processing section 20. Further, information (an ID field 24*a*) on identifiers for identifying each information (resource), information of kinds (a kind field 24*b*) as to whether it is a module or a function, information of names (a name field 24*c*), attribute information (an attribute information field 24*d*), link destinations (a link destination field 24*e*), link sources (a link source field 24*f*), and storing places (a storing place field 24*g*) are stored in the resource table 24.

In this case, the tool (94) is a tool with which the specification (95) is created and the function (93) is a create source of the specification (95). Therefore, as shown in FIG. 2A, for example, in the record of the resource registered as information (ID: 4) of the fourth specification, there is stored, as information to be stored in the link source field 24*f*, a link code ("gen") indicating the creation of the resource and information (ID: 2) on an identifier for identifying the function (93) as "gen: 2", in order to indicate the link indicating that the resource is created from the function (93). Likewise, the link code ("gen") for the creation of the resource and information of an identifier (ID: 3) for identifying the involved tool (94) are stored as "gen: 3" in substantially the same manner as described hereinabove, in order to indicate the link that the resource is created from the tool (94). This arrangement can create the link indicating to the effect that the specification information 95 is created (gen) from the function information 93 and that the specification information 95 is created (gen) from the tool information 94.

Then, a description will be made of the destinations and the sources of the links of the resource table 24 and the undefined resource table 25 in the order of registration in the resource table 24 for each resource (from the above). As a module having an ID number "1" contains a function "main" having an ID number "2", a link "have" is provided therebetween and stored in the link destination field 24*e* as "have: 2".

Likewise, as the function "main" having an ID number "2" references a function "init" having an ID number "11", a link "ref" is extended and stored as "ref: 11" in the link destination field 24*e*. Further, as the function "main" having an ID number "2" is a source for creating a tool "tool_B" having an ID number "4", a link "gen" is provided therebetween and stored in the link destination field 24*e* as "gen: 4".

Furthermore, as the function "main" is contained in a module having an ID number "1", it is stored as "have: 1" in the link destination field 24*f*. As a tool having an ID number "3" creates a specification having an ID number "4", it is stored as "gen: 4" in the link destination field 24*e*.

Likewise, as the specification having an ID number "4" is created from the function "main" having the ID number "2" and the tool "tool_B" having the ID number "3", it is stored as "gen: 2, gen:3" in the link destination field 24f. Further, in this case, as information on handling persons having an ID number "5" makes a reference to the function "main" having the ID number "2", it is stored as "ref: 2" in the link destination field 24e.

It is to be noted herein that, as the resources with its entity information undefined are stored in the undefined resource table 25, the function "init" having the ID number "11" is stored as "ref: 2" in the link source field 25e because it is referenced from the function "main" having the ID number "2".

Then, a description will be made of the processing for changing the contents of the registration in the resource table 24 and the undefined resource table 25 when an event such as, for example, reference, renewal, deletion, etc.) occurs for a resource after the data of the resource table 24 and the undefined resource table 25 has been stored in the manner as described hereinabove.

First, a description will be made of the case where such an event is caused to occur in the resource registered in the resource table 24. For example, when a request is made for reference to a specification "doc$_{13}$ A" having an ID number "4", a reference is made to data of the link source field 24f a for the specification "doc_A". When the link source field 24f having an ID number "4" is referred, then a link of a relation code of the link kind "gen" is extended from the function main and it can be found that the function main becomes a create source of the specification "doc_A" because the information of the specification "doc_A" is stored as "gen: 2, gen: 3". Likewise, as a link of the relation code of the link kind "gen" is extended from the tool "tool_B" for the specification "doc_A", it is found that the specification "doc_A" is created by using the tool "tool_$_B$".

When the resource of the link partner and its link con tents (attributes) are found by the kinds of the link, the renewal time of the attribute information of the specification "doc_ A" is then compared with a renewal time of the attribute information of the function "main". When it is found as a result of comparison that the renewal time of the function "main" is newer than the renewal time of the attribute information, then the specification "doc_A" is recreated from the resource of the function "main" by using the tool "tool_B" in accordance with the information of the tool "tool_B" obtained from the link contents of the link source field 24f.

In the event where a certain resource acting as the create source thereof is changed in instances where a request for a reference to the resource, the resource is created from the create source resource after change by using a tool. However, the tool to be used in this case for recreating it is the one that has been used at the time of creating the resource.

Then, a description will be made of the case where the event is caused to occur for the resource registered in the undefined resource table 25. For example, when the entity of the function "init" registered in the undefined resource table 25 is defined, the register processing section 20 creates the attribute information of the function "init" and processes the registration for transferring the resource to the resource table 24, together with the attribute information created, information on the storing place of the entity, the link destination, and the link source.

Further, in the event that an error would be caused to occur after the resource has been transferred to the resource table 24 and the function "init" is to be deleted, the register processing section 20 retains the information on the link destination and the link source of the function "init" as they are and the register processing is implemented for transferring the function "init" of the resource again to the undefined resource table 25, because the resource of the function "init" is linked to other resources.

As the register processing is implemented in the manner as described hereinabove, the link between the resources is always retained when the resource is to be registered in the resource table 24 and the undefined resource table 25. Therefore, the user is not needed to pay any particular attention to any links between the resources. Further, when the resources whose entity information is not defined yet and which are left registered in the undefined resource table 25 are displayed automatically for every given periods on a display screen on the system side (i e. the control processing section 11) of the terminal devices, it is not necessary for the user to make a search, for example, for names of functions which have been erroneously registered, thereby improving handling performance.

Then, a description will be made of the processing for changing the program resource with reference to FIGS. 11, 12 and 1.

Figure 11:
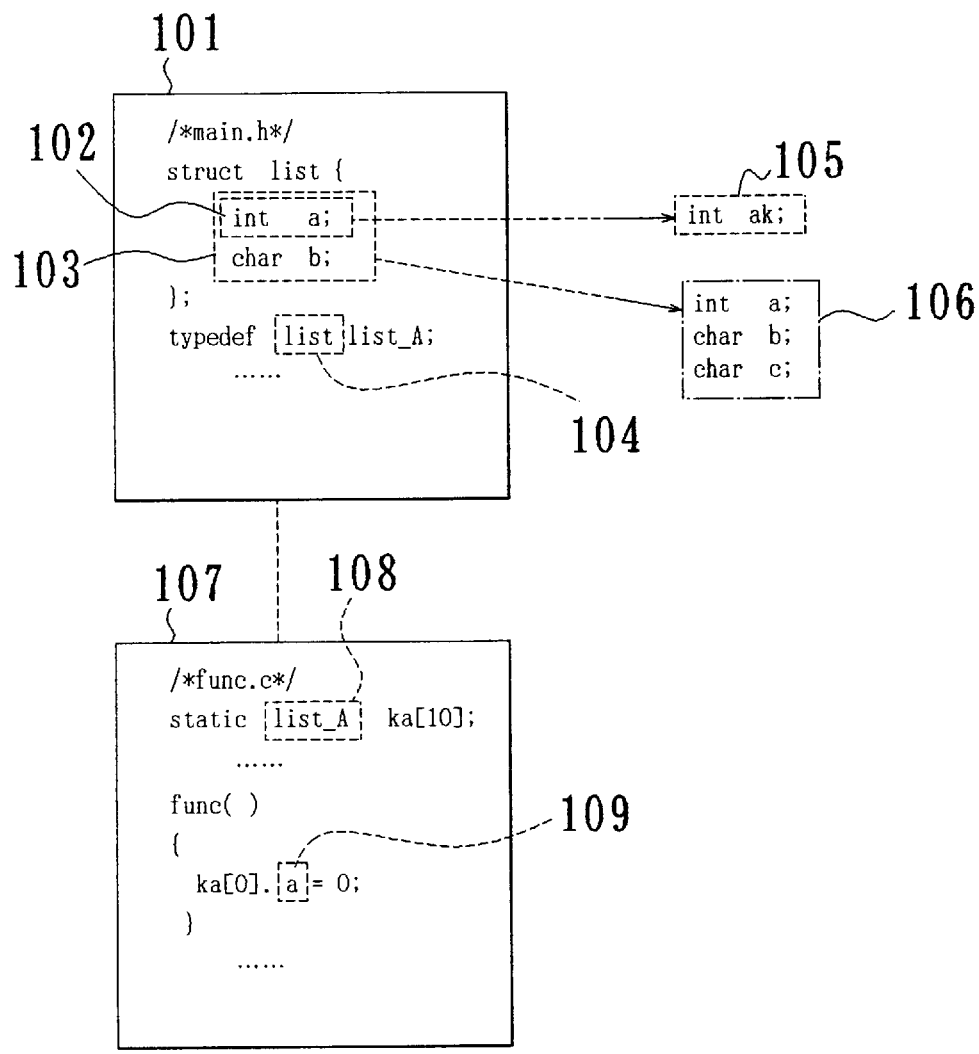
FIG. 11 is a diagram for describing the case where a source program written in C-language is employed as a resource.

FIG. 11 is a diagram for describing the case where the source program written in C-language is employed as a resource. FIG. 11 shows the resources acting as the structuring elements of the source program written in C-language. As shown in FIG. 11, reference numeral 101 stands for a header file "main h", reference numeral 102 for a variable "a" of an integer type, reference numeral 103 for the entire members of a structure "list", reference numeral 104 for the structure "list", reference numeral 105 for a variable "ak" of an integer type, reference numeral 106 for a member of the structure, reference numeral 107 for a module "func.c", reference numeral 108 for a type definition sentence "list_A", and reference numeral 109 for a variable "a".

Figure 13:
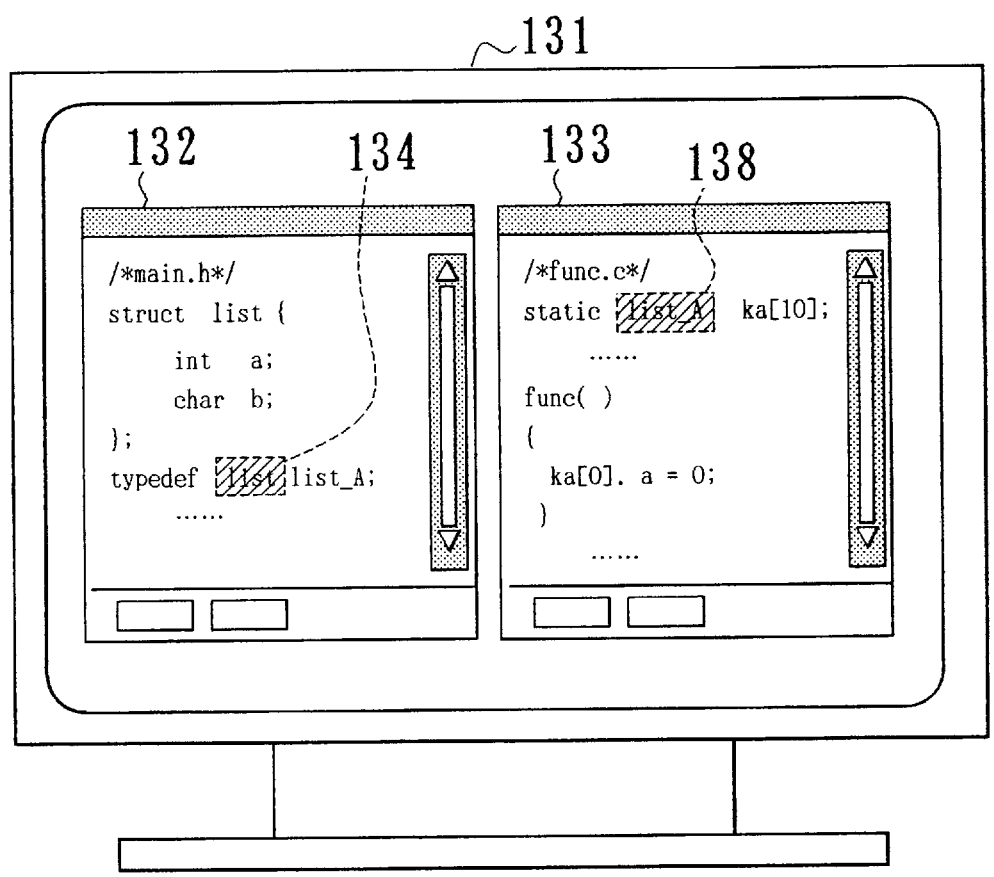
FIG. 13 is a diagram showing a display screen of a client device providing a terminal function when contents of a resource is subjected to change processing.

FIG. 12 is a diagram showing a specific example of the resource table corresponding to the source program of FIG. 11. FIG. 13 is a diagram showing a display screen of a client device providing a terminal function when contents of the resource is subjected to change processing.

For example, when a resource table 120 as shown in FIG. 12 is referenced in order to change the variable "a" (102) of the integer type to the variable "ak" (105) of the integer type, it is found that, for the resource of the variable "a" (102) of the integer type, the data of the link destination is stored in the link source field 120f as "have: 345" as data of the link source and a link "have" is extended from a structure "list" having an ID number "345". It is accordingly found in this case that the variable "a" (102) of the integer type having an ID number "230" is a member of the structure "list" having the ID number "345".

Following the above, when a reference is made to the link source field 120f of the structure "list" having the ID number "1345", it is found that it is stored as "have: 012, type: 456" as data of the link source and a link "type" is extended from a type definition sentence (typedef) "list_A" having an ID number "456" for the resource of the structure "list" having the ID number "345". Accordingly, the structures "list" having the ID number "345" is found that the type as designated therein is employed as a type definition in the name of "list_A" having an ID number "456".

Further, when a reference is made to the link source field 120f of a type definition sentence (typedef) "list_A" having an ID number "456", it is found therein that data of the link source is stored as "type: 379, type: 892" and the type definition sentence (typedef) "list_A" having the ID number "456" is linked as "type" from a variable "ka" of an integer type having an ID number "892". Accordingly, in this case, as the variable "ka" of the integer type uses a type of the type definition sentence (typedef) "list_A", the variable "a" in the module 107 is also modified to a variable "ka" in the same manner as described hereinabove.

Furthermore, as shown in FIG. 11, for example, in instances where a member 103 of the structure "list" consisting of 'an integer-type variable "a" and a character variable "b"' is modified to a member 106 of the structure consisting of '"the integer-type variable "a", the character variable "b" and "a character variable "c"' by increasing the number of variables, it is decided that the structure "list" having the ID number "345" is linked as "type" from the type definition sentence "List_A" having the ID number "456" and that the type definition sentence "List_A" having the ID number "456" is linked as "type" from the header section having an ID number "379", when the addition of the member from the data of the link sources stored in a link destination field 120e of the structure "list" having the ID number "345" is recognized as a result of reference to the resource table 120. Accordingly, these are detected as a portion upon which an influence is exerted. Then, the user who has changed using the member receives an inquiry about whether to proceed with the change as it is by inversely displaying object character string portions (134, 138) corresponding to the resources on a display screen of the program list displaying a header file 132 and a module 133 acting as objects for editing by an editing tool, as shown by a display screen 131 of FIG. 13.

When a certain resource has been changed in the manner as described hereinabove, the system according to the present invention decides whether the change be reflected to the linked resource or whether the user is inquired as to whether the change is to be reflected to the linked resource. Therefore, an optimal processing can always be implemented for the change of a resource.

Figure 14A:
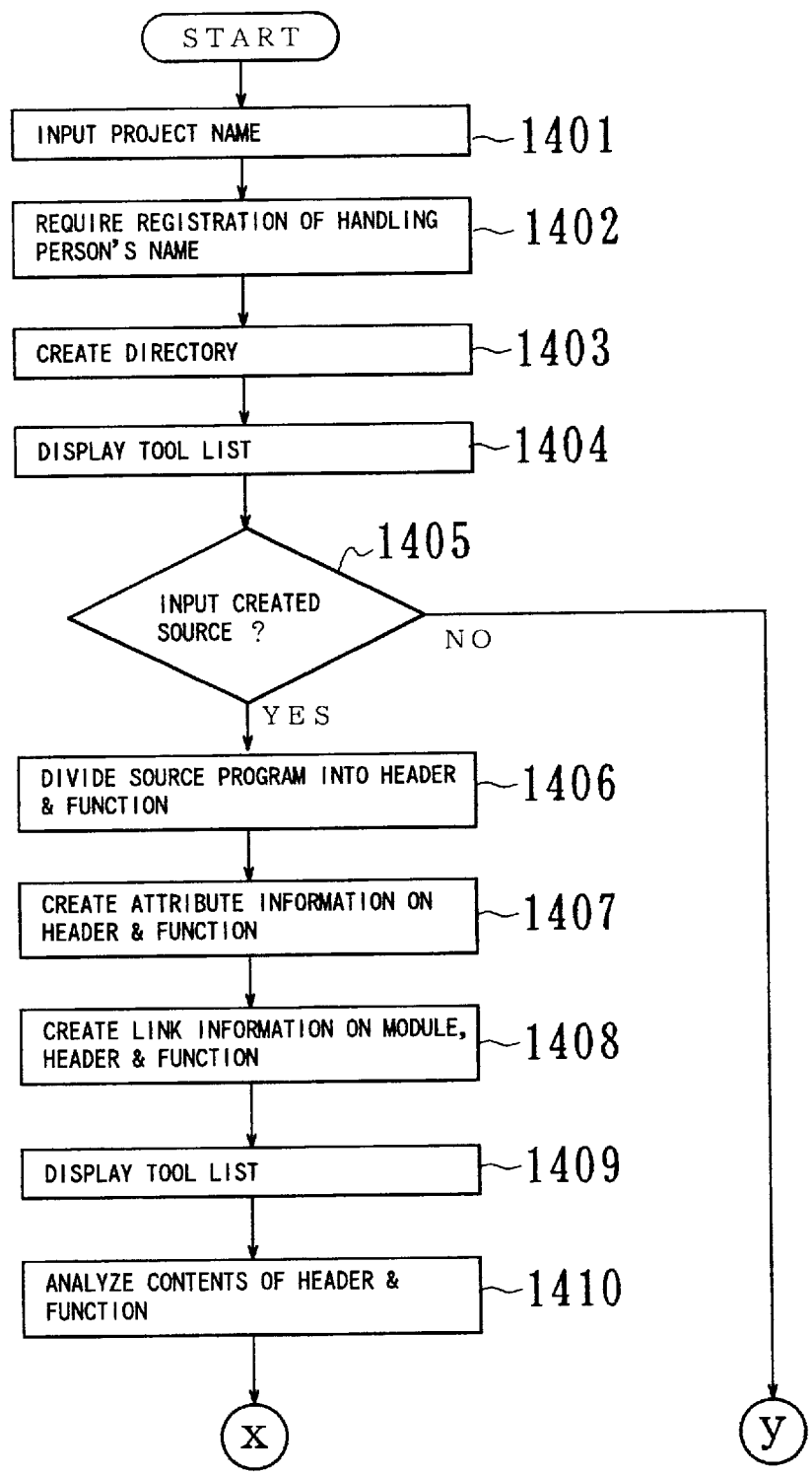
FIGS. 14A and 14B are a flowchart showing a brief flow of processes when the program is developed by the program development support system according to an embodiment of the present invention

FIG. 14A & B is a flowchart showing a flow of the processes when the program is developed by the program development support system according to an embodiment of the present invention and a description will be made of the processes for developing the program by the program development support system according to the present invention with reference to FIG. 14A & B.

As shown in FIG. 14A & B, when the processing is started, first, at step 1401, the user is requested to enter the name of the project of the program development project involved. Upon entry of the name of the project, then the user is requested for registration of the handling person in charge of the project (step 1402), followed by creating a working directory corresponding to the handling person (step 1403). Thereafter, a list of tools is displayed and a selection of the tool to be employed for the project involved in the development of the programs is requested and a registration of the tool is required (step 1404). Then, the user makes input operations for designating the tool to be registered and for registering it.

After the tool has been registered, it is decided whether a source program that has already been created is to be entered or whether the user starts creating a new program (step 1405). When it is decided at step 1405 that the created source program has been entered, the source program accepts the entry in a module unit and it is divided into units of a header and a function by the program dividing section 13 (FIG. 1) at step 1406. Then, the kinds and names of the resulting header and function are created as attribute information and registered (step 1407). For the division of the source program in this case, there may be employed, for example, a conventional well-known technique for analyzing sentences.

Then, at step 1408, link information of the header and the function of the source program is created by making a reference to the program resource definition stored in the resource definition file storing section 19, followed by registering these information in the resource tables for each of the resources (step 1409).

Following step 1409, the contents of the header and the function are analyzed (step 1410) and it is then decided whether the structuring elements of the program divided by analysis have already been registered in the undefined resource table (step 1411). When it is decided at step 1411 that the program structuring elements have been registered in the undefined resource table, then the attribute information of the program is created (step 1412), followed by transferring it to the resource table (step 1413).

On the other hand, when it is decided at step 1411 that the program-structuring elements are yet registered in the undefined resource table, it is further decided whether the structuring elements of the program analyzed and divided are definitions of their entities (step 1414). When it is decided as a result of decision at step 1414 that the entities of the program-structuring elements have been defined, the attribute information of the resources is created (step 1418), followed by creating a link information between the resources (step 1419) and registering it in the resource table (step 1420).

On the other hand, when it is decided upon decision at step 1414 that the entities of the program-structuring elements are not defined, then a link information is created between the resources (step 1415) by making a reference to the program resource definitions, and the link information is registered in the undefined resource table (step 1416).

Turning back to step 1405, when it is decided that no source program created previously is entered and the user creates a new program, the user will make definitions of the source program so that, once a definition is entered (step 1417), attribute information of the resource is created for the source program defined at the previous step (step 1418), art followed by creating a link information between the resources (step 1419) and registering it in the resource table (step 1420). These processes can create each of the resources necessary for the development of the program and register it in the resource table.

Figure 14B:
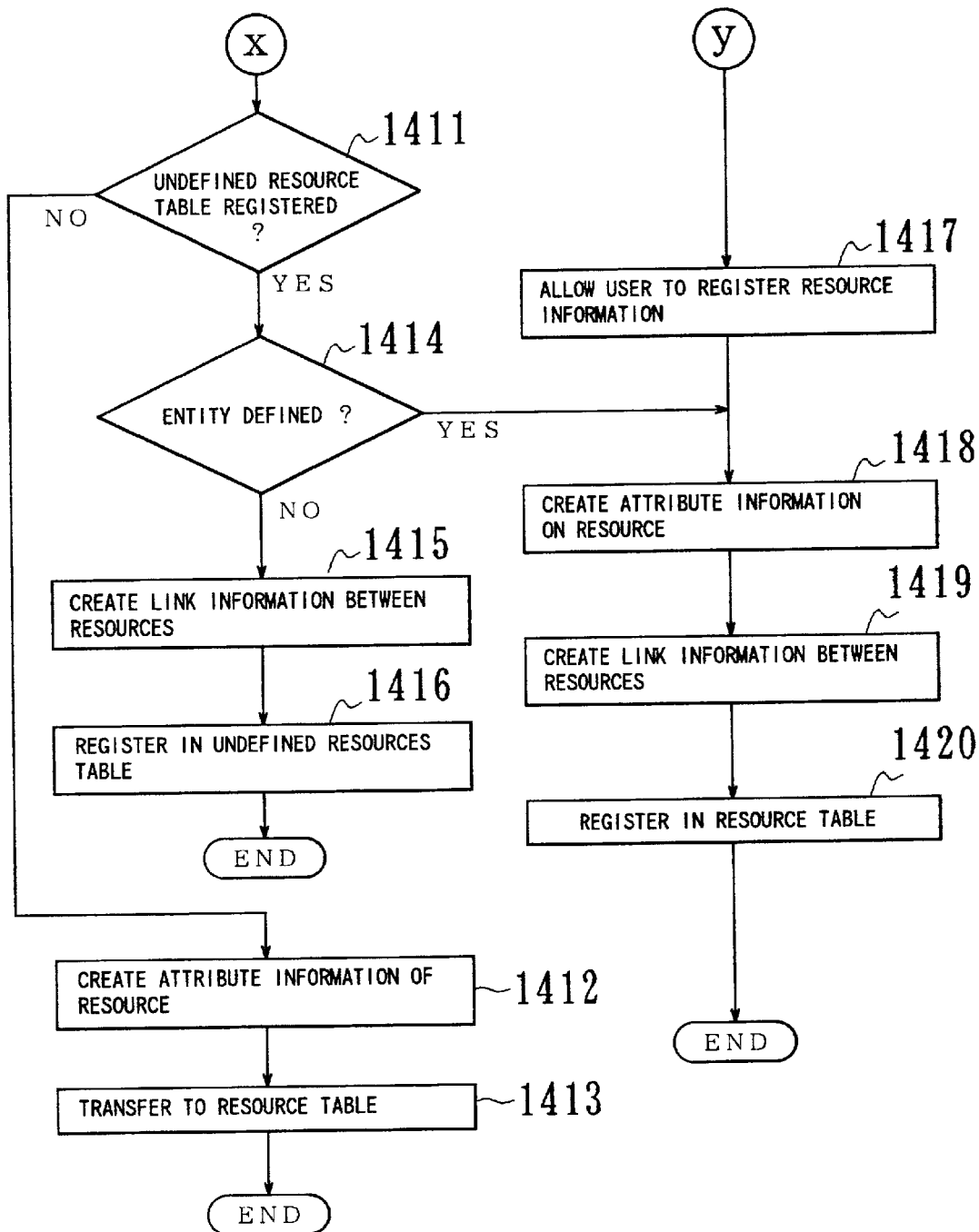
Figure 15:
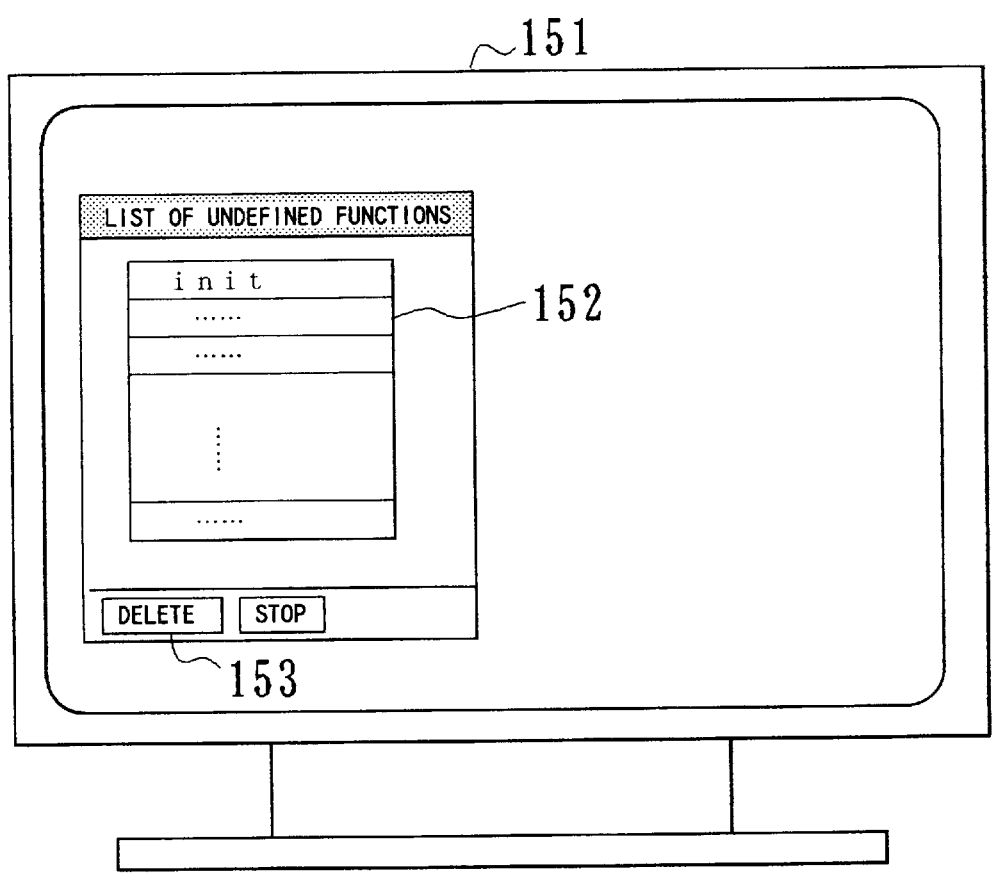
FIG. 15 is a diagram showing an example of a display screen for displaying contents (undefined resource) of a resource unit registered in the undefined resource table processed in the way as described in FIG. 14.

FIG. 15 is a diagram showing an example of an display screen displaying the contents (the undefined resources) of the resource registered in the undefined resource table processed in the way as described in FIG. 14. As described hereinabove, when the resource registered in the undefined resource table 25 exists, it is automatically displayed on a regular basis by processing on the system side so that the user can become aware of the fact that the user is using the resource with its entity information kept yet undefined and a wrong name of the function.

As shown in FIG. 15, reference numeral 151 stands for a display screen, reference numeral 152 for a list of undefined functions, and reference numeral 153 for a delete button. As it is configured such that the undefined function list 152 is displayed automatically on the display screen 151 for every given periods of time as designated by the user, the user can unconsciously become aware of the existence of the undefined resource and the delete button 153 accepts a request for deleting the resource from the undefined function list 152. When an edit tool is registered and a link is extended thereto, a function to be edited is selected from the undefined function list 152, followed by starting the edit tool linked thereto and allowing the user to implement modifying or correcting processes on an edit screen by using a window of the editing tool.

Although the above description is made by taking as an example the case where the undefined resource is a function, it also may be possible to define the undefined resource by displaying a list of undefined resources not limited to functions, in place of the undefined function list 152. With this, the information to be employed for the program development can be linked and registered in a file, thereby allowing its link relation to be always retained and displaying it. Further, even if the resource whose entity is left undefined remains as it is for a long time, it is displayed on the display unit for a given period of time so that the user can become aware of the existence of the resource whose name is wrong or which is not intended to be employed any more.

As described hereinabove, the program development support system according to the present invention can readily make programmers aware of the existence of information remaining in such an undefined state as being unknown to be employed for the program development by managing each information to be employed for the program development as a resource, extending a link between the resources so as to provide the link with a logical meaning, and registering the resource information of the resource whose entity is defined and the undefined resource information of the resource whose entity is not defined in separate tables.

Further, once information (a one resource unit) defined as a resource information has been deleted, the deleted resource information is registered in a table of undefined resource information while retaining a link thereof to other resource information by the aid of the kind of the link between the resource information and the deleted resource information. Therefore, if the user wishes to use the once deleted resource information again for the development of the programs, it is not required to define a link to other information simply by defining the deleted information without the necessity of redefining the link to other information. In this case, the link information between each of the resources contains a kind of the link so that, when a certain information is changed, the user can accurately learn a scope upon which the change of the information can exert an influence. Further, the influence can be accurately reflected upon the scope.

Figure 16:
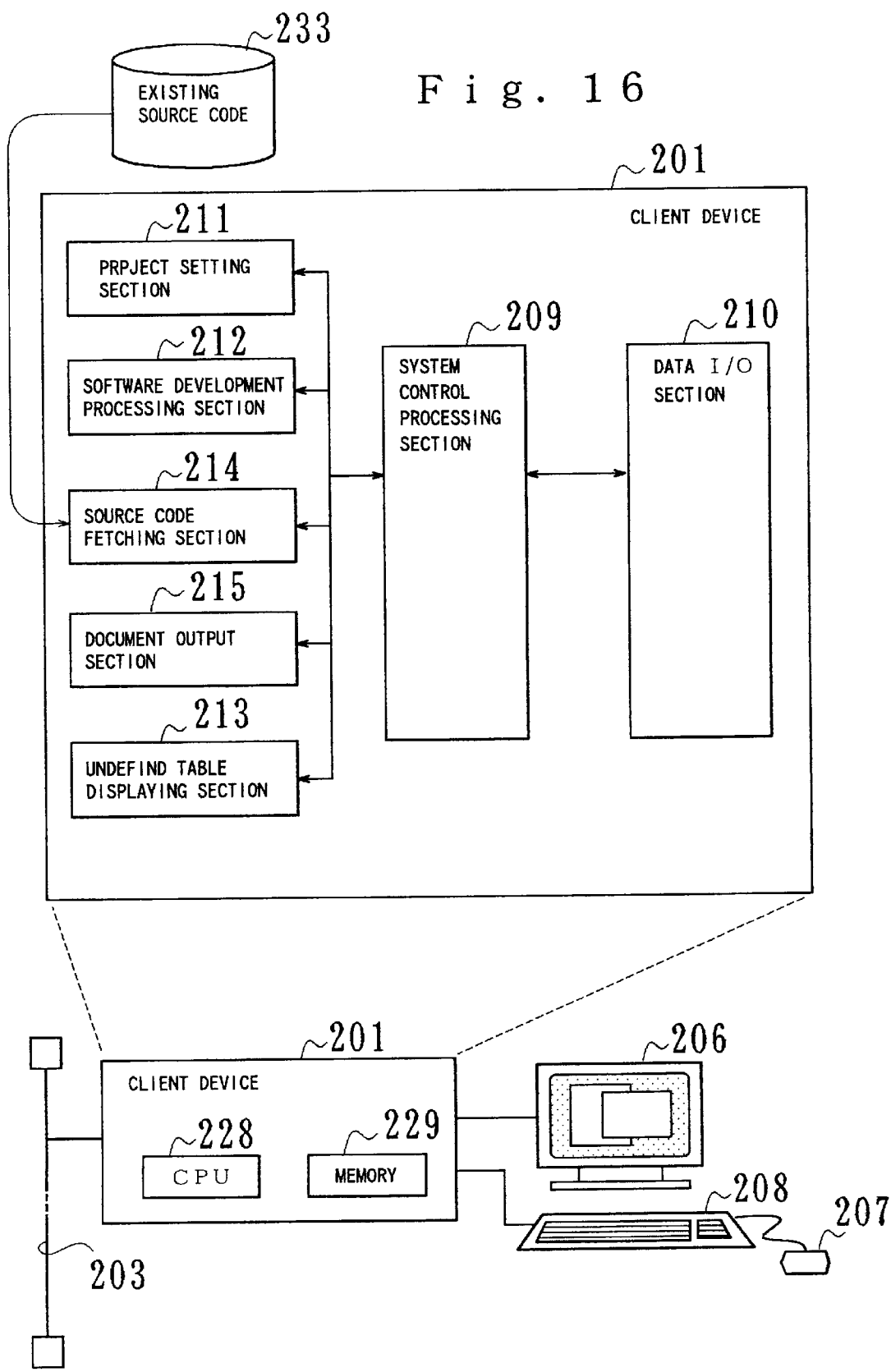
FIG. 16 is a diagram indicating details of the configuration of the client device as shown in the system configuration as shown in FIG. 9.
Figure 17:
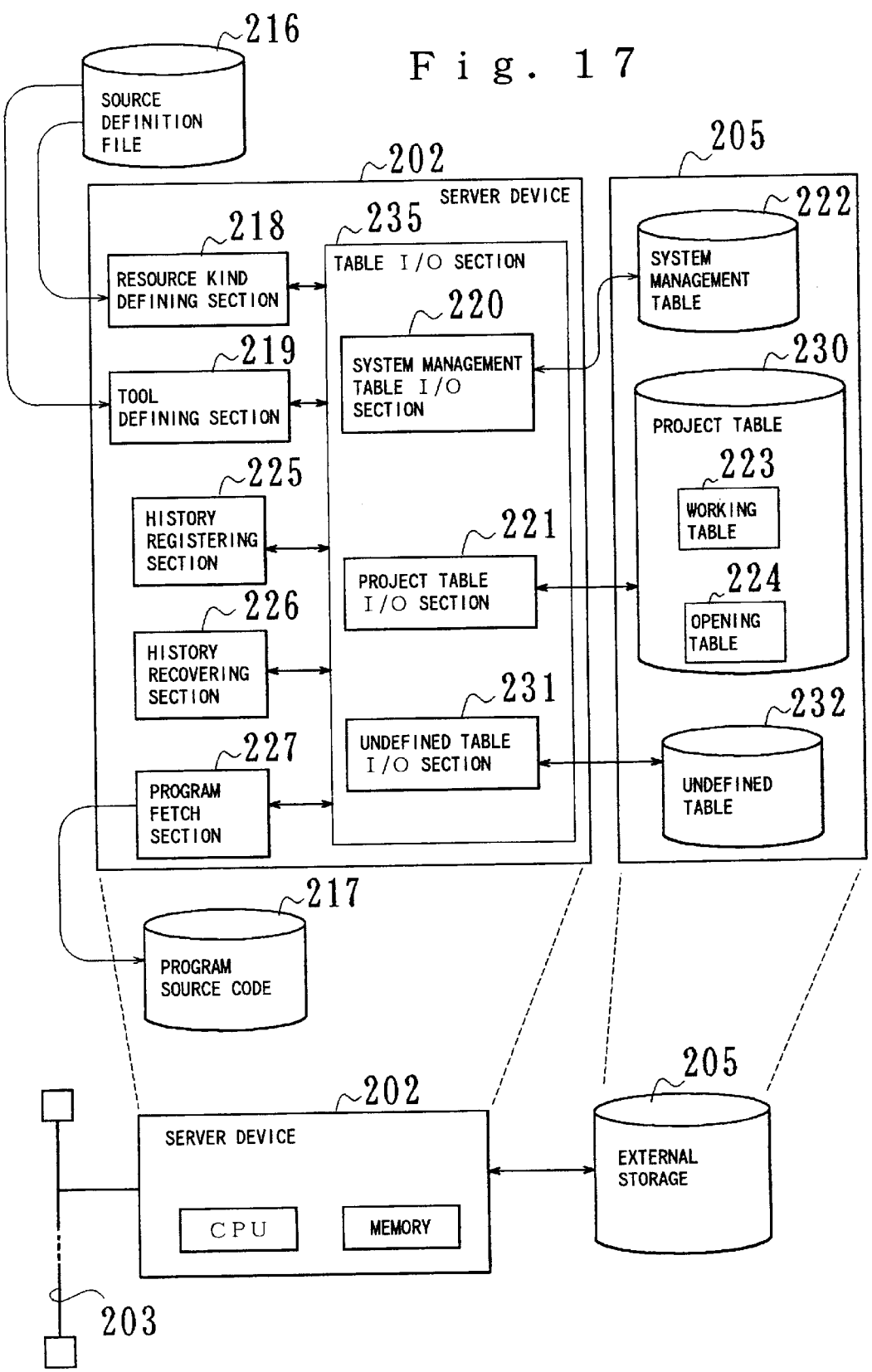
FIG. 17 is a diagram indicating details of the configuration of a server device in the system configuration as shown in FIG. 9.

Then, a description will be made of the details of an example of specific operations for the development of the program with reference to FIGS. 16 and 17. FIGS. 16 and 17 show the details of the configurations of the client devices and the server device, respectively, as shown in the system configuration indicated in FIG. 9. In FIGS. 16 and 17, reference numeral 201 stands for a client device, reference numeral 202 for a server device, reference numeral 205 for an external storage, reference numeral 206 for a display unit, reference numeral 207 for a mouse unit, and reference numeral 208 for a keyboard unit. These units correspond to the system configuration of FIG. 9.

The client device 201 provides a terminal operation function for allowing a person in charge of the development of the program to implement operations therefor. The client device 201 is provided with the display unit 206 for displaying data, the mouse unit 207 for pointing the data displayed on the display screen, and the keyboard unit 208 for entering characters. On the other hand, the server device 202 manages data necessary for the development of the program so as to correspond to a request for input and output of the information from the client device 201. As a network device 203 is illustrated in the drawings as symbolically connecting the devices with lines alone, it connects the client devices 201 to the server device 202 via a given communication protocol.

As shown in FIG. 16, the client device 201 is further provided with a system control processing section 209, a data i/o section 210, a project setting section 211, a software development processing section 212, a source code fetch section 214, a document output section 215 and an undefined table display section 213. On the other hand, as shown in FIG. 17, the server device 202 is further provided with a resource kind a definition section 218, a tool definition section 219, a history registering section 225, a history recovery section 226, a program fetch section 227, and a table i/o section 235. The table i/o section 235 comprises three parts consisting of a system management table i/o part 220, a project table i/o part 221, and an undefined table i/o part 231. The external storage 205 stores data to be employed herein for the development of the program and has a system management table 222, a project table 230 and an undefined table 232. The project table 230 further comprises a working table 223 and an opening table 224.

As data of system elements, a resource definition file 216 defines attributes of each information of the programs, specifications, developing persons and tools as well as the link information interacting therewith as kinds of the information necessary for the development of the programs. The developed programs can be fetched from a program source code file section 217.

The system management table 222 registers data for managing the configuration of the entire system. The project table 230 for managing the data of the project stores data in currently process of correction in the project by the working table 223 and stores the data opened to the handling persons in charge of the project after the correction of the project has been finished. The undefined table 232 temporarily defines data which are not defined in the project table yet referenced by the data of the project table and stores them therein.

For the client device 201, the system control processing section 209 controls the processing on the client side. The data i/o section 210 implements data i/o operations to and from the server. The project setting section 211 sets the project for the development of software. The software development processing section 212 is a system element for processing the software development. The undefined display section 213 displays the undefined resource table on the display screen when the undefined resource is registered in the undefined resource table as described hereinabove. The source code fetch section 214 fetches a source code from the outside. For example, program source data of an existing source code 233 are fetched when the source program already created is employed. The document output section 215 outputs a document from the information accumulated.

In the server device 202 (FIG. 17), the resource kind definition section 218 defines a resource kind on the basis of the resource definition file and the tool definition section 219 defines a tool information on the basis of the resource definition file. The table i/o section 235 registers data from the client device 201 in the system management table 222, the project table 230, and the undefined table 232. In this case, the history registering section 225 acquires and registers a history of changes of data, for example, when the data are to be copied to the opening table 224 from the working table 223 of the project table 230. The history recovery section 226 recovers the data in the working table 223 of the project table 230 by searching for the object data from the history of the changes, when the data are to be recovered. The program fetch section 227 fetches the developed program from the project table 230.

As described hereinabove, the table i/o section 235 comprises the system management table i/o part 220, the project table i/o part 221, and the undefined table i/o part 231. The system management table i/o part 220 implements the i/o processing to and from the system management table 222. The project table i/o part 221 implements the i/o processing to and from the working table 223 and the opening table 224 of the project table 230. The undefined table i/o part 231 implements the i/o processing to and from the non definitions table 232. It is to be noted herein that the client device 201 comprises a central processing unit (CPU) 228 for implementing the processing of data and a memory 229 and the server device 202 is configured by substantially the same device units as the client device 201.

Now, a description will be made of a flow of processing (data) in accordance with the system configuration of the program development support system according to the embodiment of the present invention with reference to FIGS. 16 and 17.

In order to make the system executable, the resource data of the resource definition file 216 are entered in to the resource kind definition section 218 and the tool definition section 219, followed by creating the system management table 222 by the system management table i/o part 220 of the table i/o section 235. Then, in the project setting section 211, a project is created for the development of a software and the project table 230 is created for entering data to be created for the project. The data to be created for the project allows the project table i/o part 221 of the table i/o section 235 in the server device 202 to create data in the working table 223 and the opening table 224 of the project table 230 via the data i/o section 210 through the system control processing section 209. When the existing source code 233 can be employed, data can be registered in the project table 230 by the aid of the source code fetch section 214.

It is to be noted herein that, when the history of changes of data is to be managed, the history of changes is registered in the project table 230 by the history registering section 225. In order to return the data to the state before change, the project table 230 is returned to the data before the change with the aid of the history recovery section 226. The undefined information employed in the project table 230 is registered in the undefined table 232 by the undefined table i/o part 231. The information in the undefined table 232 is displayed on the display unit 206 in the client device 201 by using the undefined table i/o part 231.

When the development of the software has been completed in the manner as described hereinabove, the program created is sent as the program source codes from the project table 230 by the aid of the program fetch section 227. Further, the contents of the project table 230 are sent as a document by the data i/o section 210 to a printer device (not shown) from the document output section 215 of the client device 201. The information to be sent to the printer device can also be displayed on the display unit 206 of the client device 201.

Figure 18:
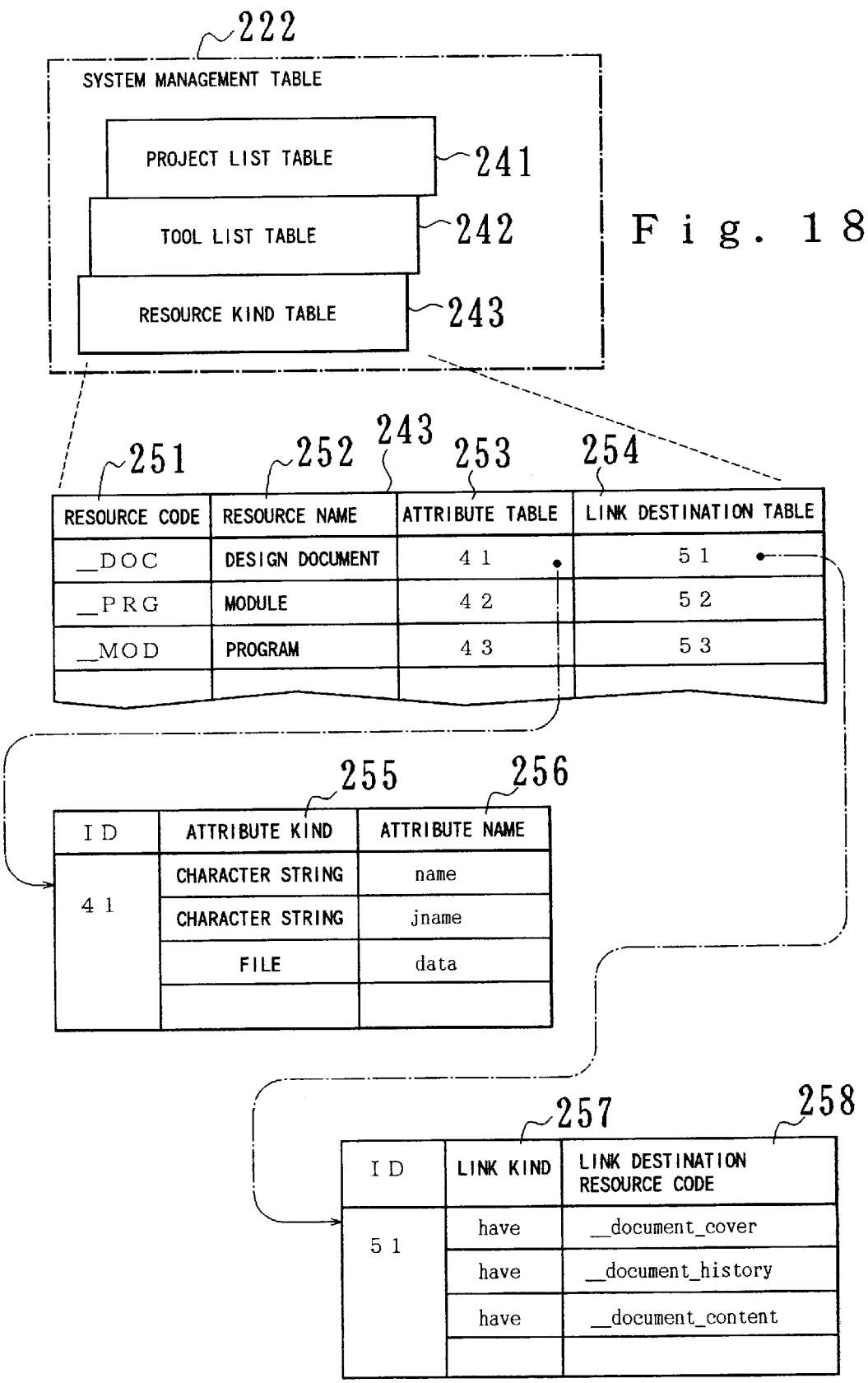
FIG. 18 is a diagram showing the configuration of a resource kind table of a system management table.

FIG. 18 is a table configuration diagram showing the configuration of a resource kind table 243 of the system management table 222. The resource kind table 243 of the system management table 222 is created by entry of the definition data from the resource definition file 216 by the resource kind definition section 218 in the manner as described hereinabove. As shown in FIG. 18, the configuration of the table consists of resource codes 251 for identifying the kinds of the resources, resource names 252 for storing the names of the resources in Japanese, an attribute table 253 in which pointers pointing tables are stored, and a link destination table 254 in which link destinations are stored. In the table pointed in the attribute table 253, there are stored attribute kinds 255 representing data kinds of the attributes and attribute names 256 for entering or delivering the attributes. In the table pointed in the link destination table 254 are stored link kinds 257 representing kinds of links and link destination resource codes 258 representing kinds of resources of the link destinations.

Figure 19:
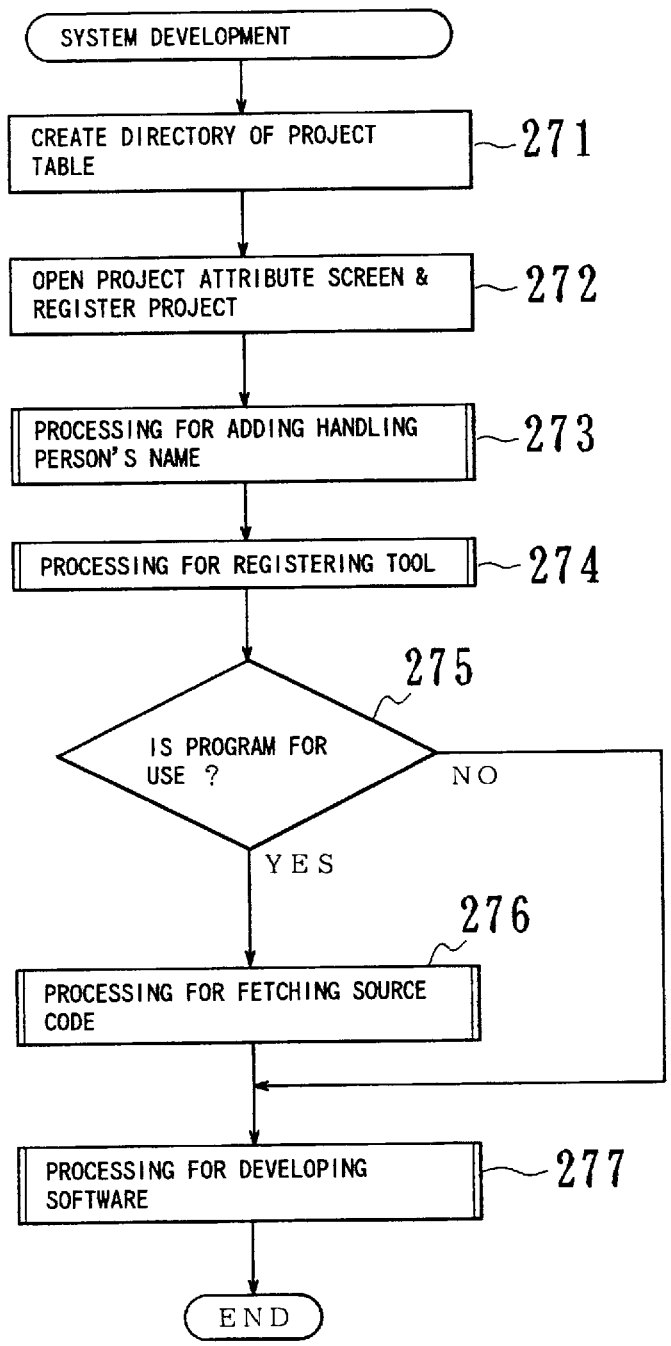
FIG. 19 is a flowchart showing an outline of the entire processing we the system is to be developed.

A description will now be made of a specific example of the processing for the development of a system by setting the project for the system development by using each of system elements of the program development support system according to the embodiment of the present invention. FIG. 19 is a flowchart showing an outline of the entire processing for developing the system.

As shown in FIG. 19, first,. a development project is registered by the project setting section 211 for the development of the system. More specifically, the processing. for the registration of the project comprises, first, creating a directory for storing the project table 230 (step 271) and then registering a new project by opening a window screen for setting the attributes of the project (step 272). Thereafter, for the registered project, there are implemented the processing for adding handling persons (step 273) and the tool register processing for registering tools (step 274).

In instances where there is available an existing program among developed programs, which can be employed for the development of a software of the project (step 275), the source code of the program is fetched by the source code fetch section 214 (step 276), followed by developing the program of the system by the software development processing by the software development processing section 212 (step 277).

Figure 20:
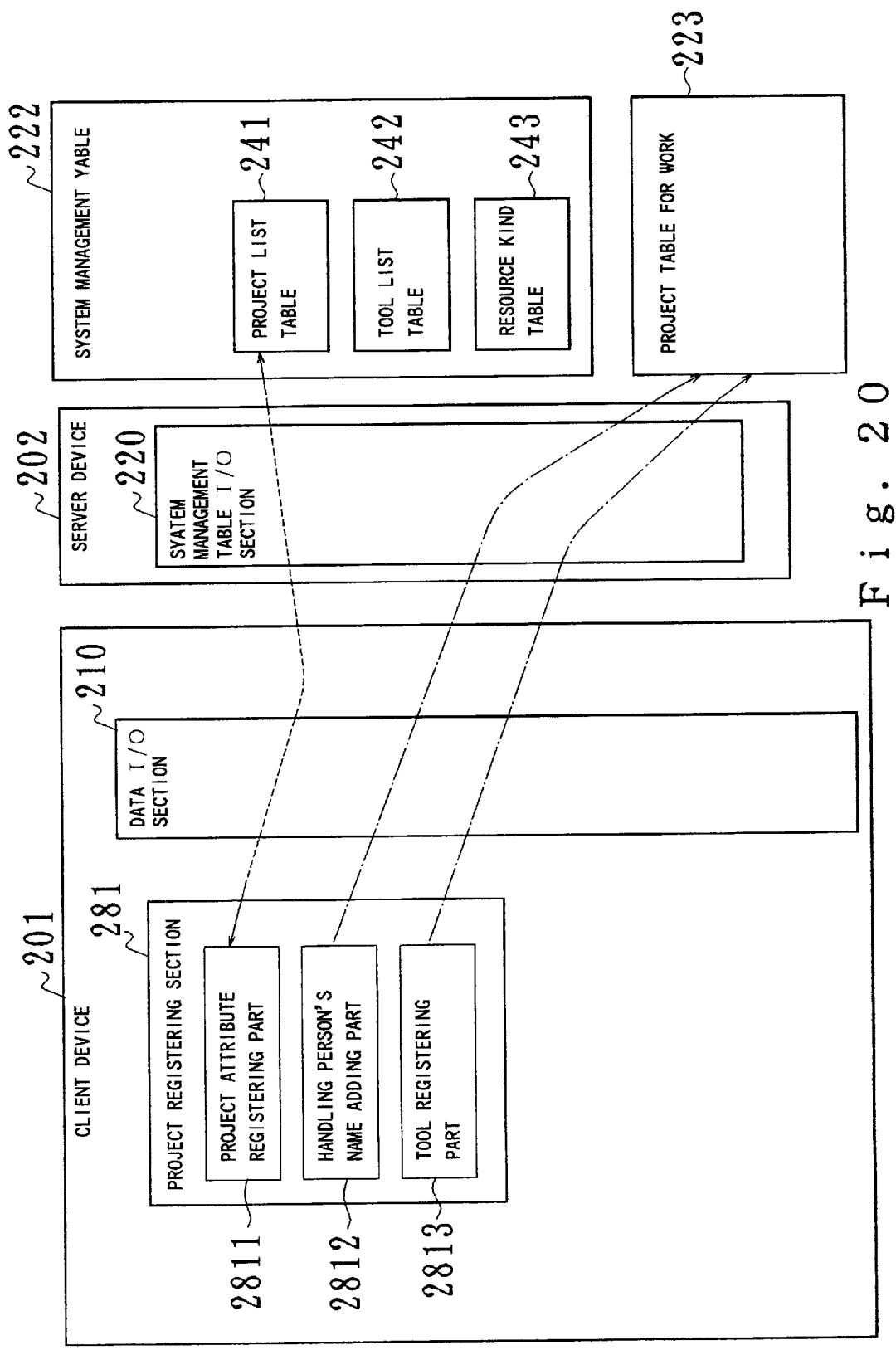
FIG. 20 is a functional block diagram showing the configuration of a project registering section.

FIG. 20 is a functional block diagram showing the configuration of the project registering section 281. As described hereinabove, the system management table 222 consists of a projects list table 241 for managing a list of the projects managed by the system, a tool list table 242 for storing a list of the tools, and a resource kind table 243 for defining resources usable by the system. The project registering section 281 of the client device 201 can register the project by making access to the project list table 241 of the system management table 222 and registering the project as well as set data of the attributes of the project in the working table 223 of the project table 230.

The project registering section 281 newly registers a project in the project list table 241 of the system management table 222. In the project registering section 281, the project attribute registering part 2811 edits and registers the contents of the attributes of the project and the handling person adding part 2812 registers the addition of a handling person to the working table 223 of the project table 230. The tool registering part 2813 registers a tool to be employed for the project in the working table 223 of the project table 230 from the tool list table 242 of the system management table 222.

Figure 21:
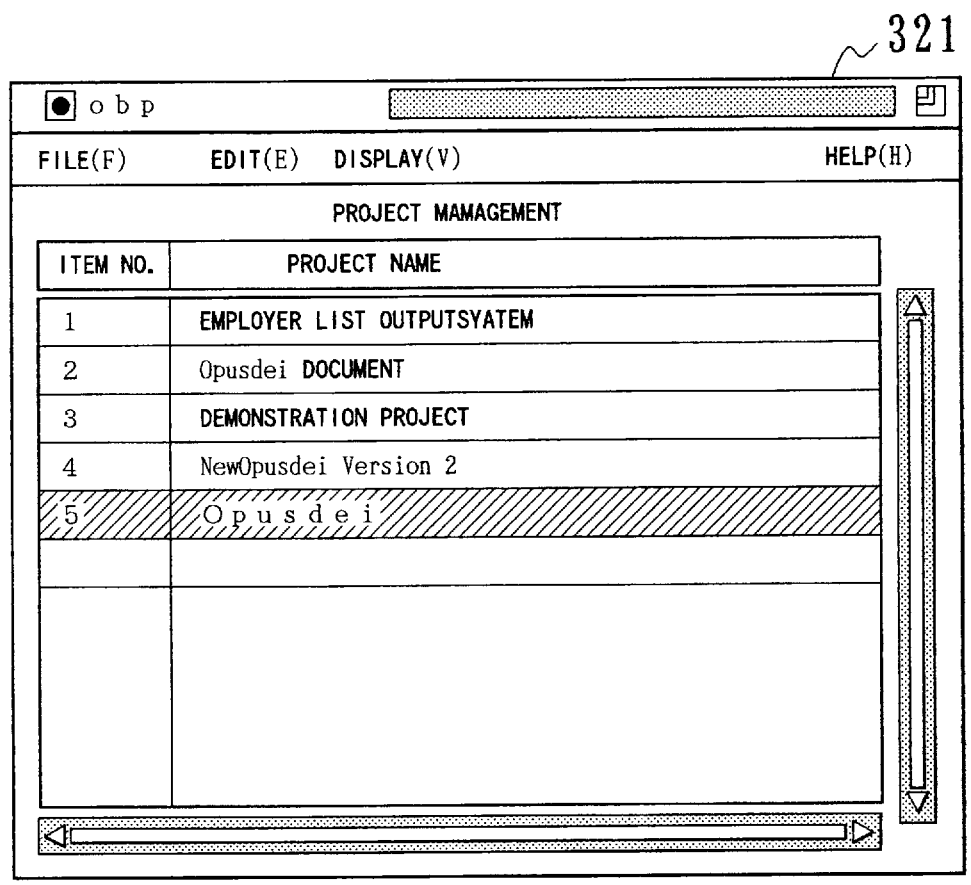
FIG. 21 is a diagram showing an example of a window screen indicating a project list.

Now, the processing by the project registering section 281 will be described with reference to FIGS. 21 and 22. FIG. 21 shows an example of a window screen indicating the project list 241 and FIG. 22 shows the contents of the project list table 241 managing an attribute information of the project.

Figure 22:
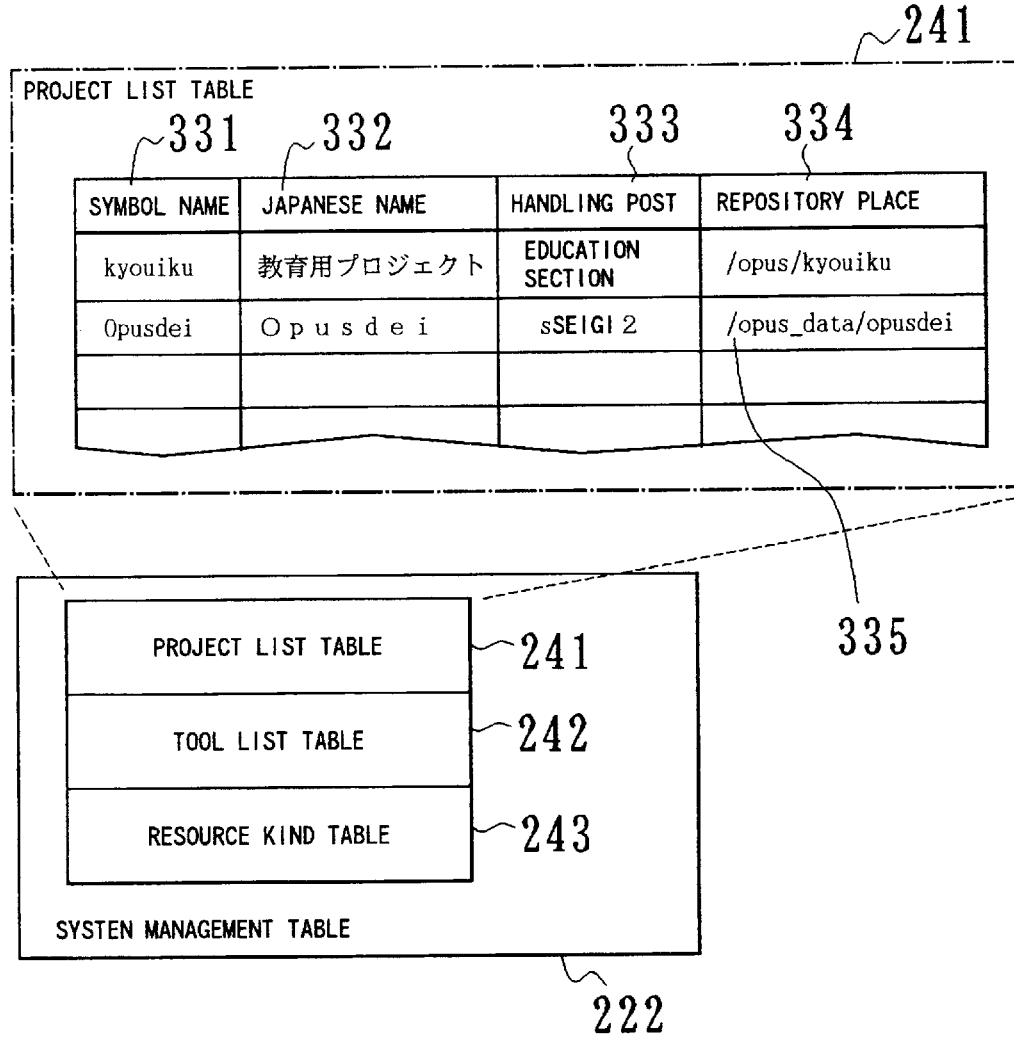
FIG. 22 is a diagram for describing the contents of the configuration of a project list table 241 for managing an attribute information of a project.

As shown in FIG. 22, the project list table 241 comprises a symbol names area 331 in which to store symbol names of the projects, a Japanese name area 332 for storing names of the projects in Japanese, a handling post area 333 for storing handling posts of handling the projects, and a repository place area 334 for storing names of directories for storing the project table. A window screen for setting the attributes of the project is opened and the data for setting the input project are registered as one record 335 in the project list table 241.

The contents of the project list table 241 set in the manner as described hereinabove are displayed in a list type on the project list screen 321 displaying a list of the projects (hereinafter referred to sometimes as "a project list screen").

Now, a description will be made of the processing by the handling person adding part in the project registering section 281 with reference to FIGS. 23A, 23B and 24. FIGS. 23A and 23B show the contents of the handling person resource record of the working table 223 of the project table; and FIG. 24 shows a window screen for setting and changing attributes of the handling persons in charge of the project.

As shown in FIG. 23A, records having attributes of the handling persons are registered in the working table 223 of the project table. A record managing the top of the records having the attributes of the handling person is shown as a handling person root data 3401. The handling person root data 3401 consists of resource IDs 3402, resource codes 3403 representing kinds of the resources, resource names 3404 for storing the names of the resources in Japanese, and a resource list table 3405 for managing the resource IDs of the resource codes registered in the working table 223 as resource records having the attributes of the handling persons.

Further, as shown in FIG. 23B, the resource records of the handling person registered in the resources list table 3405 comprise areas for storing data of each of resource IDs 3406 provided on the records of the handling persons, resource codes 3407 for identifying the resources of the handling persons, symbol names 3408 for storing the names of the handling persons in English, Japanese names 3409 for storing the names of the handling persons in Japanese, managers 3410 for identifying persons responsible for the development of the project, working places 3411 for storing names of directories of the working places for the handling persons, and a display resource table 3412 for registering the resource codes displaying the handling persons on the screen. In the area of the display resource table 3412, there is stored a pointer pointing the table in which entity data are stored. In the entity data table of the display resource table 3412, resource codes 3413 to be displayed are registered in a list type.

The attributes of the handling person in charge of the program to be changed or to be set are selected from the project list screen 321 (FIG. 21), followed by displaying the handling person-set/change screen 361 as shown in FIG. 24. The information on the handling person edited on the handling person-set/change screen 361 is registered in the project table 230.

The information set in the handling person-set/change screen 361 (FIG. 245) allows the system to decide a resource ID to be decided primarily in the working table 223 of the project table, sets it in an area of the resource IDs 3406 and sets a resource code indicating the resource record of the handling person in the resource codes 3407. The record of the handling person resource is registered in the working table 223 of the project table.

Figure 25:
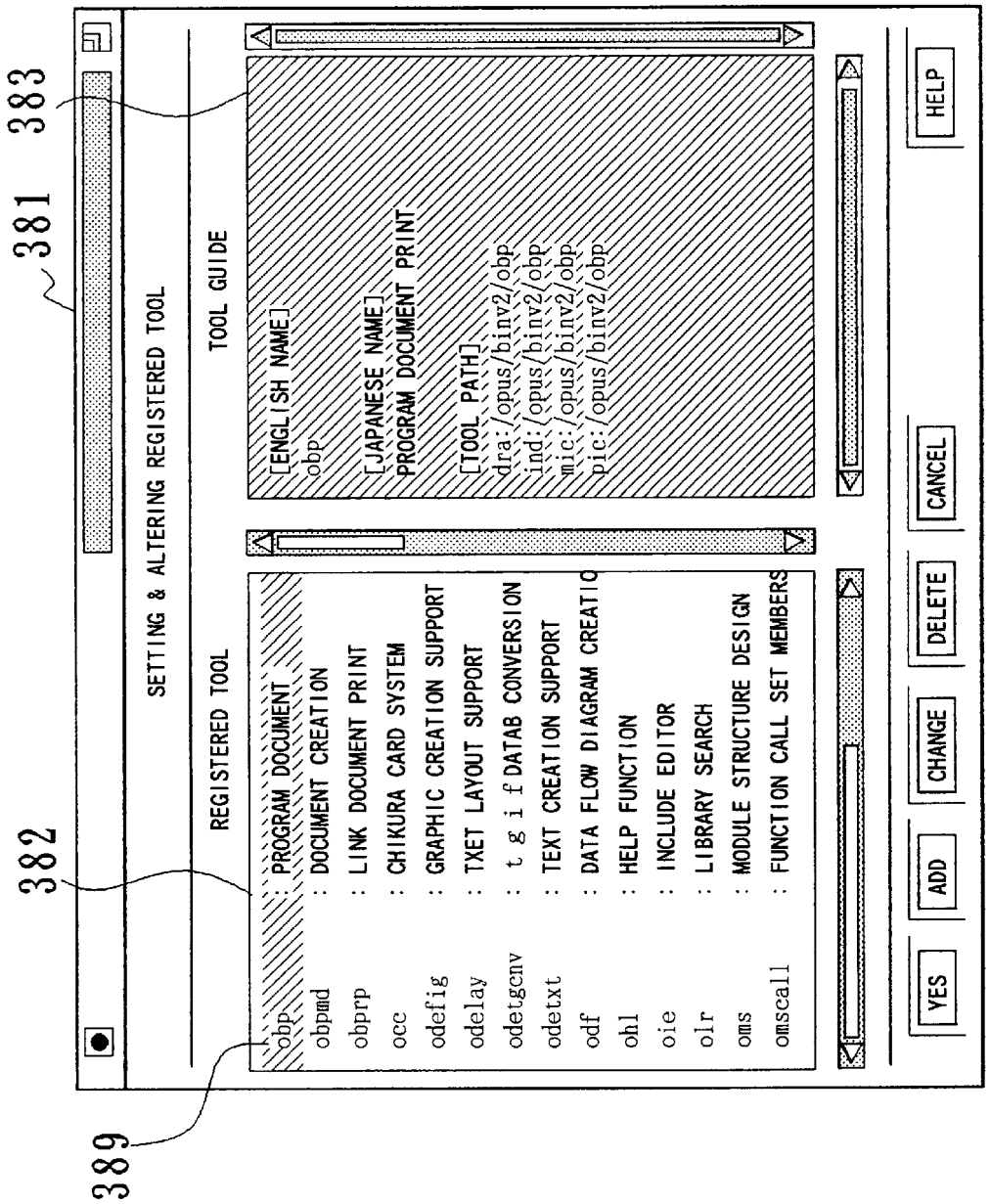
FIG. 25 is a diagram showing an example of a screen for setting and changing registered tools by setting information of the tool to be employed for the project or changing information of the tool.
Figure 26:
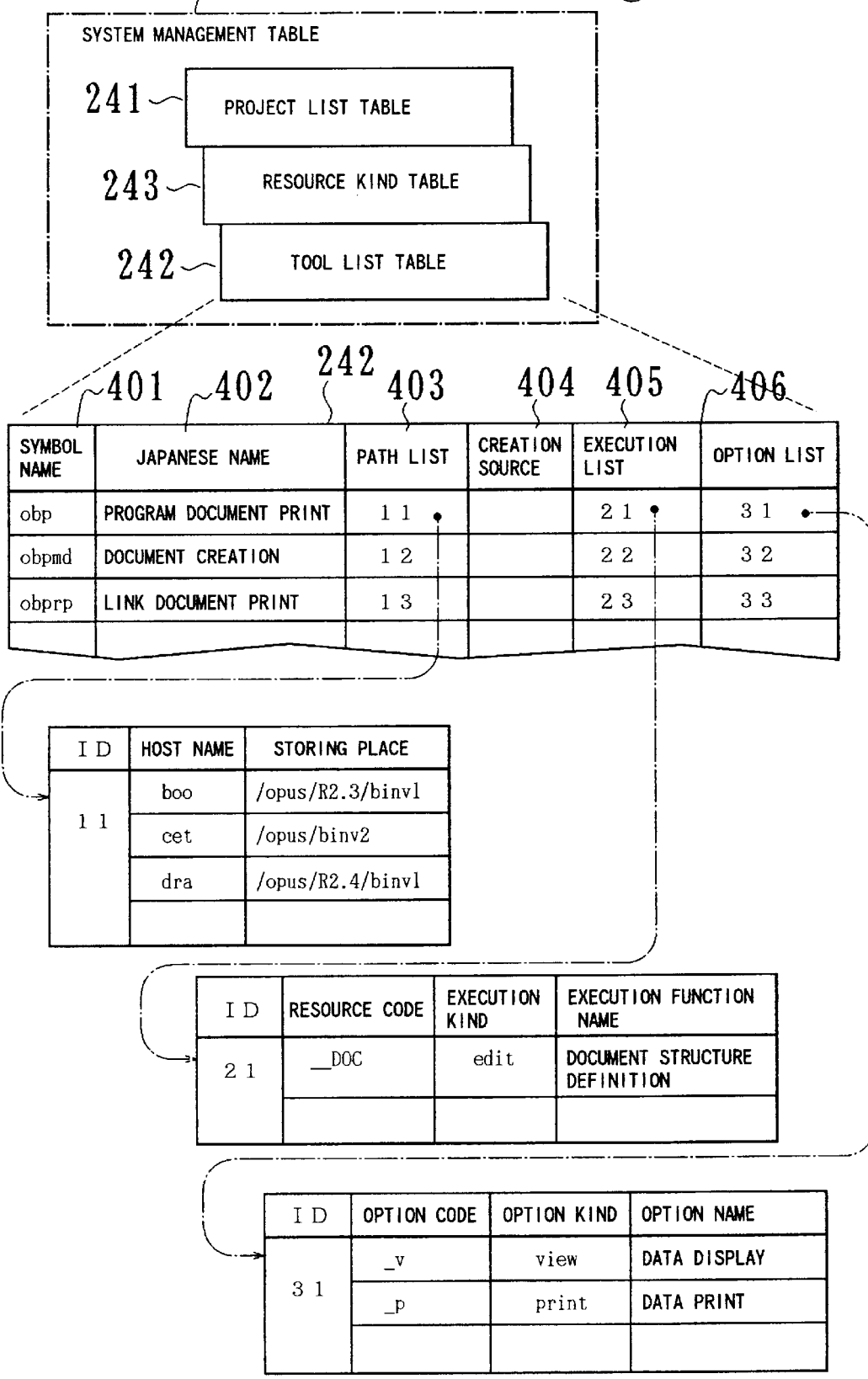
FIG. 26 is a diagram for describing the configuration of a tool list table of a system management table.

Then, a description will be made of the processing for registering tools (processing by the tools registering section) in the project registering section 281 with reference to FIGS. 25, 26, 27A and 27B. FIG. 25 shows an example of a screen for setting and changing registered tools; FIG. 26 describes the configuration of the tool list table of the system management table; and FIGS. 27A and 27B describe a data type of the tool records registered in the working table of the project table.

As shown in FIG. 26, the tool list table 242 in the system management table 222 comprises a symbol name field 401, a Japanese name field 402, a path list field 403, a create destination field 404, an execution list field 405 and an option list field 406.

In the symbol name field 401 are stored the names of the tools to be employed upon execution of the system. In the Japanese name field 402 are stored the names in Japanese provided on the tools. In the path list field 403 are stored the names of hosts, of the client devices 201 that can be executed by the tool, the storing places for storing the names of directories in which the tool is stored, and pointers pointing. the table stored in a table type. In the create destination field 404, there are stored resource codes of the create destinations acceptable when the tool creates the information. In the execution list field 405 are stored the pointers pointing the,table storing the data for managing an executing status of the tool. In the table to be pointed by the pointer to be stored in the execution list field 405, there are stored resource codes, kinds of execution, and names of executing functions as data for managing the executable status of the tool in such a manner as corresponding to each other, thereby managing the names in Japanese of the executable functions as to what execution kind can be provided for the data of which resource code.

Further, in the option list field 406, there are stored the pointers pointing the table storing the data for the option capable of being designated upon execution of the tool. In this table, there are stored the option codes capable of being designated upon execution of the tool, the kinds of the options for identifying the option codes, and the names in Japanese of the options in a manner that they correspond to each other.

As shown in FIG. 27A, there are registered the records having the attributes of the tools in the working table 223 of the project table. The top of the record of the tool is managed by tool root data 4101. The tool root data 4101 comprises resource IDs 4102 to be added by the system, resource codes 4103 indicating data of the tool, resource names 4104 of the names in Japanese provided on the record, and a resource list table 4105 for managing the resource IDs of all the records having the attributes of the tool.

Further, as shown in FIG. 27B, the resource record of the tool registered in the resource list table 4105 comprises ares for storing each of the data including resource IDs 4106 provided on the record of the tool, resource codes 4107 for identifying the tool resources, symbol names 4108 for storing the command names of the tools, Japanese names 4109 of tools in Japanese for storing the names of the tools in Japanese, an execution function table 4110 for managing the kinds of execution for the resource codes, an option table 4111 for managing the names of the option codes and the options for the kinds of the options, and a path table 4112 for managing the names (host names) of the client devices executable in the project and the storing places in which the path having the executing modules is stored.

Figure 28:
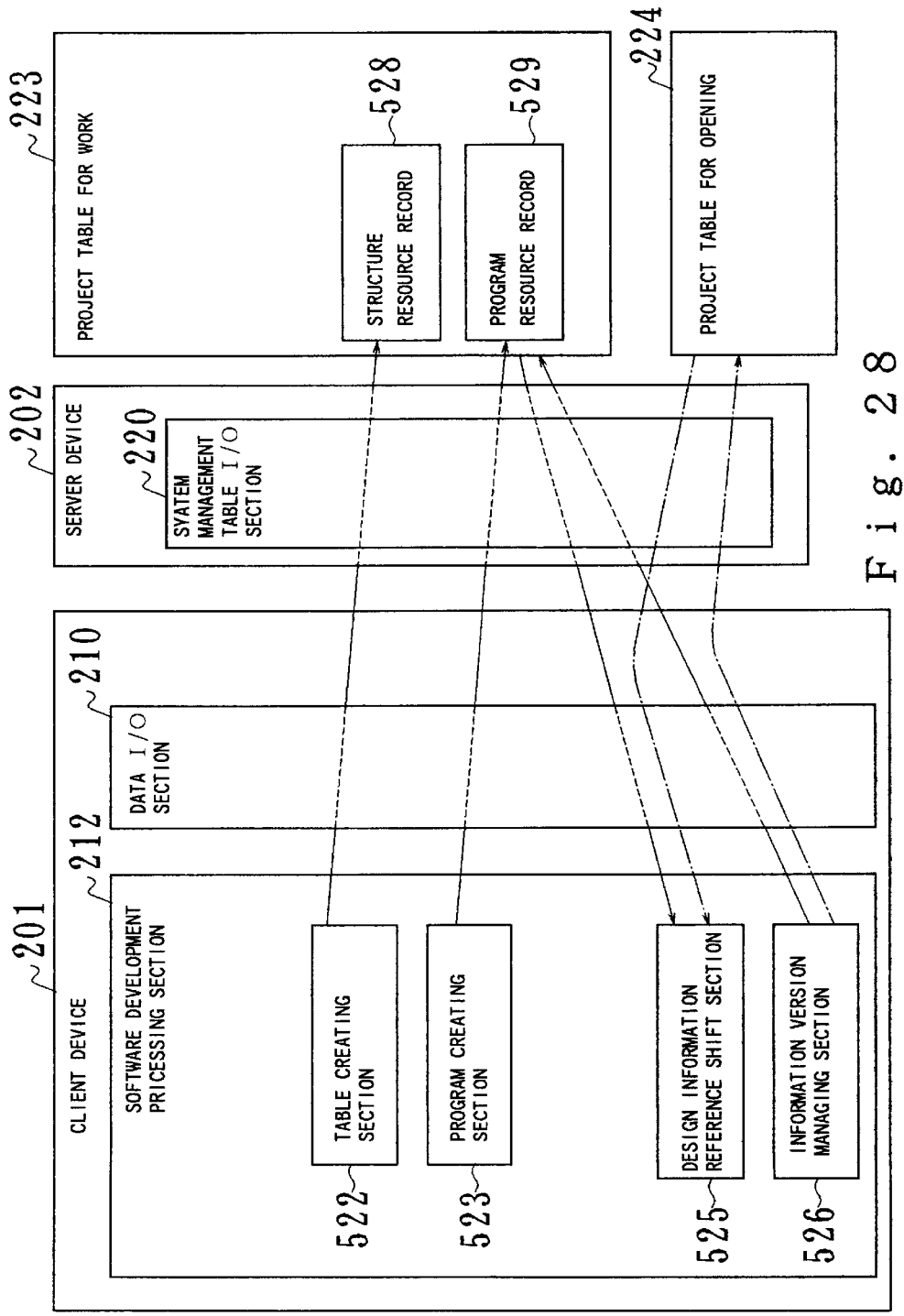
FIG. 28 is a functional block diagram showing the configuration of a software development section.

Then, a specific description will be made of the processing by the software development processing section 212 for implementing the development of the program with reference to FIG. 28 showing the configuration of the software development section 212. As shown in FIG. 28, for the processing by the software management processing section 212, the working table 223 of the project table 230 is provided with structure resource records 528 and program resource records 529, and the processing is implemented on the basis of the working table 223.

Further, the software development processing section 212 of the client device 201 is provided with functions processing parts of the system elements, including a table creating section 522 for defining tables to be employed in the program, a program creating section 523 for creating programs, a design information-reference shift section 525 for shifting a reference table of design information to the working table 223 and the opening table 224 of the project table, and an information version managing section 526 for acquiring change histories of information. Each of the functions processing sections of the system elements makes access to the data of the working table 223 and the opening table 224 of the project table through the data i/o section 210 of the client device 201 and the table i/o section 220 of the server device 202.

Figure 29:
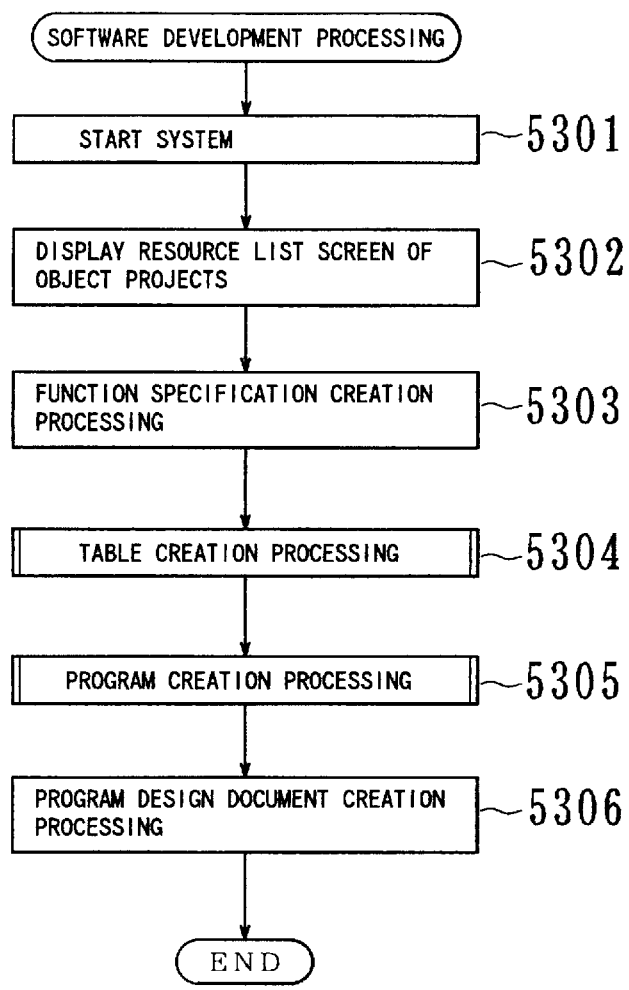
FIG. 29 is a flowchart showing a procedure of a software development processing of the software development section.
Figure 30:
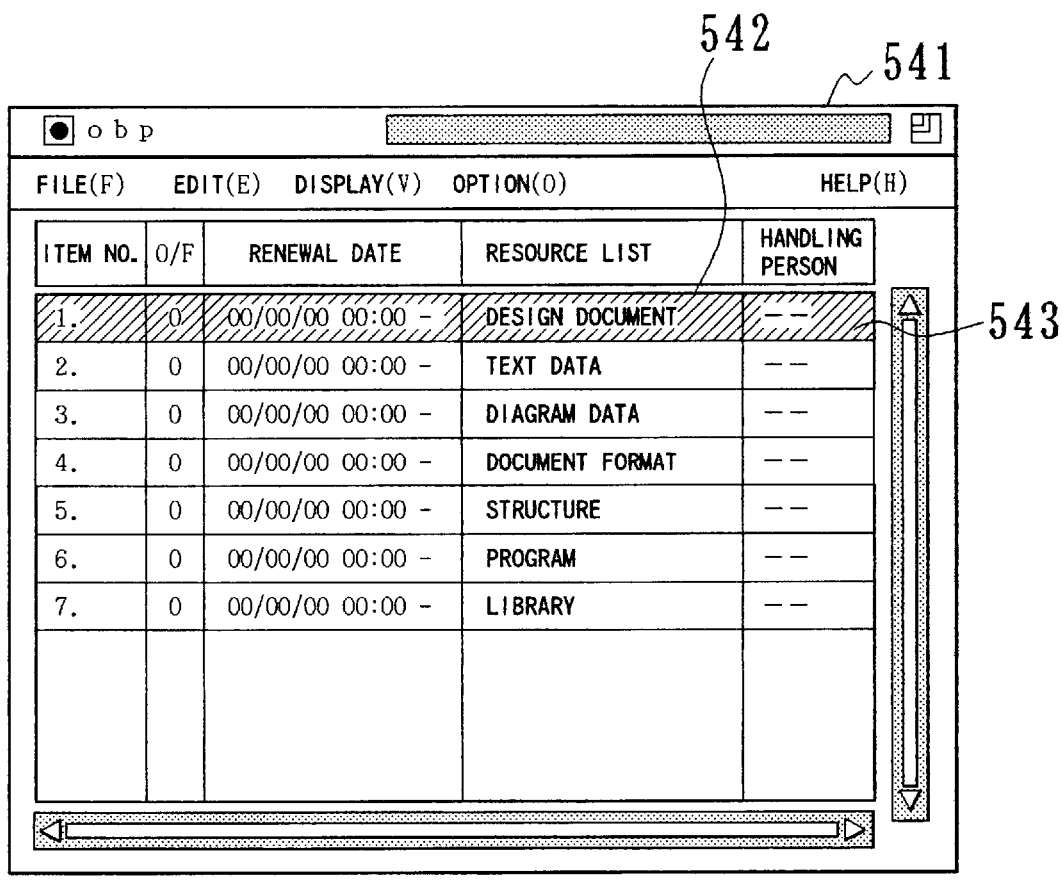
FIG. 30 is a diagram showing an example of a resource list screen displaying resource data list registered in the project table.

Then, a description will be made of the processing by the software development processing section 212 with reference to FIGS. 29 and 30. FIG. 29 shows a procedure of the processing of the software development section 212; and FIG. 30 shows an example of the resource list screens displaying the resource data list registered in the project table 230.

As shown in FIG. 29, the processing by the software development processing section 212 is performed as follows. The processing by the software development processing section 212 starts with the start of the system (step 5301), followed by selecting a project as an object for executing the processing for the development of the program (step 5302) and displaying the resources list screen (FIG. 30) of the objective project (step 5302). Thereafter, the functional specification create processing for creating functional specifications is executed (step 5303) and then the table create processing for designing tables to be employed in the program is executed (step 5304), followed by executing the program create processing for developing the program (step 5305). When the development of the program has been finished, the program design document create processing for creating program design documents is implemented (step 5306), thereby implementing a series of processing in the software development.

Figure 31A:
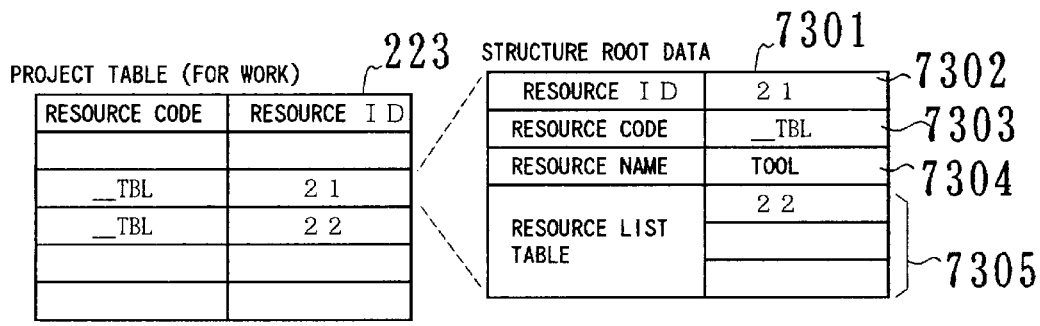
FIGS. 31A and 31B are diagrams for describing a data type of a resource record of structure data registered in the working table of the project table.
Figure 31B:
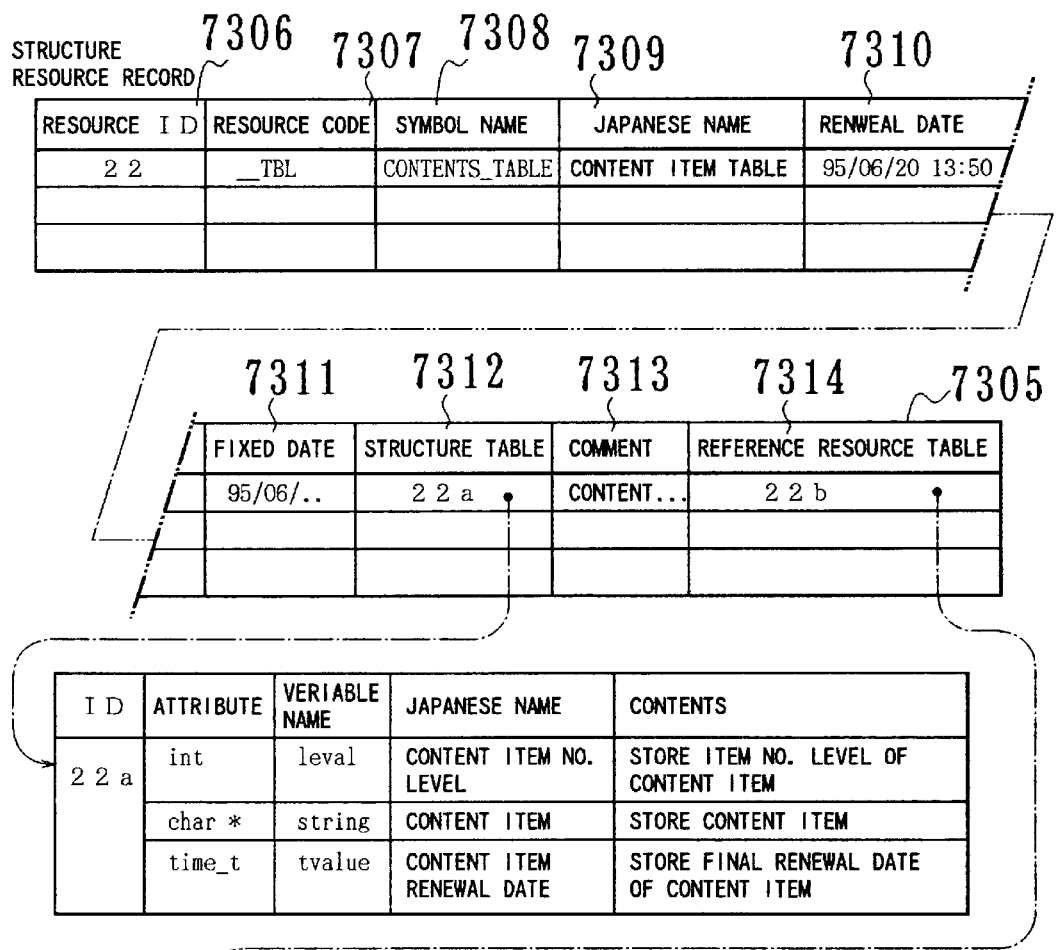
Figure 32:
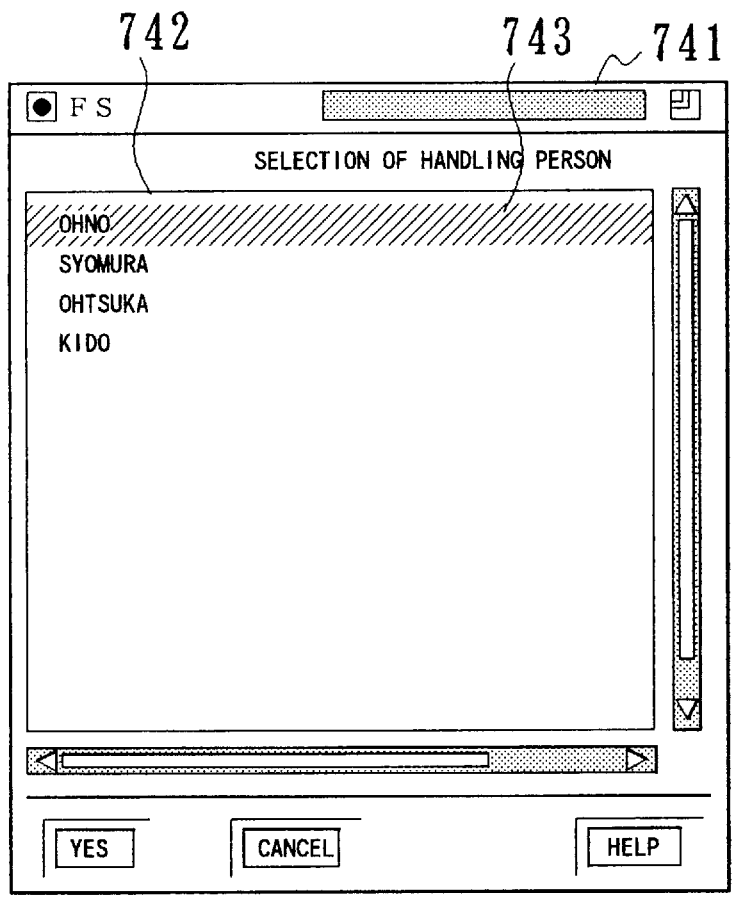
FIG. 32 is a diagram showing an example of a handling person selecting screen for setting handling person in charge of the created information.
Figure 33:
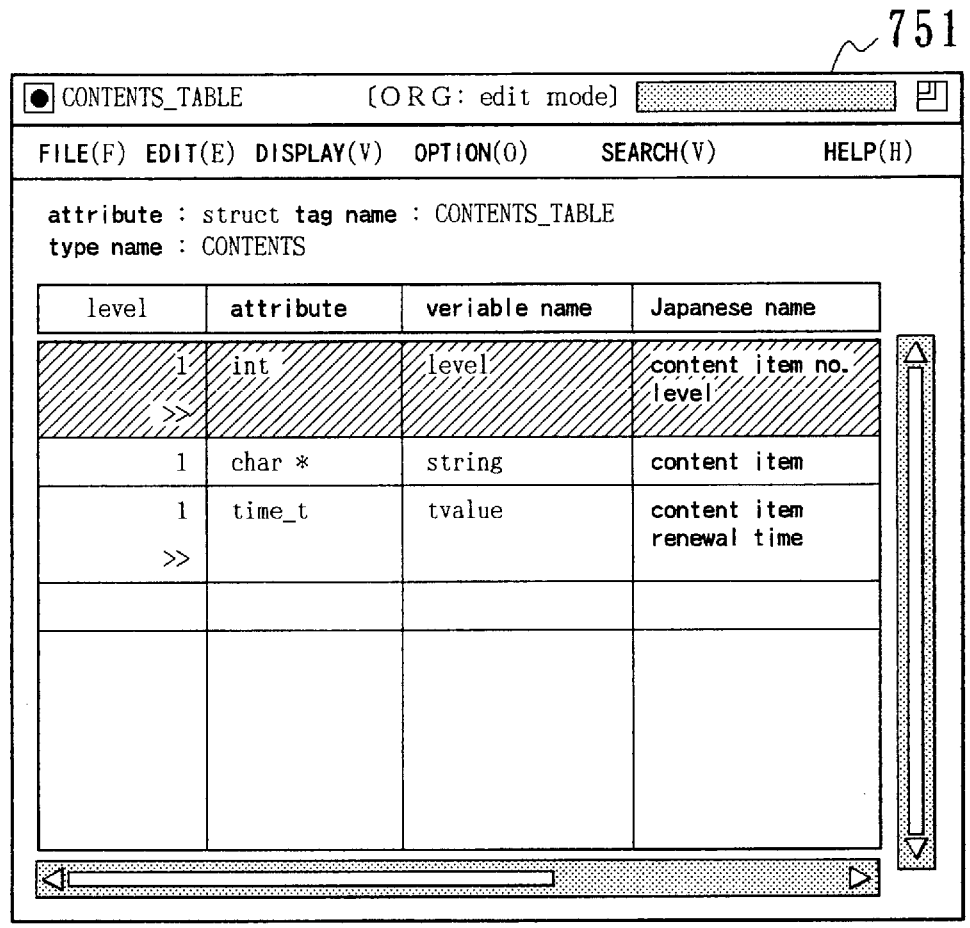
FIG. 33 is a diagram showing the screen configuration of a structure definition screen for defining contents of a member of the structures.
Figure 34:
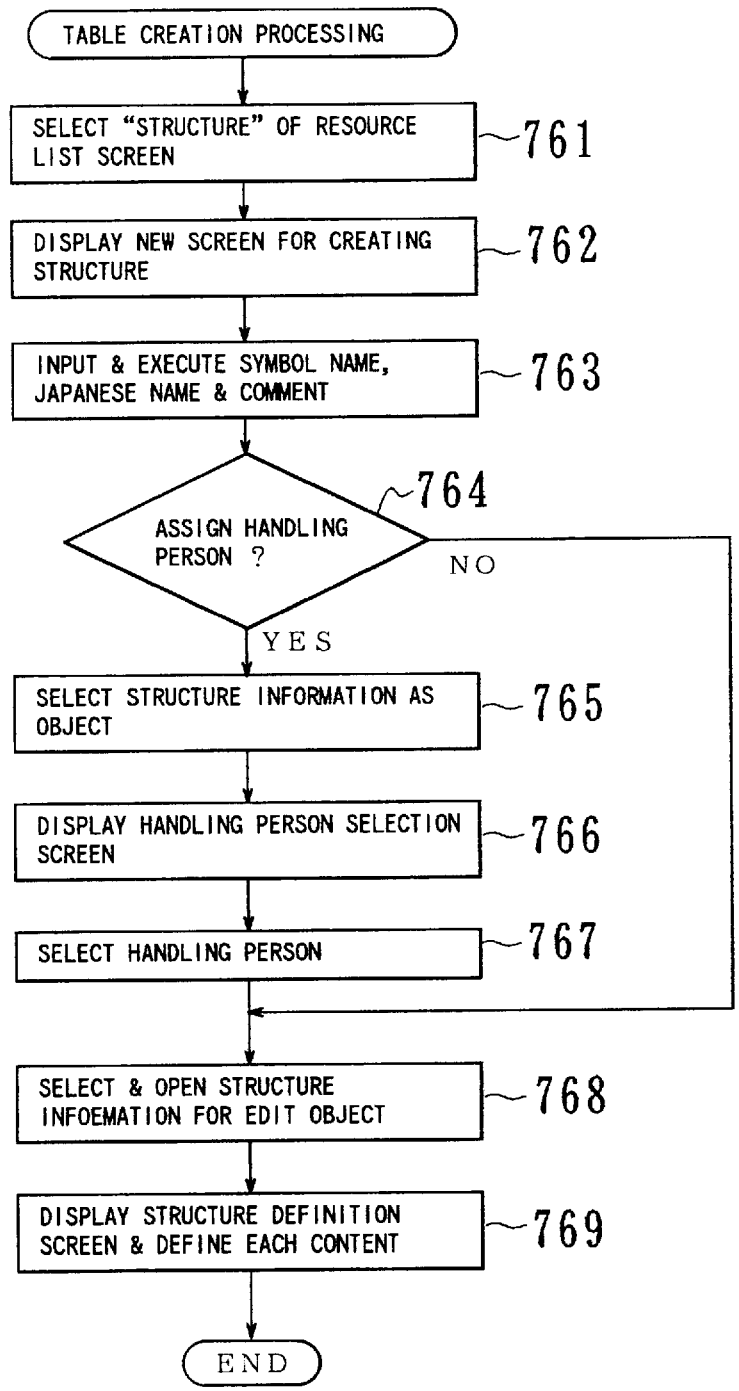
FIG. 34 is a flowchart showing a processing procedure of a table creating section.
Figure 35:
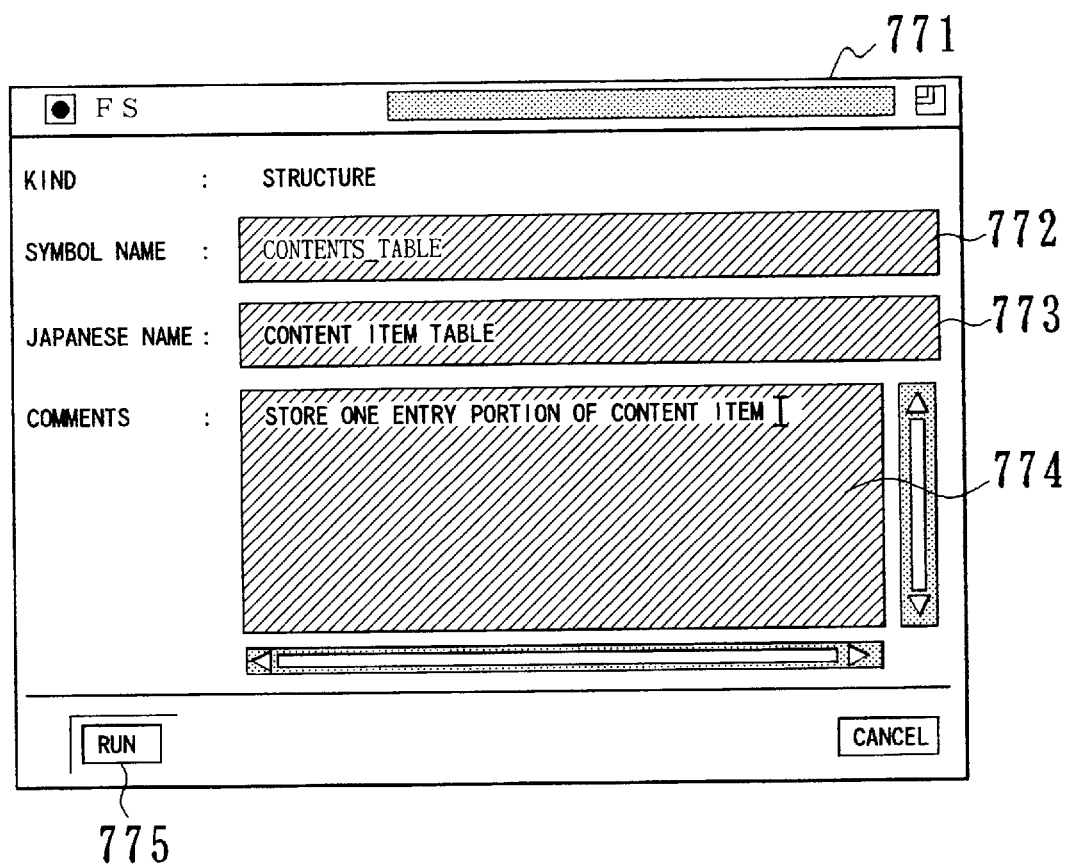
FIG. 35 is a diagram showing the screen configuration of a new creating screen for creating a structure resource record.

The following is a description of the processing by the table creating section 522 (FIG. 28) for creating each of the tables to be employed in the development of the programs with reference to FIGS. 31A, 31B, 32, 33., 34 and 35. FIGS. 31A and 31B show a data type of the resource record of the structure data registered in the working table 223 of the project table; FIG. 32 shows an example of a handling person selecting screen for setting handling persons in charge of the created information; FIG. 33 shows the screen configuration of the structure definition screen for defining the contents of members of the structures; FIG. 34 shows a processing procedure of the table creating section 522; and FIG. 35 shows the screen configuration of a new create screen for creating a structure resource record.

As shown in FIG. 31A, the structure resource record manages the top of the record of the structure data by structure data root data 7301. The structure data root data 7301 comprises resource IDs 7302 to be added by the system, resource codes 7303 representing data of the structure data, resource names 7304 in Japanese to be provided for the records, and a resource list table 7305 for managing the resource IDs of all the records having the attributes of the structure data.

Further, as shown in FIG. 31B, the resource record of the structure data registered in the resource list table 7305 comprises areas storing data of each of resource IDs 7306 provided for the records of the structure data, resource codes 7307 for identifying the resources of the structure data, symbol names 7308 for storing names of the structure data in English, Japanese names 7309 for storing the names of the structure data in Japanese, renewal times 7310 for managing the latest time in which each data of the structure data has been renewed, fixed dates 7311 for managing the time in which the history of the structure data is renewed, a structure table 7312 for storing the structure data, comment data 7313 added to the structure data, and a reference resource table 7314 for referencing the structure data or for managing the resource to which the structure data record makes a reference.

The area of the structure table 7312 is loaded with pointer data of a load destination in which its entity information is stored, and the structure table to be pointed by the pointer data may include fields containing attributes variables, names of the variables, names in Japanese to be added to the variables, and contents of usage of the variables. Likewise, the area of the reference resource table 7314 is loaded with pointer data of a load destination in which its entity information is stored, and the reference resource table to be pointed by the pointer data may comprise fields of reference destinations and reference sources of the structure data.

In the processing for creating the tables by the table creating section 522, as shown in the flowchart of FIG. 34, upon the start of the processing, first, the resource list screen 541 (FIG. 30) is displayed and the structure resource record is selected therefrom (step 761), followed by displaying a screen 771 for newly creating a structure (FIG. 35) (step 762). In the new structure creating screen 771, the structure resource is created by entering information of each of the symbol name, the Japanese name and the comment thereof by a symbol name field 772, a Japanese name field 773 and a comment field 774, respectively (step 763). Then, when the handling persons are assigned to the information created (step 764), information of the structure as an object is selected (step 765) and a handling person selecting screen 741 (FIG. 32) is displayed (step 766), followed by selecting the handling person (step 767) from a handling person list 742. Thereafter, the information on the structure as an edit object is selected and opened (step 768) and a structure definition screen 751 (FIG. 33) is displayed, thereby defining information of contents, such as levels, attributes, names of variables, names in Japanese, and so on (step 769). A series of the processing as described hereinabove can create the tables by defining the necessary information in the tables.

As shown in FIG. 35, the screen for newly creating the resource records of the structures is provided in the new structure creating screen 771 with a symbol name input field 772 for entering symbol names of the structures in a Japanese name input field 773 for entering names of the structures in Japanese, and a comment input field 774 for entering comments on the structures. By entering the involved data in each of the fields, the commands for creating the structure resource records are executed by pressing a "run" button 775.

Figure 36:
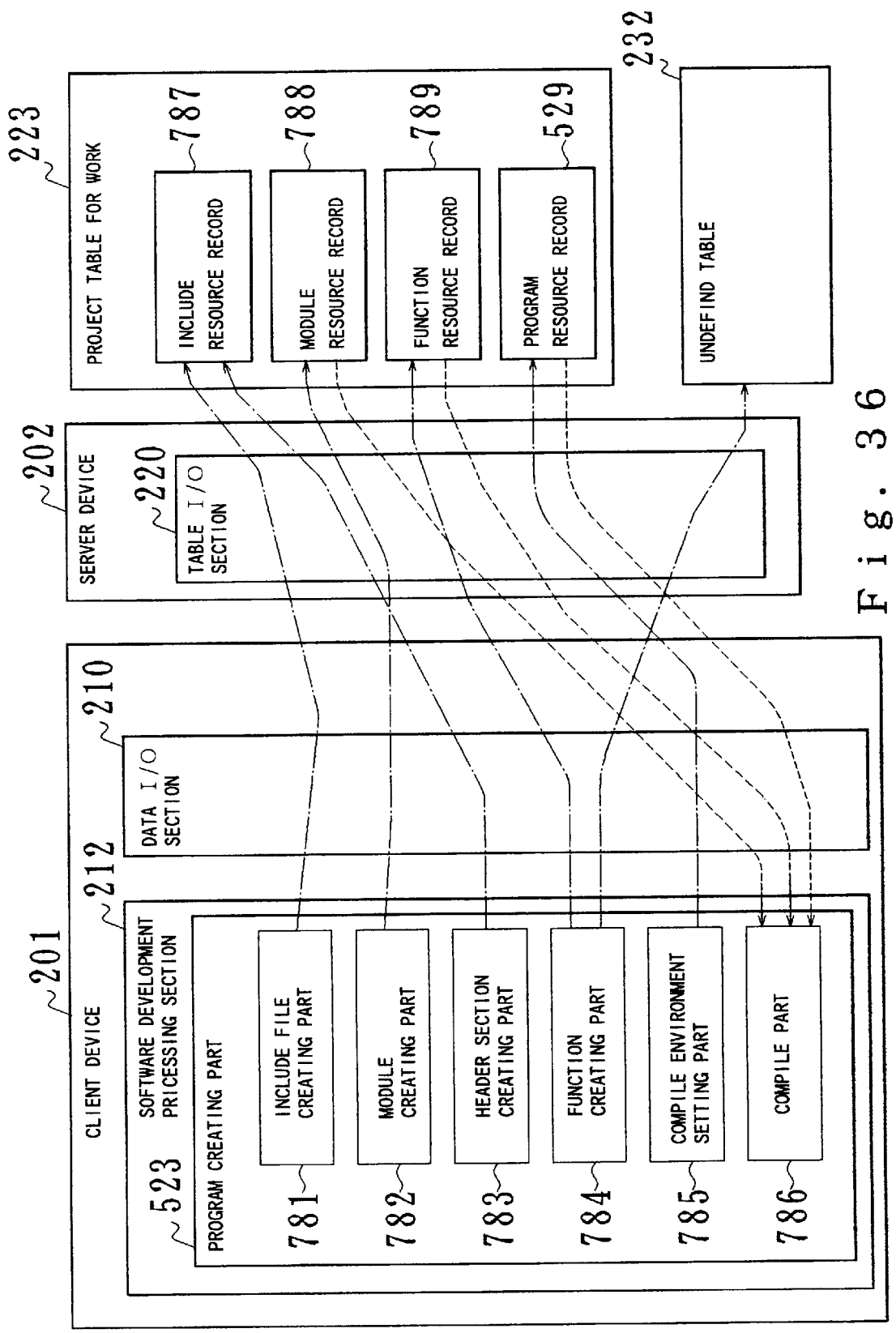
FIG. 36 is a functional block diagram showing the configuration of a program creating section.

Then, a description will be made of the program creating section 523 acting as an essential portion of the software development processing section 212 with reference to FIG. 36. FIG. 36 shows the functional configuration of the program creating section 523. For the processing for creating the program, the working table 223 of the project table is provided with include resource records 787, module resource records 788, function resource records 789 and the program resource records 529. The program create processing is implemented using these records and the undefined table 232 is renewed in the event where an undefined resource is caused to occur.

At this end, the program creating section 523 of the software development processing section 212 in the client device 201 is provided as functional processing sections with an include file creating part 781, a module creating part 782, a header section creating part 783, a function creating part 784, a compile environment setting part 785, and a compile part 786. The include file creating part 781 designs and creates an include file and the module creating part 782 designs and defines the structure of a module. The header section creating part 783 creates a header section of the module and the function creating part 784 creates functions in the module. Further, the compile environment setting part 785 sets a compile environment of the program and the compile part 786 executes a compile. On the basis of the processing results by each of the functional processing parts, the include resource a records 787, the module resource records 788, the function resource records 789 and the program resource records 529 are created in the working table 223 of the project table via the data i/o section 210 and the table i/o section 220 of the client device 201. Further, the undefined table 232 is renewed.

Figure 37A:
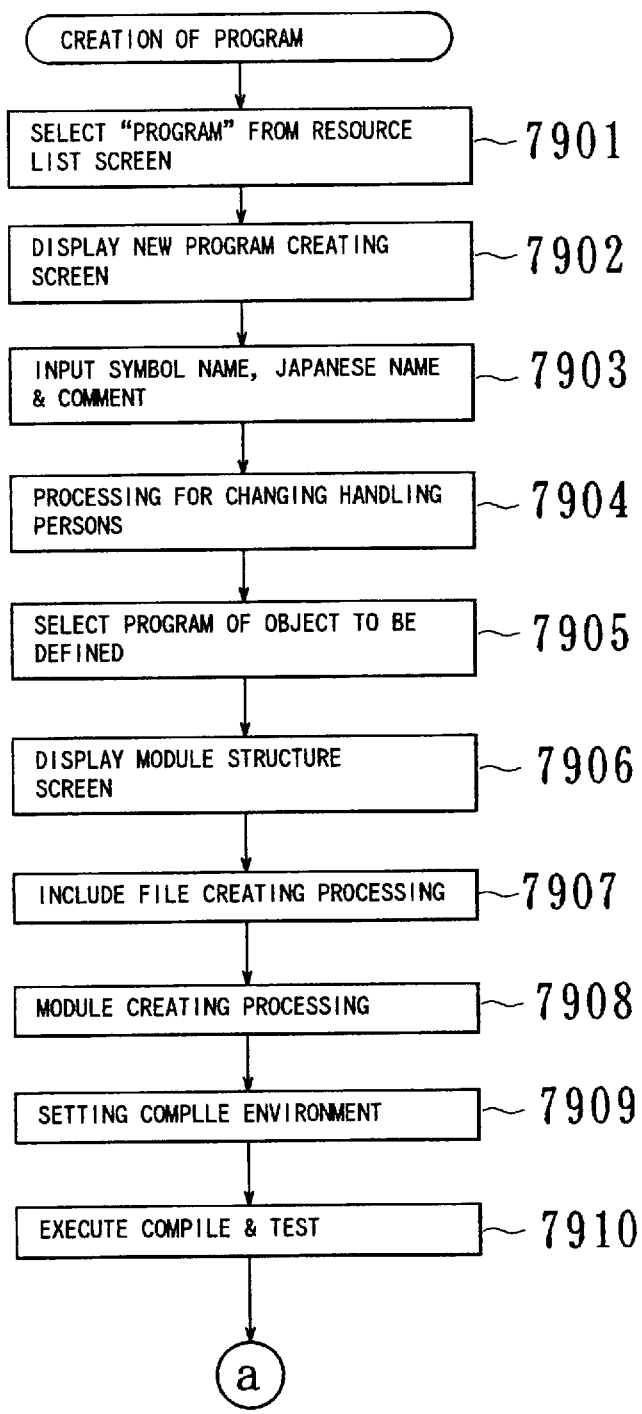
FIGS. 37A and 37B are flowcharts showing a flow of the entire processing of a program create processing.
Figure 37B:
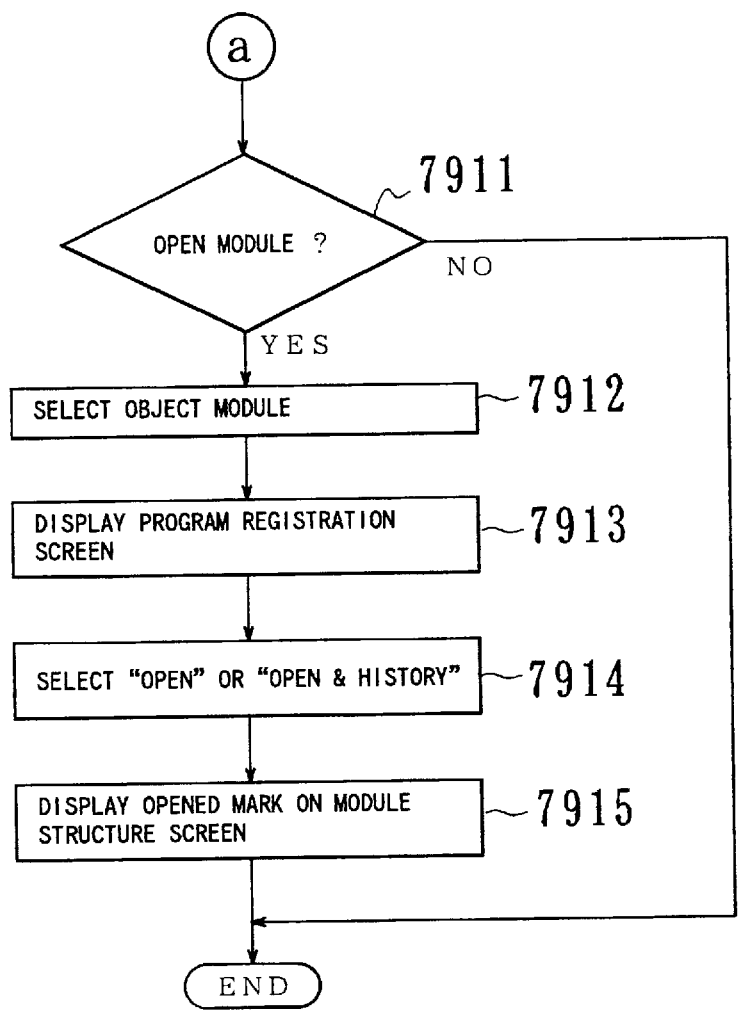

Then, a description will be made of a flow of the entire processing of the program creating section 523 with reference to the flowchart of FIG. 37. FIG. 37 shows a flowchart indicating a flow of the entire processing for creating programs.

After the start of the program create processing, the resource list screen 541 (FIG. 30) is displayed and the program is selected therefrom (step 7901), followed by displaying a screen for newly creating a program (step 7902). In the newly program creating screen, there are entered data of each of the symbol name, the Japanese name and comments in a symbol names field, a Japanese name field and a comment field, respectively, and new program resource records are registered (step 7903). The program resource records are registered in the working table 223 of the project table together with the data. If a handling person is needed to be changed, the processing for changing handling persons is implemented (step 7904).

Then, the resource list screen 541 (FIG. 30) is displayed again, followed by selecting the program as an object for defining the module configuration from the resource list screen 541 (step 7905) and displaying a module structure screen 821(FIG. 39) (step 7906). Thereafter, the processing for creating an include file is implemented by the include file creating part 781 (step 7907) and the processing for creating a module is implemented by the module creating part 782 (step 7908). Then, a compile environment is set by the compile environment setting part 785 (step 7909) and a compile using the compile part 786 and a test thereof are then executed (step 7910).

Thereafter, it is decided whether the developed program is to be opened for the program (7911). When it is decided to be opened therefor, then the module as an object for opening is selected (step 7912) and a program history registering screen 831 (FIG. 40) is displayed (step 7913). Then, in the program history registering screen 831, an "open" button or an "open & history" button of a revision field 832 is selected (step 7914), followed by changing an opening mark 837 "-" to "*" in the module structure screen 821 (step 7915). By the processing for creating the programs by the operations in the manner as described hereinabove, each of the handling persons in charge of the program development can proceed with the program development without undergoing an influence from the development of the work by the remainder of the handling persons, thereby prosecuting the work at their own pace and enabling the development of the programs.

A description will be made of the module structure screen 821 (FIG. 39) and the program history registering screen 831 (FIG. 40), each being employed in the processing for creating the programs.

Figure 39:
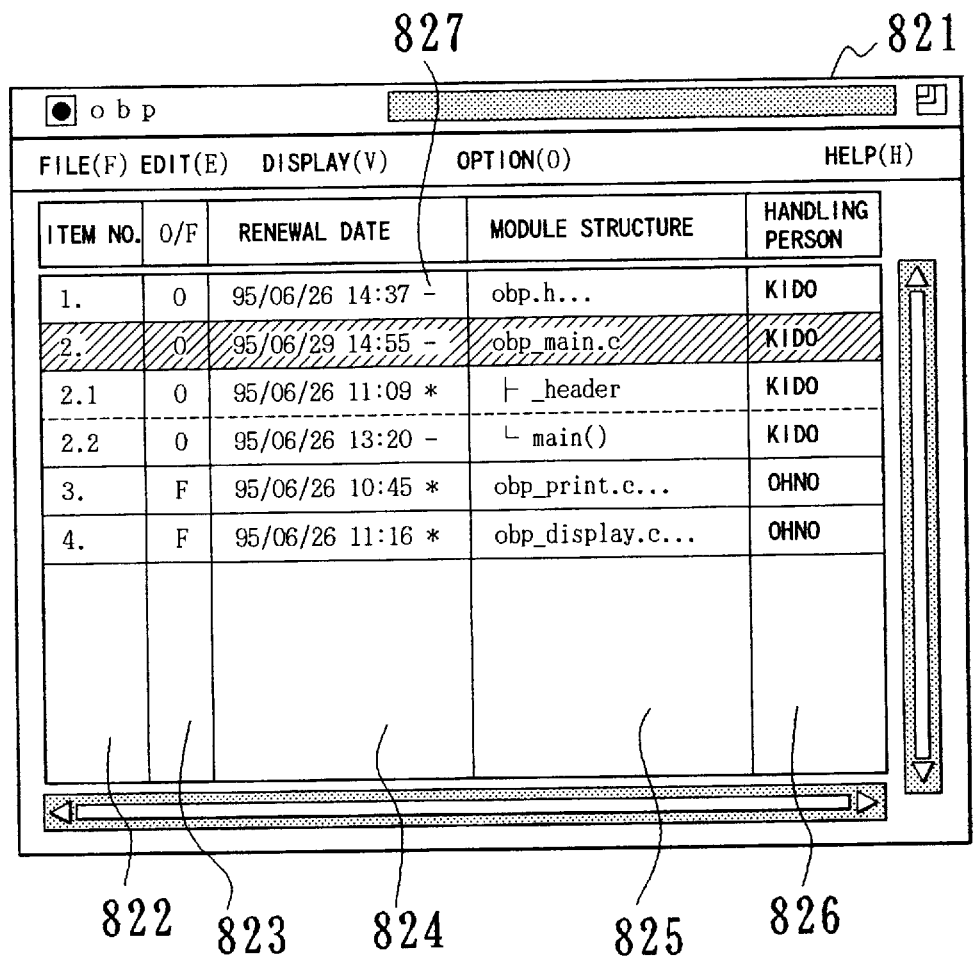
FIG. 39 is a diagram for describing the configuration of a module structure screen for displaying a module structure of the program.

FIG. 39 shows the configuration of the module structure screen 821 for displaying the module structure of the program. As shown in FIG. 39, the module structure screen 821 comprises an item number field 822 with item numbers added from the top of the modules in numeral order, an O/F field 823 for displaying which is selected ("O" is displayed if the working table is selected, and "F" is displayed if the opening table is selected), the working table 223 or the opening table 224 of the project table, a renewal date field 824 for displaying renewal dates of the information displayed in the module structure, a module structure field 825 for displaying the module structure of the program, and a handling person field 826 for displaying persons handling the information. In the renewal date field 824, the data are provided after the data of the renewal date with an opening mark 827 for identifying whether the information is to be opened or not.

Figure 40:
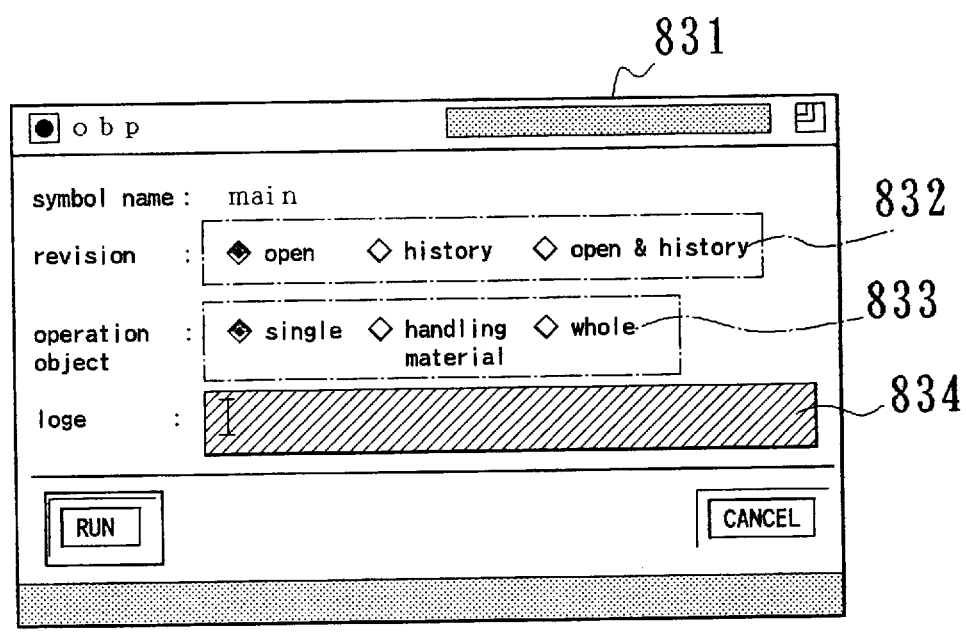
FIG. 40 is a diagram for describing the configuration of a program history register screen to be employed for opening the program in the project.

FIG. 40 shows the configuration of the program history registering screen 831 to be employed for opening the program in the project. As shown in FIG. 40, the program history registering screen 831 is provided with a revision button field 832 for designating the way of opening, an operation object button field 833 for designating an operation object, a log input field 834 for adding comments on an open history, and a "run" button 835 for designating the execution of program history registering commands. As described hereinabove, when the developed program is opened to the project, a module for an opening object is selected and an "open" button or an "opening & history" button in the revision field 832 is selected on the program history registering screen 831, thereby allowing the program as a designated object to be transferred to the opening table 224 and to open the program involved.

The program data created in the manner as described hereinabove are registered in the working table 223 of the project table in a data type of the record similar to the structure data of each resource record as described hereinabove FIGS 38A and 38B describe a data type of the program resource records registered in the working table 223 of the project table.

As shown in FIG. 38A, the program resource records of the program data are registered in the working table 223 of the project table and the top of the record of the program data is managed by program data root data 8001. The program data root data 8001 comprises resource IDs 8002 added by the system, resource codes 8003 representing the data of the program data, resource names 8004 in Japanese added to the records, and a resource list table 8005 for managing the resource IDs of all the records having the attributes of the program data.

As shown in FIG. 38B, the resource records of the program data registered in the resource list table 8005 comprise areas for storing the data of each of resource IDs 8006 provided on the records of the program data, resource codes 8007 for identifying that the resource is a program data resource, symbol names 8008 for storing names of the program data in English, Japanese names 8009 for storing the names of the program data in Japanese, renewal dates 8010 for managing the latest time at which respective program data have been renewed, fixed dates 8011 for managing the time at which the history of the program data has been renewed, comment data 8012 added to the program data, a compile environment 8013 for setting a compile environment, and a reference resource table 8014 for managing the resources which make a reference to the program data records or to which the program data records make a reference.

The area of the compile environment 8013 for setting a compile environment is loaded with pointer data designating a load destination of an environment set table in which the compile environment of the program is set. In the environment table is set data of each of a compile instruction, a compile flag, a load flag, a source fetch directory and an include fetch directory. On the other hand, the area of the reference resource table 8014 is loaded with pointer data for designating a load destination of a reference resource table for managing the resources which make a reference to the program data records or to which the program data records make a reference. In the reference resource table are loaded data of reference destinations and reference sources of each of the resources.

Then, a description will be made of the processing by the individual function processing sections of the program creating section 523, such as the include file creating part 781, the module creating part 782, the header section creating part 783, the function creating part 784, the compile environment setting part 785 and so on. The processing by each of the function processing sections creates resource records by structure data having a data structure similar to each other and resource data corresponding to each resource unit. The integral data structures of the resource data allow various data to be loaded each in a resource unit in the project table so as to be readily employed again. Among the various data, the data in a resource unit in which its entity information is undefined are loaded by renewing the undefined table.

Figure 41:
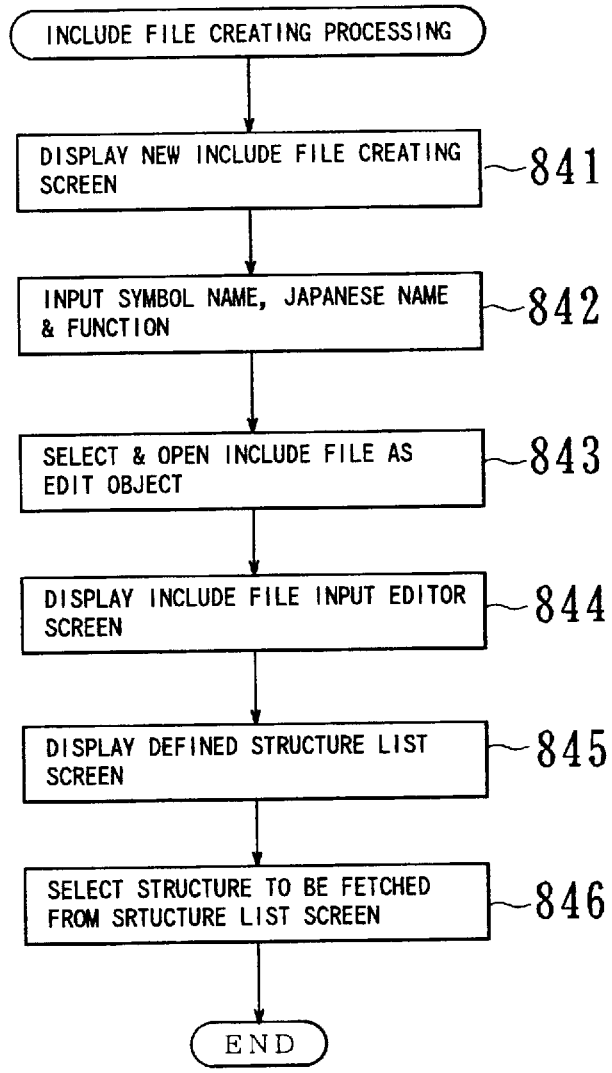
FIG. 41 is a flowchart showing a processing procedure of an include file creating section.
Figure 42:
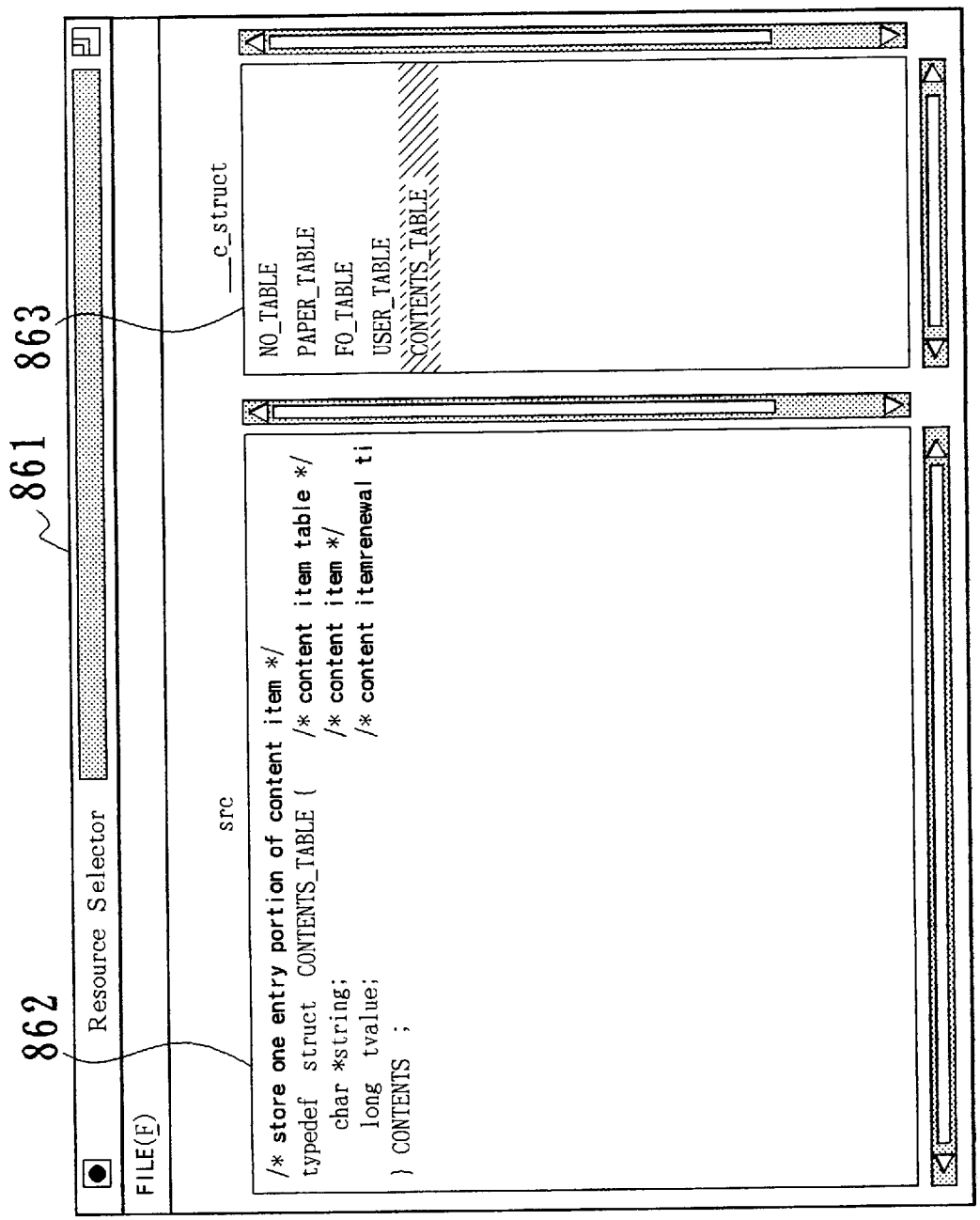
FIG. 42 is a diagram showing a structures list screen for displaying a list of structures.

First, a description will be made of the processing for creating the include file by the include file creating part 781 with reference to FIGS. 41, 42, 43A and 43B. FIG. 41 shows a flowchart of a processing procedure of the include file creating part 781 and FIG. 42 shows a structures list screen for displaying a structure list.

Upon the start of the processing, the include file creating part 781 displays a new include file registering screen (step 841). The include file records can be newly registered by entering data of the symbol name, the Japanese name and the function from the symbol name field, the Japanese name field and the function field of the new include file registering screen (not shown) and by pressing a "run" button (step 842). Then, from the include file records, an include file as an edit object is selected and opened (step 843), followed by displaying an include file input editor screen and editing the contents of the include file (step 844). Thereafter, the structure list screen (FIG. 42) is displayed (step 845) and the structure to be fetched is selected, thereby fetching the structure definition source code into the include file input editor (step 846). As a result, there is registered the resource ID of the structure fetched in a reference resource table 8718 of the include file records (FIG. 43) as will be described hereinafter.

FIGS. 43A and 43B describe a data type of the include resource records registered in the working table 223 of the project table. As shown in FIG. 43A, the include resource records of the include data are registered in the working table 223 of the project table.

In this case, too, the top of the record of the include file is managed by the include data root data 8701 in the same manner as each of the data records as described hereinabove. The include data root data 8701 comprises resource IDs 8702 added by the system, resource codes 8703 representing the data of the include data, resource names 8704 of resources in Japanese provided on the record, and a resources list table 8705 for managing the resource IDs of all records having attributes of the include data.

As shown in FIG. 43B, the resource records of the include data registered in the resource list table 8705 comprise areas for storing data of each of resource IDs 8706 provided on the records of the include data, resource codes 8707 for identifying the include data resource, symbol names 8708 for storing the names of the include data in English, Japanese names 8709 for storing the include data in Japanese, renewal dates 8710 for managing the latest time in which each data of the include data has been renewed, fixed dates 8711 for managing the time in which the history of the include data has been renewed, analysis dates 8713 on which the source code has been analyzed, comments 8714 of comment codes added to the include data, source information 8715 for storing the source information of the include data, analysis results 8716 for storing results of analysis of the include data, and a reference resource table 8717 for managing the resource which makes a reference to the include data or to which the include data makes a reference. When the include file is created in the manner as described hereinabove, the data of the include file so created is registered.

Now, a description will be made of the processing of the module creating section 782 by making reference to the flowchart of FIG. 44 and referencing the data type of the module resource records of FIGS. 45A and 45B in the same manner as described hereinabove.

Figure 44:
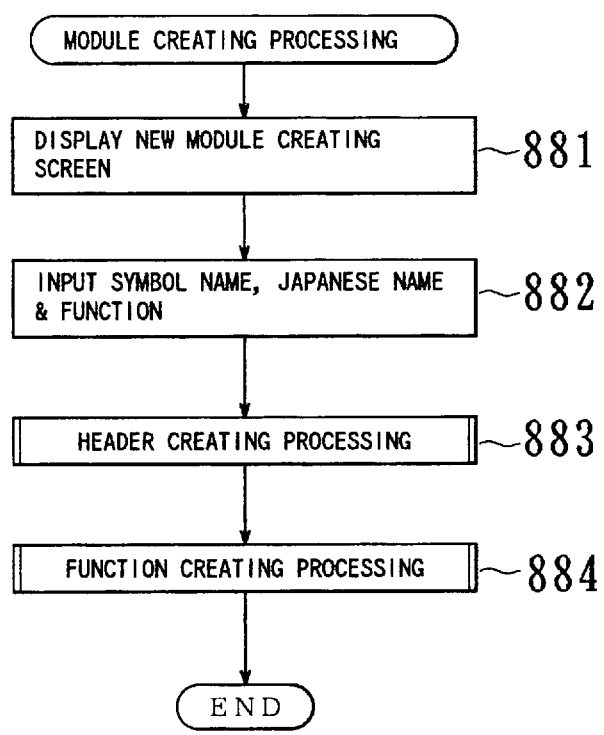
FIG. 44 is a flowchart showing a processing procedure of a module creating section.

FIG. 44 shows the flowchart representing a procedure of the processing of the module creating section 782. As shown in FIG. 44, the processing for creating the module by the module creating section 782 first allows a display of a screen (not shown) for newly registering a module (step 881) for creating a new module. Then, each data of the symbol name, the Japanese name and the function are entered from the new module registering screen and the module resource records of the structure data is newly registered (step 882), thereby newly registering the module data (module resource records) in the working table 223 of the project table. Then, the header create processing creates the header section of the module (step 883) and the function acting as the element of the module is created by the function create processing (step 884).

FIGS. 45A and 45B describe the data type of the module resource records registered in the working table 223 of the project table. As shown in FIG. 45A, the module resource records are registered in the working table 223 of the project table and the top of the record of the module data is managed by a module data root data 9001. The module data root data 9001 comprises resource IDs 9002 added by the system, resource codes 9003 representing the data 6f the module data, resource names 9004 of the names in Japanese provided on the resource records, and a resource list table 9005 for managing the resource IDs of all the records having the attributes of the module data.

As shown in FIG. 45B, the resource records of the module data registered in the resource list table 9005 comprise the areas for loading data of each of resource IDs 9006 provided on the records of the module data, resource codes 9007 for identifying the module data resources, symbol names 9008 for storing the names when fetched as modules, Japanese names 9009 for storing the Japanese names of the module data, renewal dates 9010 for managing the latest time in which each data of the module data has been renewed, fixed dates 9011 for managing the time in which the history of the module data has been renewed, input dates 9012 on which the source codes are fetched from the outside, a structure table 9013 for managing the functions structuring the modules and the resource IDs of the header section, and a reference resource table 9014 for managing the resources which make a reference to the module data records or to which the module data records make a reference. The processing for creating the module allows registration of each of the data in the module resource records.

Figure 46:
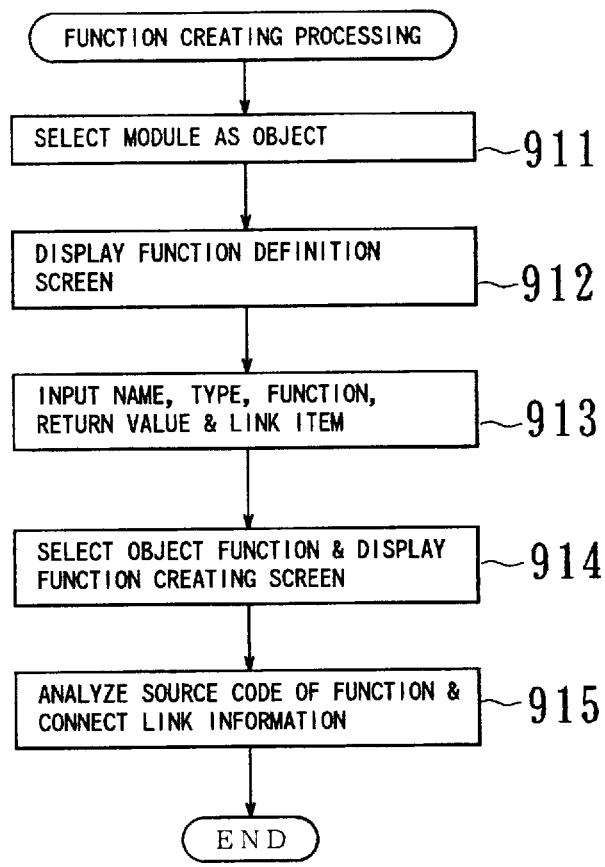
FIG. 46 is a flowchart showing a processing procedure of a function create processing.
Figure 47:
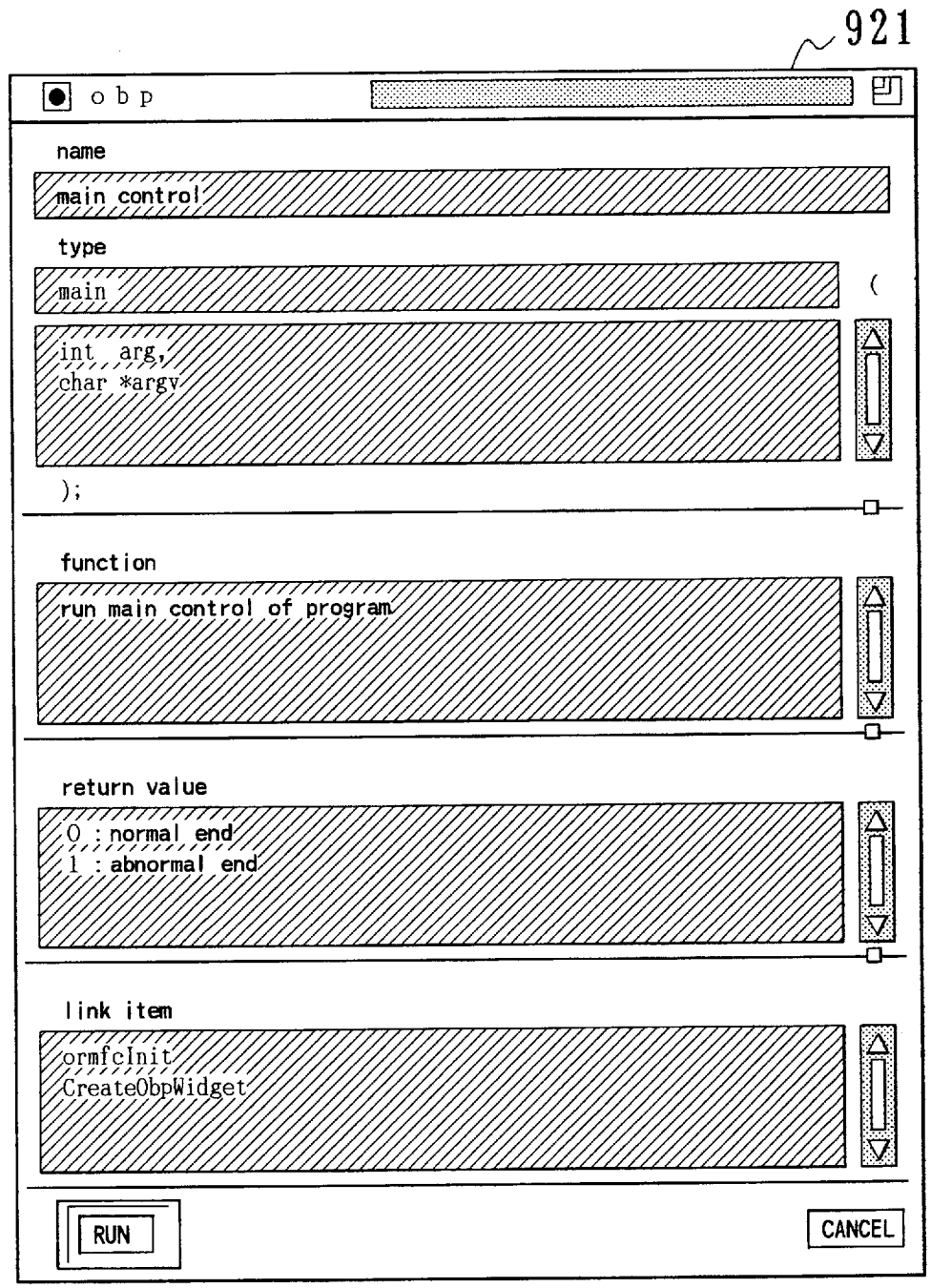
FIG. 47 is a diagram showing a function definition screen.

A description will then be made of the processing for creating the function acting as an element structuring a module with reference to FIGS. 46, 47, 48A and 48B. FIG. 46 shows a flowchart of the function create processing, FIG. 47 shows a function definition screen, and FIGS. 48A and 48B show a data type of the function resource records.

As shown in FIG. 47, a function definition screen 92.1 is provided with a name field 922 for entering names of the functions in Japanese, a type field 923 for defining the names and types of the functions, an argument field 924 for defining an argument information of the functions, a function input field 925 for defining activities of the functions, are turn value field 926 for defining return values of the functions, a link item field 927 for defining link items to be employed by the functions, and a "run" button 928 for designating the execution of the commands for establishing the defined information. By entering the data in each of the fields and pressing the "run" button 928, the functions acting the elements of the modules are defined.

In the processing for creating functions by the function creating section 784, upon the start of the processing, as shown in FIG. 46, a module acting as an object for creating the function is selected from a module structure diagram 821 (FIG. 39) (step 911), followed by displaying a function definition screen 921 (FIG. 47)(step 912). In the function definition screen 921, each data of the name, the type, the argument, the activity, the return value and the link item are entered (step 913). This allows the resource data of the function to be registered in the working table 223 of the project table, followed by selecting a function of the edit object and coding the contents of the function by displaying the function creating screen (step 914), analyzing the source code of the function and connecting the link information (step 915).

Although a series of the processing as described hereinabove can create the resource data of the function, a registration is made in this case of the resource ID of the function which makes a reference to a reference resource table 9318 of the function resource records (FIG. 48) as will be described hereinafter. In this instance, the information of the function which is not yet registered in the working table 223 of the project table is newly registered in an undefined resource unit in the undefined table 232 and the resource ID registered in the undefined table 232 is registered in the reference resource table 9318.

Further, in the processing for newly registering the function resource, the contents of the reference resource table of the undefined table 232 are registered in the reference resource table 9318 of the function resource records of the working table 223 in instances where the symbol name of the function to be registered therein is registered in the undefined table. This processing can always retain a link of each of the functions of the function resource in a normal status without execution of a re-analysis of the registered function even when an entity of the function is newly added to the registered function.

FIGS. 48A and 48B describe the data type of the function resource records registered in the working table 223 of the project table. As shown in FIG. 48A, the function resource records are registered in the working table 223 of the project table and the top of the function resource records is managed by the function data root data 9301. The function data root data 9301 comprises resources IDs 9302 added by the system, resource codes 9303 representing the data of the function data, resource names 9304 of the Japanese names provided on the records, and a resource list table 9305 for managing all the resource IDs of all the records having the attributes of the function data.

As shown in FIG. 48B, the resource records of the function data registered in the resource list table 9305 comprise areas for loading data of each of resource IDs 9306 provided on the function data records, resource codes 9307 for identifying the function data resources, symbol names 9308 of the functions, Japanese names 9309 for loading the Japanese names of the functions, renewal dates 9310 for managing the latest time in which each data of the function data has been renewed, fixed dates 9311 for managing the time in which the history of the function data has been renewed, input dates 9312 on which source codes are fetched from the outside, comments 9313 for managing functions, return values and so on of the functions, source information 9314 for loading source information of the activities, an argument table 9315 for managing information on arguments of the functions, analysis dates 9316 for loading the dates of analysis of source information of the functions, analysis error information 9317 for managing results of analysis, and a reference resource table 9318 for managing resources which make a reference to the function data records or to which the function data records make a reference.

Figure 49:
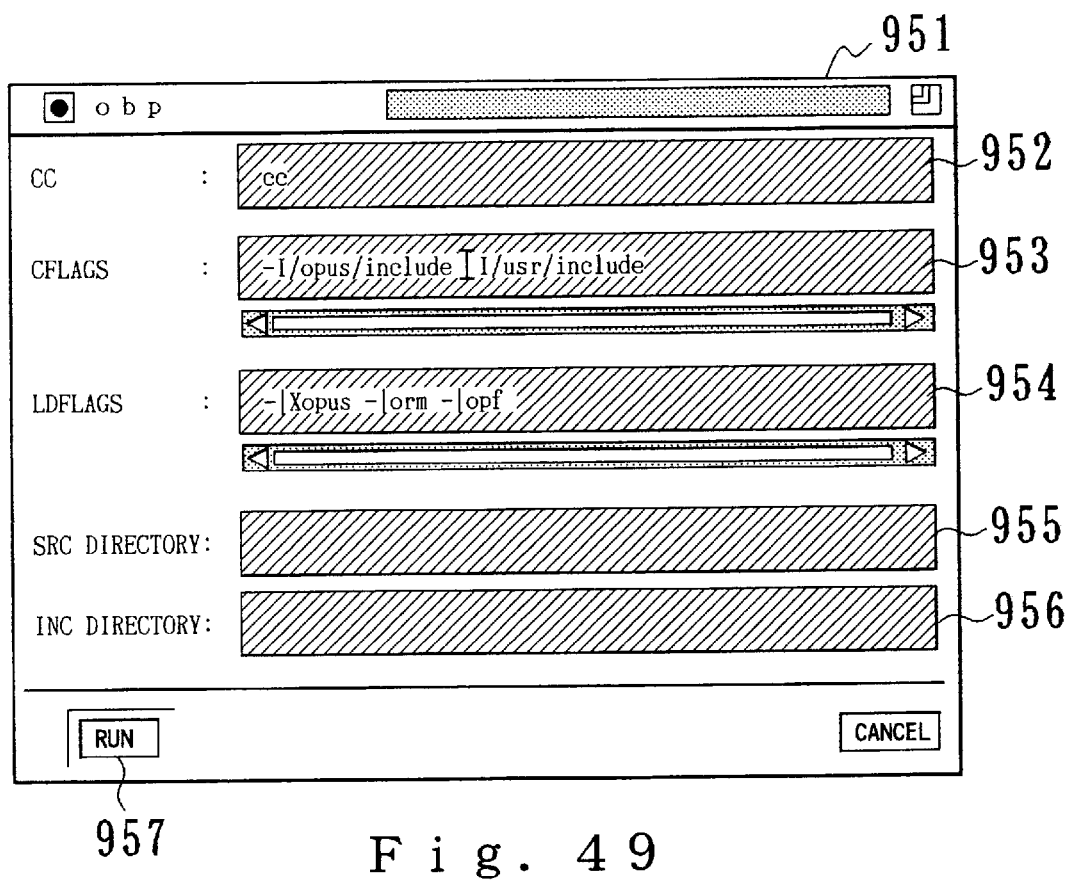
FIG. 49 is a diagram showing a compile environment setting screen.
Figure 50:
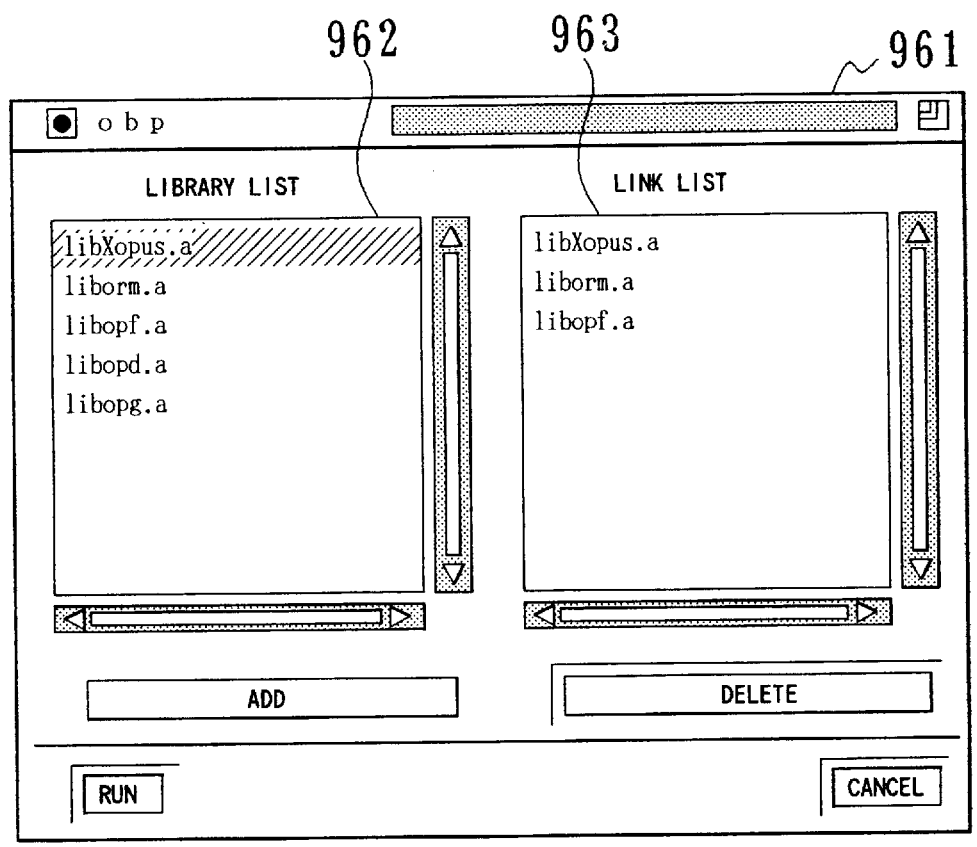
FIG. 50 is a diagram for describing the configuration of a library-link list screen for defining libraries to be employed for compiling the program.

Then, a description will be made of the processing of the compile environment setting section 785. FIG. 49 shows a compile environment setting screen; and FIG. 50 shows a library-link list screen. In this case, although a link to a library is set, library-link records of a data type are created for data of the library, then loaded and managed in substantially the same manner as described hereinabove. FIG. 51A and 51B indicate the record data type of the library-link resource records to be registered in the working table 223 of the project table.

First, a description will be made of a compile environment setting screen (FIG. 49) to be employed by the processing referred to herein and the library-link list screen (FIG. 50). A compile environment setting screen 951 as shown in FIG. 49 is provided with an input field of each of a compile instruction description field 952, a "FLAGS" field 953 for setting a compile option, a "LDFLAGS" field 954 for setting a link option, a "SRC DIRECTORY" field 955 for designating a directory for fetching a source code and an "INC DIRECTORY" field 956 for designating a directory for fetching an include file.

FIG. 50 describes the configuration of the library-link list screen for defining a library to be employed at the time of compiling a program. As shown in FIG. 50, a library-link list screen 961 comprises a library list field 962 for displaying a library resource list table registered in the working table 223 of the project table and a field link list 963 for displaying a library set as a library to be linked to the program. In the processing of the compile environment setting section, a resource ID of the library is registered in the reference resource table of the program resource in accordance with the information inputted or set from the screens in FIGS. 49 and 50. This processing allows a registration of the resource ID of the library in the reference resource table of the program resource records.

FIGS. 51A and 51B show a data type of the library resource list records registered in the working table 223 of the project table. The data type of the library resource list records is of the configuration identical to that of the program resource records. As shown in FIG. 51A, the library resource list records are registered in the working table 223 of the project table and allow a library data root data 9701 to manage the top of the library resource list records. The library data root data 9701 comprises resource IDs 9702 added by the system, resource codes 9703 for representing the data of the library data, resource names 9704 of the names in Japanese provided on the records, and a resource list table 9705 for managing the resource IDs of all the records having the attributes of the library data.

Further, as shown in FIG. 51B, the resource records of the library data registered in the resource list table 9705 comprises an area of the data of each of resource IDs 9706 provided on the records of the library data, resource records 9707 for identifying the library data resources, symbol names 9708 for loading the names of the library data in English, Japanese names 9709 for loading names of the library data in Japanese, renewal dates 9710 for managing the latest time at which the data of each of the library data has been renewed, fixed dates 9711 for managing the time in which the history of the library data has been renewed, comments data 9712 added to the library data, compile environments 9713 of the libraries, and a reference resource table 9714 for managing resources which make a reference to the library data records or to which the library data records make a reference.

When the work of creating a central program in the development of the program is completed in the manner as described hereinabove, the program development is accompanied by the processing for creating documents for use with programs involved in the program development. In this case, the program development support system according to the present invention can create documents with high efficiency by utilizing the data of a variety of the resource records created in the manner as described hereinabove.

More specifically, as the final processing among the processes for the program development as described in FIG. 49, the processing for creating program design documents is implemented (step 5310) by a program design document creating section 524.

A description will now be made of the processing to be implemented by a design information shift section 525. The processing in this instance will be described. The processing in this instance will be described by taking, as an example, the processing for shifting reference information of design information to be performed, for example, when a version of the resource of the referencing program is renewed and the reference information of the design information to be referenced is changed. The design information shift section 25 performs the change-over operation between the reference information of the working table 223 and the reference information of the project table, according to the change-over instruction from "O" to "F" or "F" to in the "O/F" field by the user.

Then, a description will be made of the processing by an information version management section 526. A version information is managed by the information version management section 526 because various modifications and alterations, such as modifications of the programs, alterations of contents of design documents, and so on, are implemented in the development of the programs.

Figure 52:
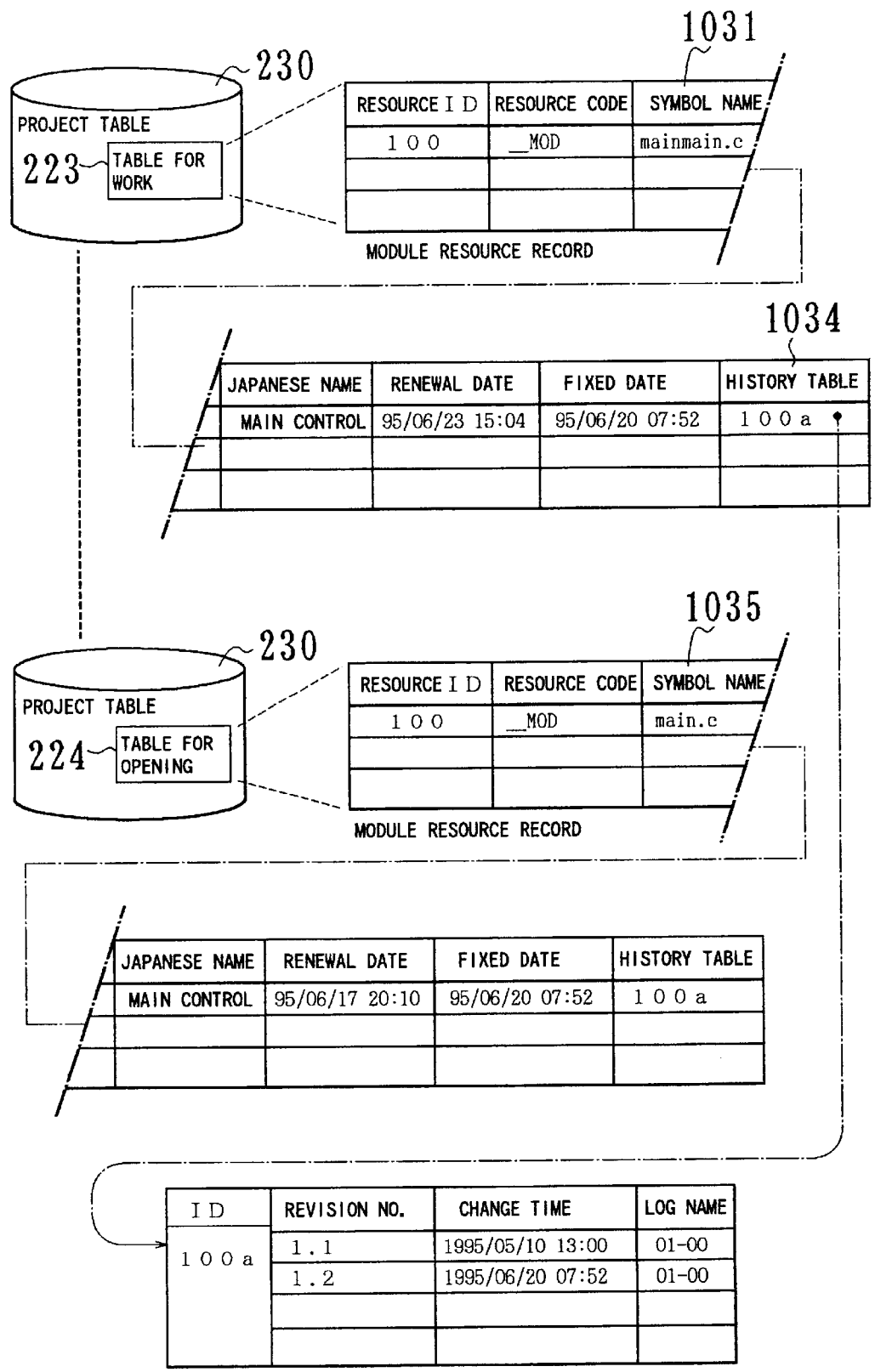
FIG. 52 is a diagram for describing a relation of pre-renewals with post-renewals from data of the working table and an opening table of the project table by taking data of a module as a example.
Figure 53:
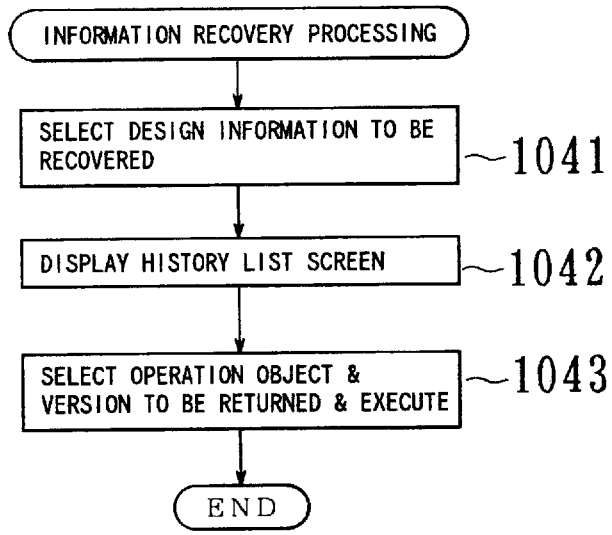
FIG. 53 is a flowchart for describing a procedure of a recovery processing for recovering information in the processing function of an information version management section.
Figure 54:
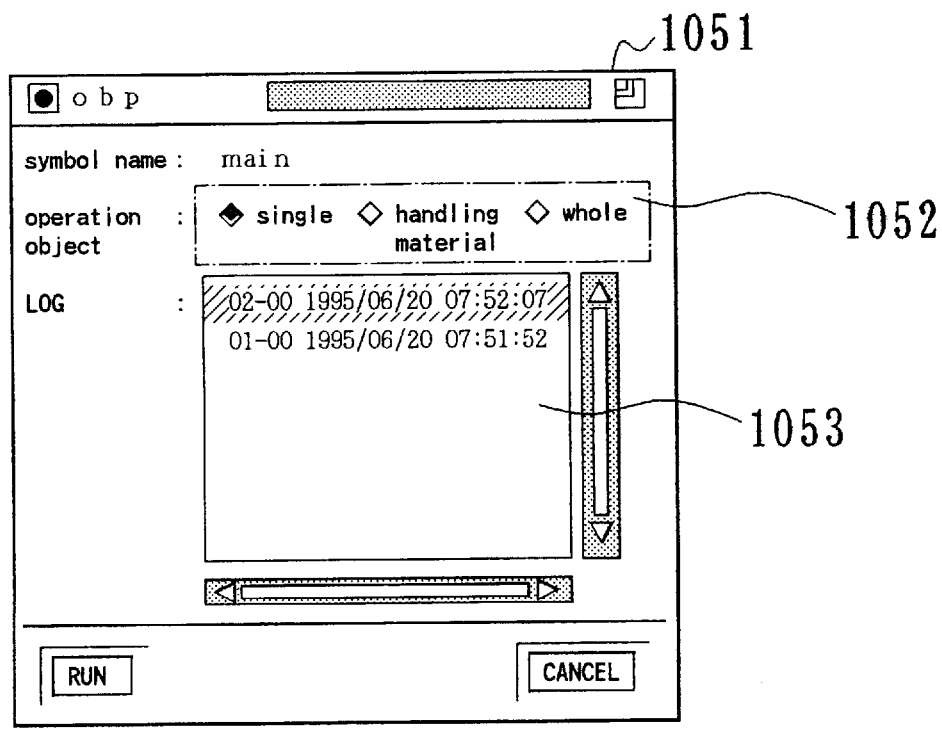
FIG. 54 is a diagram for describing the configuration of a screen for displaying a history of changes (change history) of design information.
Figure 55:
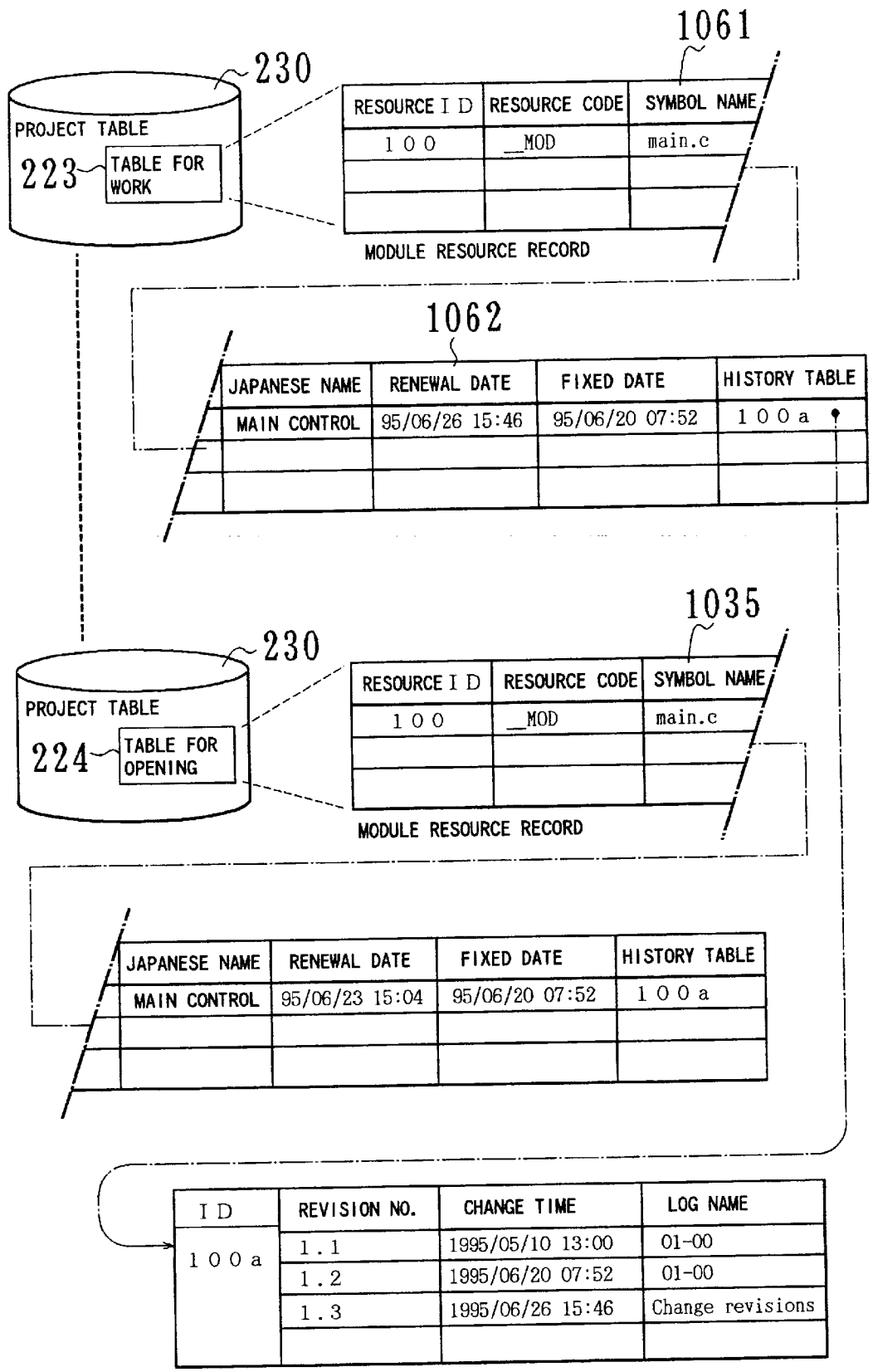
FIG. 55 is a diagram showing contents of data after recovering.

FIG. 52 shows relations of pre-renewals with post-renewals from the data of the working table 223 and the opening table 224 of the project table by taking data of the module as an example. FIG. 53 shows a flowchart for describing a procedure of the recovery processing for recovering information in processing functions of the information version management section 526. FIG. 54 describes the configuration of the screen for displaying history changes of design information. FIG. 55 shows the contents of data after data of each of the tables as shown in FIG. 52 have been recovered by the recovery processing of FIG. 58.

As shown in FIG. FIG. 52, the working table 223 of the project table 230 is registered with the module resource records. With reference to FIG. 52A, for example, for the data having the resource ID "100" , the renewal date 1032 of the working table 223 is found to be set as "95/06/23 15:04" and the fixed date 1033 is found to be set as "95/06/20 07:52". Therefore, this renewal date is newer than the fixed date so that the data are found to have been modified after the data of the working table 223 have been opened for processing. Further, modifications are found to be made at other portions, for example, such that the data of the symbol names field are changed to the symbol name 1031 "maintain.c" from the symbol name 1035 "main.c" and that the history data of the revision numbers "1.1" and "1.2" are registered in the history table 1034.

In instances where the recovery processing is implemented in these states, as shown in FIG. 53, design information to be recovered is selected from the resource list screen (FIG. 50) or the module structure screen (FIG. 39) (step 1041), followed by displaying a history list screen 1051 (FIG. 54)(step 1042). Then, the operation object and the name of the log of the version to be returned are selected in a operation object field 1052 and the log field 1053 of the history list screen 1051 and the "run" button is pressed to thereby execute the recovery (1043). This series of the processing can recover the data of the designated version to the design information of the working table 223 of the project table. At this time, the data in the process of editing in the working table 223 is registered as a new history data in the history table at the same time. Therefore, even if the recovered data would cause, a problem, it is possible to return the status of the data to the status of the information immediately before recovery from the history data registered in the history table.

This processing allows a recovery of the data of the revision number "1.1" from the history data of the history table as shown in FIG. 55. In this case, the renewal date 1062 of the working table 223 is renewed to the renewal date on which the renewal has been executed and the symbol name 1061 is recovered to "main.c". This recovery processing registers new history data as history data of the revision number "1.3" in the history table. Even if the information returned by the operations as described hereinabove would be inappropriate, the information that has been employed immediately beforehand is stored automatically so that the handling person can proceed with the development of the program in a repetitive way by returning the version to the past version in a free fashion.

The program created in the manner as described hereinabove can have its program source codes 217 fetched by the processing by the program fetch section 227. This processing is so simple because it is the processing simply for selecting data as an object from the resource records and fetching it therefrom.

Now, a description will be made of the processing by the program fetch section 227. In this program fetch processing, first, the program to be fetched from the resource list screen (FIG. 50) is designated from the libraries and the source fetch function is performed. This processing allows the involved program source records 217 to be fetched from the respective resource records of the project table 230 (FIG. 24).

FIGS. 56A and 56B show examples of the specific contents of the project resource table 230 created by each of the function processing sections as described hereinabove and the undefined table 232. As shown in FIG. 56A, the records of all the resources are loaded in the identical project resource table 230, not in separate tables for each kind of the records, and the data is similarly managed in an integral manner.

Figure 57:
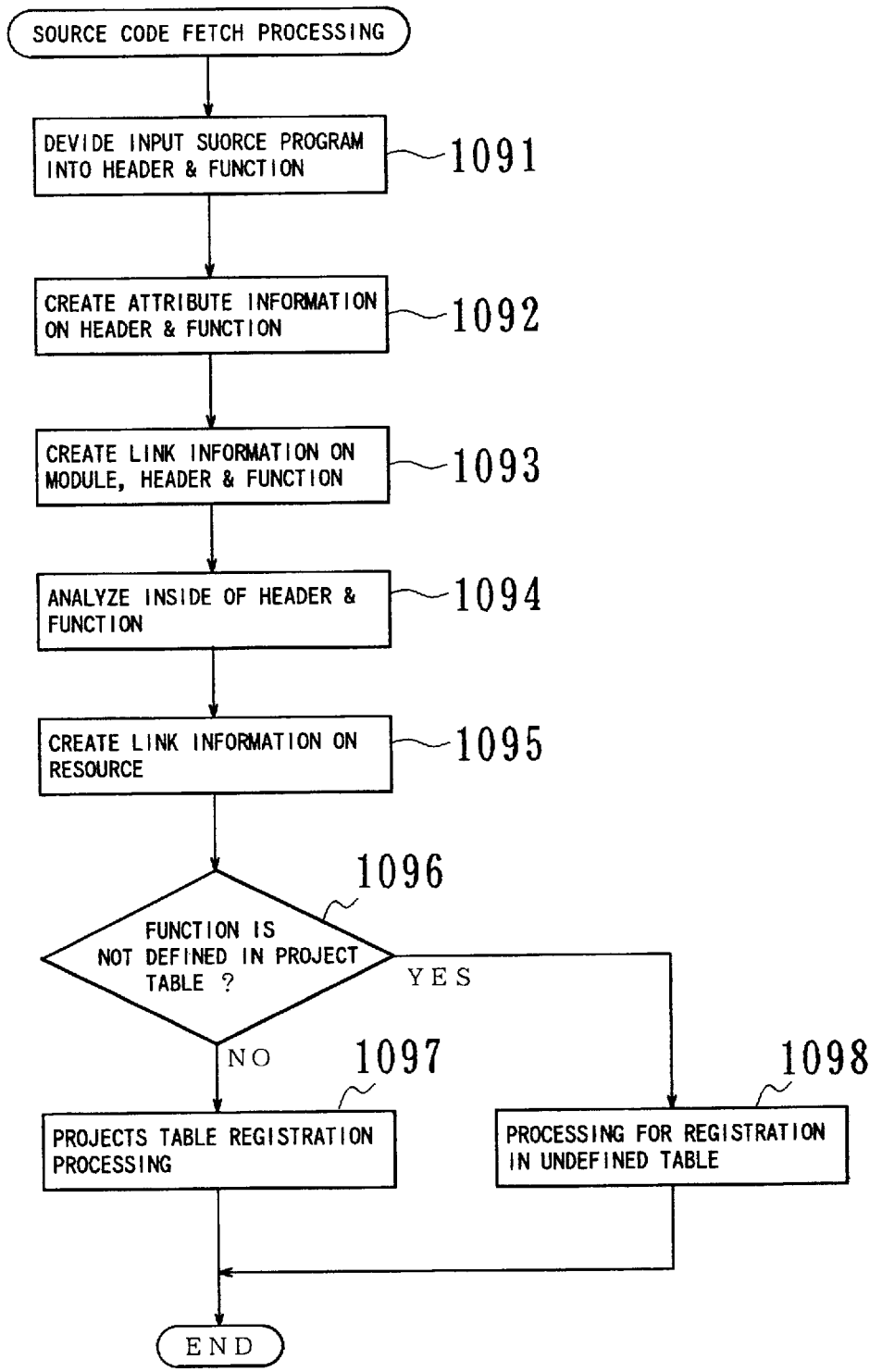
FIG. 57 is a flowchart showing a processing procedure of a source code fetch processing.

A description will then be made of the processing by the source code fetch section 214 for fetching an existing source code. This processing is opposite to the processing for fetching the program. This processing is employed when the existing source program is to be employed as data of the program resource records. As shown in FIG. 57, the source code fetch processing comprises accepting an input of the source program in a module unit and dividing the source code 233 into a header section and a function section (step 1091), followed by creating attribute information of the kind and the name of each of the header section and the function section and registering it in the working table 223 (step 1092). For dividing the source program, a known sentence analysis algorithm may be employed. Thereafter, a reference is made to the program resource definitions and a link information of the header section and the function section is created (step 1093), followed by registering the information in the working table 223 of the project table. Then, the contents of the header and function sections are analyzed (step 1094) and a link information of the resources is created (step 1095). If no function of a partner connecting the link is defined in the project table (step 1096), the resource of the function is registered in the undefined table 232 and a link is extended between the undefined table 232 and the working table 223 (step 1098). On the other hand, when the function of the partner is defined in the project table, a link is connected to the working table 223 (step 1097).

Figures 58A, 58B, 58C:
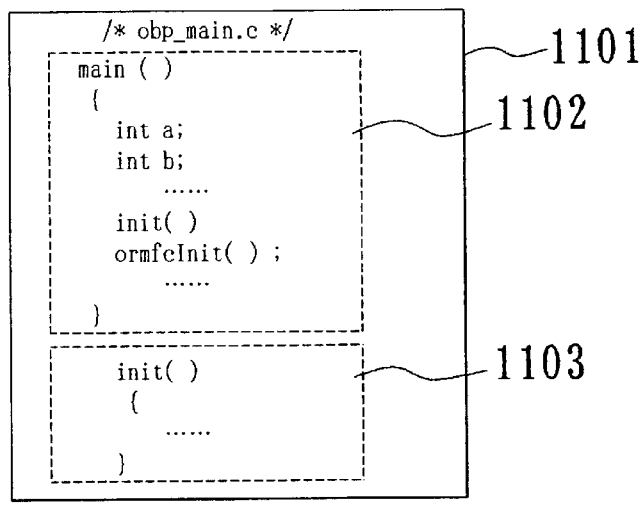
FIGS. 58A, 58B and 58C are diagrams for describing a relation of data registered in the project table with data registered in the undefined table when a source code is inputted.

FIGS. 58A and 58B describe a relation of data to be registered in the project table and the undefined table when the source code has been entered. As shown in FIG. 58A, upon entry of the source code 1101, the module, function and so on in the source code 1101 are analyzed and the data are registered in the project table 230 (FIG. 58B) and the undefined tables 232 (FIG. 58C) in accordance with the contents of analysis.

In the project table 230, the data of the symbol name "main" of the resource ID "30" in the working table 223 makes a reference to the data having the symbol name "ormfcInit" that is not registered in the working table 223. Accordingly, in the undefined table 232, the data having the symbol name "ormfcInit" are registered as a resource ID number of "39", together with the resource ID number "30" as the reference destination and the kind of the link having the meaning of reference, that is, "ref", which in turn are each registered in the reference resource table thereof.

At this time, likewise, for the data of the symbol name "main" of the resource ID "30", there are registered the resource ID number of "39" of the data registered as the resource ID "39" in the undefined table 232 and the kind of the link meaning reference, i e. "ref", in the reference resource table in the working table 223 of the project table 230. This allows a link to be set when the modules, functions and so on of the source code are to be registered as resource records.

As described hereinabove, the program development support system according to the present invention can manage information relating to the program development, such as tools to be employed by the handling persons and for the projects as well as source programs and documents, in a constant format and in a unit as a resource and extend a link having a logical meaning between each of the information, thereby allowing an integral management of the data. Therefore, the users can create the programs without being thoroughly conscious of the link between each of the information, thereby improving efficiency in the development of the programs.

Further, the program development support system according to the present invention allows information to be identified in such a state as being undefined and as being known whether necessary for the development of the programs by saving and registering the resources whose entities are defined in given areas and the resources whose entities are undefined in different areas. Further, even if the information has been deleted after registration, the information can be employed again for the development of the program simply by defining the information without redefining the link with other information because the information can be registered in the area of the undefined information while the link thereof to other information be kept as it is by the kind of the link between the information and the other information. Furthermore, as the link information between the information contains a link kind, when a certain information is to be changed, a scope upon which such a change exerts an influence can be located accurately so that an influence can be reflected upon the scope accurately and certainly.

What is claimed is:

1. A program development support system for integrally managing information used for program development, comprising:

a database for storing design information including source programs, specifications and tools, handling person information on a handling person participating in the program development, and specification information including drawings and tables representing the specification of the program;

registration processing means for providing each information with a unique key, creating attribute information and link information between respective information, for each information, and storing the created information in said database; and processing control means for performing a processing corresponding to an event, to information to be linked, by using said attribute information and said link information, when occurring the event on the each information.

2. A program development support system as claimed in claim 1, further comprising:

program analysis means for analyzing a known source program to divide it into units manageable by said database.

3. A program development support system as claimed in claim 1, further comprising:

first store portion for registering information whose entity is defined in said database; and second store portion for registering information whose entity is undefined, but at least either whose link information or whose attribute information is defined; and said registration processing means deciding whether or not the entity of the information to be registered in said database is defined, registering the information in the first store portion if the entity is defined, and registering the information in the second store portion if the entity is undefined.

4. A program development support system as claimed in claim 3, further comprising:

link holding means for holding a link between information and other information when the entity of the former information registered in said first store portion is deleted in said registration processing means.

5. A program development support system as claimed in claim 3, further comprising:

definition transfer means for registering the information in said first store portion when the entity of the undefined information registered in said second store portion is defined.

6. A program development support system as claimed in claim 3, in which:

said first store portion comprises opening information store portion for storing information which can be referred by a member who is registered as a member of the program development project in the handling person information of said database, and non-opening information store portion for storing information which can be referred by only a specified person in the program development project; and said registration processing means registers the information to be registered in said database in either said opening information store portion or said non-opening information store portion.

7. A program development support system for integrally managing information used for program development, comprising:

a database for managing source programs;

program analysis means for analyzing a known source program to divide it into structuring-elements;

source program registration processing means for providing each divided structuring-element of the divided source program with a unique key, creating attribute information and link information to be linked by other information for each structuring-element, and registering the created information in said database; and processing control means for managing each structuring-element by using said key, the attribute information and the link information.

8. A computer implemented program for integrally managing information used in a support system for program development, embodied on a computer-readable medium, wherein:

said computer program creates a database means for storing design information including source programs, specifications and tools, handling person information on a handling person participating in the program development, and specification information including drawings and tables representing the specification of the program; and wherein said computer program includes:

registration processing means for providing each information with a unique key, creating attribute information and link information between respective information, for each information, and storing the created information in said database; and processing control means for performing a processing corresponding to an event, to information to be linked, by using said attribute information and said link information, when occurring the event on the each information.

9. A computer implemented as claimed in claim 8, further comprising:

program analysis means for analyzing a known source program to divide it into units manageable by said database.

10. A computer implemented program as claimed in claim 8, further comprising:

first store means for registering information whose entity is defined in said database; and second store means for registering information whose entity is undefined, but at least either whose link information or whose attribute information is defined; and said registration processing means deciding whether or not the entity of the information to be registered in said database is defined, registering the information in the first store area if the entity is defined, and registering the information in the second store area if the entity is undefined.

11. A computer implemented program as claimed in claim 10, further comprising:

link holding means for holding a link between information and other information when the entity of the former information registered in said first store area is deleted.

12. A computer implemented program as claimed in claim 10, further comprising:

definition transfer means for registering the information in said first store means when the entity of the undefined information registered in said second store means is defined.

13. A computer implemented program as claimed in claim 10, in which:

said first store means comprises opening information store area for storing information which can be referred by a member who is registered as a member of the program development project in the handling person information of said database means, and non-opening information store area for storing information which can be referred by only a specified person in the program development project; and said registration processing means registers the information to be registered in said database means in either said opening information store area or said non-opening information store area.

14. A computer implemented program for integrally managing information used in a support system for program development, embodied on a computer-readable medium, wherein:

said computer program creates a database means for managing source programs; and wherein said computer program includes:

program analysis means for analyzing a known source program to divide it into structuring-elements;

source program registration means for providing each divided structuring-element of the divided source program with a unique key, creating attribute information and link information to be linked by other information for each structuring-element, and registering the created information in said database means; and processing control means for managing each structuring-element by using said key, the attribute information and the link information.

* * * * *